(12) United States Patent
Iisaka et al.

(10) Patent No.: US 12,349,835 B2
(45) Date of Patent: Jul. 8, 2025

(54) COOKING DEVICES, METHODS, AND COMPONENTS THEREOF

(71) Applicant: SharkNinja Operating LLC, Needham, MA (US)

(72) Inventors: Mai Iisaka, Woking (GB); Kin Kit Christopher Wong, London (GB); Matthew Takeshi Lin, Mountain View, CA (US); Samuel Benjamin Baldry, Northhamptonshire (GB); Georgia Emily ann Banton, London (GB); Dennis Jose Bernal, West Warwick, RI (US); Connor Richard Stevenson Reed, Waltham, MA (US); Christopher Meyer-Rassow, London (GB)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 18/674,105

(22) Filed: May 24, 2024

(65) Prior Publication Data
US 2024/0389793 A1 Nov. 28, 2024

Related U.S. Application Data

(63) Continuation of application No. PCT/US2024/027586, filed on May 3, 2024.
(Continued)

(51) Int. Cl.
*A47J 37/06* (2006.01)
(52) U.S. Cl.
CPC ....... *A47J 37/0641* (2013.01); *A47J 37/0664* (2013.01)

(58) Field of Classification Search
CPC .... A47J 37/0641; A47J 2202/00; A47J 36/32; A47J 37/0664; A47J 27/04; A47J 27/16; A47J 27/62; A47J 37/0704; A47J 37/0786
(Continued)

(56) References Cited

U.S. PATENT DOCUMENTS 11,619,394 B1 4/2023 Elliston et al.
2008/0047949 A1 2/2008 Rustin
(Continued)

FOREIGN PATENT DOCUMENTS

CN 216135707 U * 3/2022 .............. A47J 37/06
CN 114794902 A 7/2022
(Continued)

OTHER PUBLICATIONS

International Search Report and Written Opinion received for PCT Patent Application No. PCT/US2024/027586, mailed on Sep. 20, 2024, 33 pages.
(Continued)

*Primary Examiner* — Phuong T Nguyen
(74) *Attorney, Agent, or Firm* — Mintz, Levin, Cohn, Ferris, Glovsky and Popeo, P.C.

(57) ABSTRACT

A cooking system is provided and includes a housing including an internal volume, the internal volume including an upper surface. A cooking container is removably positioned within the internal volume along an insertion axis, the cooking container having a cooking volume positioned therein. An air movement device is positioned within the internal volume, and configured to generate an air flow through the cooking volume of the cooking container. A heating element is positioned within the internal volume.

20 Claims, 79 Drawing Sheets

Related U.S. Application Data

(60) Provisional application No. 63/500,419, filed on May 5, 2023, provisional application No. 63/589,763, filed on Oct. 12, 2023, provisional application No. 63/562,557, filed on Mar. 7, 2024.

(58) Field of Classification Search
USPC ......... 99/324, 326, 328, 331, 343, 348, 407, 99/409, 427, 419, 451, 468, 473, 482, 99/490, 494
See application file for complete search history.

(56) References Cited

U.S. PATENT DOCUMENTS

| | | |
|---|---|---|
| 2012/0272832 A1 | 11/2012 | Kwon et al. |
| 2015/0201806 A1 | 7/2015 | Yoshidome |
| 2019/0000267 A1 | 1/2019 | Li et al. |
| 2019/0045973 A1 | 2/2019 | Gill et al. |
| 2019/0298105 A1 | 10/2019 | Floessholzer |
| 2021/0059470 A1 | 3/2021 | Zhan et al. |
| 2022/0125241 A1 | 4/2022 | Itzkowitz et al. |
| 2022/0142402 A1 | 5/2022 | Staun |
| 2022/0163212 A1 | 5/2022 | Mitrik et al. |
| 2022/0202239 A1 | 6/2022 | Dubeau |
| 2022/0287502 A1 | 9/2022 | Liu |
| 2022/0361710 A1 | 11/2022 | Vaupot et al. |
| 2023/0131914 A1 | 4/2023 | Liu |
| 2023/0389750 A1 | 12/2023 | Bao et al. |
| 2023/0414037 A1 | 12/2023 | Zou |
| 2024/0197112 A1 | 6/2024 | Caputa et al. |
| 2024/0315484 A1 | 9/2024 | Lv et al. |

FOREIGN PATENT DOCUMENTS

| | | |
|---|---|---|
| EP | 4042913 A1 | 8/2022 |
| WO | 2015081549 A1 | 6/2015 |

OTHER PUBLICATIONS

Invitation to Pay Additional Fees received for PCT Patent Application No. PCT/US2024/027586, mailed on Aug. 2, 2024, 18 pages.

* cited by examiner

COOKING DEVICES, METHODS, AND COMPONENTS THEREOF

CROSS-REFERENCE TO RELATED APPLICATIONS

This application is a continuation application of International Application No. PCT/US2024/027586, filed May 3, 2024, and entitled "COOKING DEVICES, METHODS, AND COMPONENTS THEREOF," which claims priority under 35 U.S.C. § 119 (e) to U.S. Provisional Patent Application No. 63/500,419 titled "COOKING DEVICES, METHODS, AND COMPONENTS THEREOF", filed on May 5, 2023, U.S. Provisional Patent Application No. 63/589,763 titled "COOKING DEVICES, METHODS, AND COMPONENTS THEREOF", filed on Oct. 12, 2023, and U.S. Provisional Patent Application No. 63/562,557 titled "COOKING DEVICES, METHODS, AND COMPONENTS THEREOF", filed on Mar. 7, 2024, the entire contents of which are hereby expressly incorporated by reference herein.

FIELD

A countertop cooking system including a one or more vertically stacked cooking zones, and methods for using the same, are provided.

BACKGROUND

Countertop cooking systems such as air fryers typically consist of a heating element and a fan that circulates hot air around food that is disposed in a cooking compartment therein. Traditional air fryers can have limited cooking space, and typically, the more cooking spaces one has, the more countertop space the air fryer takes up.

SUMMARY

Methods and devices for cooking food product are provided.

In an aspect, a cooking system is provided. The cooking system includes a housing including an internal volume, the internal volume including an upper surface. A guide vane is positioned within the internal volume, and a cooking container is removably positioned within the internal volume along an insertion axis. The cooking container has a cooking volume positioned therein. An air movement device is positioned within the internal volume and configured to generate an air flow along the guide vane and through the cooking volume of the cooking container. A heating element is positioned within the internal volume. One or more of the following features can be combined in any feasible combination.

The cooking system described can vary in any number of ways. In an aspect, the guide vane can extend along the insertion axis from a rear section of the internal volume to a front section of the internal volume. In an aspect, the guide vane can be positioned on the upper surface of the internal volume.

In an aspect, the air movement device, the heating element, and the cooking container can be horizontally aligned along the insertion axis. In an aspect, the cooking container can include at least one through-bore positioned within a rear wall of the cooking container. In an aspect, the guide vane can include a first portion positioned at an acute angle relative to the upper surface. In an aspect, the guide vane can include a second portion positioned perpendicular to the upper surface.

In an aspect, the cooking container can include a top opening configured to receive the air flow from the guide vane. In an aspect, the cooking container can include a through-bore positioned within a side wall of the cooking container.

In an aspect, the air flow passes horizontally over a food load positioned within the cooking volume. In an aspect, the air flow passes vertically over a rear wall of the cooking container and into the cooking container through a top opening.

In an aspect, a cooking system is provided. The cooking system includes a housing, a first internal volume within the housing, where the first internal volume includes a first upper surface and a first guide vane extending along the first internal volume. A second internal volume is within the housing, where the second internal volume is located vertically below the first internal volume and includes a second upper surface and a second guide vane extending along the first internal volume. A first cooking container is removably positioned within the first internal volume along a first insertion axis, the first cooking container having a cooking volume positioned therein. A second cooking container is removably positioned within the second internal volume along a second insertion axis, the second cooking container having a cooking volume positioned therein. The first and second insertion axes are vertically spaced relative to one another. A first air movement device is positioned within the first internal volume, and configured to generate a first air flow along the first guide vane and through the cooking volume of the first cooking container. A first heating element is positioned within the first internal volume. A second air movement device is positioned within the second internal volume and configured to generate a second air flow along the second guide vane and through the cooking volume of the second cooking container. A second heating element is positioned below the first heating element, within the second internal volume. One or more of the following features can be combined in any feasible combination.

The cooking system described can vary in any number of ways. In an aspect, the first guide vane can extend along the first insertion axis from a rear section of the first internal volume to a front section of the first internal volume, and the second guide vane can extend along the second insertion axis from a rear section of the second internal volume to a front section of the second internal volume. In an aspect, the first guide vane can be positioned on the first upper surface, and the second guide vane can be positioned on the second upper surface.

In an aspect, the first air movement device, the first heater, and the first cooking container can be horizontally aligned along the first insertion axis, and the second air movement device, the second heater, and the second cooking container can be horizontally aligned along the second insertion axis.

In an aspect, the first cooking container can include at least one through-bore positioned within a rear wall of the first cooking container, and the second cooking container can include at least one through-bore positioned within a rear wall of the second cooking container. In an aspect, the first cooking container can include a top opening configured to receive the first air flow from the first guide vane, and the second cooking container can include a top opening configured to receive the second air flow from the second guide vane. In an aspect, the first cooking container can be removably positioned within the second internal volume and the second cooking container can be removably positioned within the first internal volume. In an aspect, a cooking operation can be performed with only one of the first or second cooking containers removably positioned within the first or second internal volumes.

In an aspect, the first air flow can pass horizontally over a food load positioned within the cooking volume of the first cooking container and vertically over a rear wall of the first cooking container and into the first cooking container through a first top opening, and/or the second air flow can pass horizontally over a food load positioned within the cooking volume of the second cooking container and vertically over a rear wall of the second cooking container and into the second cooking container through a second top opening.

In an aspect, a cooking system is provided. The cooking system includes a housing including an internal volume having an upper surface and a bottom surface. A cooking container is removably positioned within the internal volume along an insertion axis, the cooking container having a cooking volume positioned therein. A shroud is positioned within the internal volume and extending upward from the bottom surface in order to form a gap between the shroud and the upper surface. An air movement device is positioned within the internal volume, and configured to generate an air flow through the gap formed by the shroud and through the cooking volume of the cooking container. A heating element is positioned within the internal volume. One or more of the following features can be combined in any feasible combination.

The cooking system described can vary in any number of ways. In an aspect, the shroud can include an overhanging portion extending at least partially along the insertion axis. In an aspect, the shroud can include a through-bore positioned therein. In an aspect, the through-bore can be horizontally aligned with the heating element and the air movement device. In an aspect, the cooking container can include at least one through-bore positioned within a rear wall of the cooking container, and the through-bore of the cooking container can horizontally align with the through-bore of the shroud. In an aspect, the shroud can be positioned between the cooking container and the heating element. In an aspect, the shroud can include an indented surface forming an air expansion chamber. In an aspect, the air expansion chamber can be positioned adjacent the air movement device and configured to allow for an expansion of the air flow generated by the air movement device. In an aspect, the air expansion chamber can be configured to allow the air flow to expand vertically upward and through the gap. In an aspect, the indented surface can include a profile corresponding to the cooking container.

In an aspect, wherein the overhanging portion can be at least partially curved. In an aspect, the overhanging portion can extend at least partially over the cooking container when inserted into the internal volume.

In an aspect, the heating element can be positioned at least partially within the gap such that air passing through the gap can heated.

In an aspect, a cooking system is provided. The cooking system includes a housing and a first internal volume within the housing, where the first internal volume includes a first upper surface and a first bottom surface. A second internal volume is within the housing and located vertically below the first internal volume, and including a second upper surface and a second bottom surface. A first shroud is positioned within the first internal volume and extending upward from the first bottom surface in order to form a first gap between the first shroud and the first upper surface. A second shroud is positioned within the second internal volume and extending upward from the second bottom surface in order to form a second gap between the second shroud and the second upper surface. A first cooking container is removably positioned within the first internal volume along a first insertion axis, the first cooking container having a cooking volume positioned therein. A second cooking container is removably positioned within the second internal volume along a second insertion axis, the second cooking container having a cooking volume positioned therein. The first and second insertion axes are vertically spaced relative to one another. A first air movement device is positioned within the first internal volume, and configured to generate a first air flow through the first gap formed by the first shroud and through the cooking volume of the first cooking container. A first heating element is positioned within the first internal volume, and a second air movement device is positioned within the second internal volume, and configured to generate a second air flow through the second gap formed by the second shroud and through the cooking volume of the second cooking container. A second heating element is positioned below the first heating element, within the second internal volume. One or more of the following features can be combined in any feasible combination.

The cooking system described can vary in any number of ways. In an aspect, the first shroud can include an overhanging portion extending at least partially along the first insertion axis. In an aspect, the first shroud can be positioned between the first cooking container and the first heating element. In an aspect, the first shroud can include an indented surface forming an air expansion chamber. In an aspect, the air expansion chamber can be positioned adjacent the first air movement device and can be configured to allow for an expansion of the air flow generated by the first air movement device.

In an aspect, the first cooking container can be removably positioned within the second internal volume and the second cooking container can be removably positioned within the first internal volume.

In an aspect, a cooking operation can be performed with only one of the first or second cooking containers removably positioned within the first or second internal volumes.

In an aspect, a cooking system is provided. The cooking system includes a housing including an internal volume having a bottom surface. A cooking container is removably positioned within the internal volume along an insertion axis, the cooking container having a rear wall and a cooking volume positioned therein. An air movement device is positioned within the internal volume, and configured to generate an air flow over the rear wall of the cooking container and through the cooking volume of the cooking container. A volute is positioned between the bottom surface and the air movement device, the volute including an air expansion area formed by a curved surface positioned adjacent the air movement device. A heating element is positioned within the internal volume. One or more of the following features can be combined in any feasible combination.

The cooking system described can vary in any number of ways. In an aspect, a cross-sectional area of the air expansion area can increase along a vertical direction.

In an aspect, the volute can form the air expansion area on a first side of the air movement device, and the volute can form a compression area on a second side of the air movement device, opposite the first side. In an aspect, the volute can be configured to direct the air flow generated by the air movement device vertically over the rear wall of the cooking container. In an aspect, the volute can be configured to increase volumetric flow rate of the air flow generated by the air movement device and moving through the cooking volume of the cooking container. In an aspect, the volute can include a drainage channel positioned vertically below the air movement device. In an aspect, the volute can partially surround the air movement device.

In an aspect, the air movement device can be a centrifugal fan.

In an aspect, the heating device can be positioned horizontally between the air movement device and the cooking container.

In an aspect, a cooking system is provided. The cooking system includes a housing and a first internal volume within the housing, the first internal volume including a first bottom surface. A second internal volume is within the housing, the second internal volume located vertically below the first internal volume and including a second bottom surface. A first cooking container is removably positioned within the first internal volume along a first insertion axis, the first cooking container having a rear wall and a cooking volume positioned therein. A second cooking container is removably positioned within the second internal volume along a second insertion axis, the second cooking container having a rear wall and a cooking volume positioned therein. The first and second insertion axes are vertically spaced relative to one another. A first air movement device is positioned within the first internal volume, and configured to generate a first air flow over the rear wall of the first cooking container and through the cooking volume of the first cooking container. A first heating element is positioned within the first internal volume. A second air movement device is positioned within the second internal volume, and configured to generate a second air flow over the rear wall of the second cooking container and through the cooking volume of the second cooking container. A first volute is positioned between the first bottom surface and the first air movement device, the first volute including an air expansion area formed by a curved surface positioned adjacent the first air movement device. A second volute is positioned between the second bottom surface and the second air movement device, the second volute including an air expansion area formed by a curved surface positioned adjacent the second air movement device. A second heating element is positioned below the first heating element, within the second internal volume. One or more of the following features can be combined in any feasible combination.

The cooking system described can vary in any number of ways. In an aspect, a cross-sectional area of the first air expansion area can increase along a vertical direction.

In an aspect, the first volute can form the air expansion area on a first side of the first air movement device, and the first volute can form a compression area on a second side of the first air movement device, opposite the first side. In an aspect, the first volute can be configured to direct the first air flow generated by the first air movement device vertically over the rear wall of the first cooking container. In an aspect, the first volute can include a drainage channel positioned vertically below the first air movement device.

In an aspect, the first cooking container can be removably positioned within the second internal volume and the second cooking container can be removably positioned within the first internal volume.

In an aspect, a cooking operation can be performed with only one of the first or second cooking containers removably positioned within the first or second internal volumes.

In an aspect, a cooking system is provided. The cooking system includes a housing including an inner shell forming an internal volume, and an outer shell surrounding the inner shell, the outer shell including an air inlet and an air outlet. A cool air channel is arranged between the inner shell and the outer shell. A cooking container is removably positioned within the internal volume along an insertion axis, the cooking container having a front housing and a container attached to the front housing. An air movement device is positioned within the cool air channel, and configured to generate an air flow through the cool air channel. A volute is positioned within the cool air channel, the volute including an air expansion area formed by a curved surface positioned adjacent the air movement device. One or more of the following features can be combined in any feasible combination.

The cooking system described can vary in any number of ways. In an aspect, the cool air channel can extend over a top side, a bottom side, a left side, and a right side of the internal volume. In an aspect, the air flow generated within the cool air channel can exhaust from the cool air channel through the air outlet positioned at a bottom of the housing.

In an aspect, a second cool air channel can be positioned within the front housing of the cooking container. In an aspect, the front housing can include a plurality of air inlets configured to receive the air flow from the cool air channel extending over the top side, the left side, and the right side of the internal volume. In an aspect, the air flow passes over the top side, the left side, and the right side of the internal volume prior to passing through the second cool air channel.

In an aspect, the volute can form the air expansion area on a first side of the air movement device, and the volute can form a compression area on a second side of the air movement device, opposite the first side. In an aspect, the volute can be formed as part of the outer housing. In an aspect, the volute can be positioned vertically below the air movement device.

In an aspect, a cooking system is provided. The cooking system includes a housing, a first inner shell forming a first internal volume, and a second inner shell forming a second internal volume, the first inner shell positioned vertically above the second inner shell. An outer shell surrounds the first inner shell and the second inner shell, the outer shell including an air inlet and an air outlet. A cool air channel is arranged between the first inner shell, the second inner shell, and the outer shell. A first cooking container is removably positioned within the first internal volume along a first insertion axis, the first cooking container having a front housing and a container attached to the front housing. A second cooking container is removably positioned within the second internal volume along a second insertion axis, the second cooking container having a front housing and a container attached to the front housing, wherein the first and second insertion axes are vertically spaced relative to one another. A first air movement device is positioned within the cool air channel, and configured to generate an air flow through the cool air channel. A first volute is positioned within the cool air channel, the first volute including an air expansion area formed by a curved surface positioned adjacent the first air movement device. A second air movement device is positioned within the cool air channel, and configured to generate an air flow through the cool air channel. A second volute is positioned within the cool air channel, the volute including an air expansion area formed by a curved surface positioned adjacent the second air movement device. One or more of the following features can be combined in any feasible combination.

The cooking system described can vary in any number of ways. In an aspect, the first volute can be positioned vertically below the first air movement device. In an aspect, the first volute can form the air expansion area on a first side of the first air movement device, and the first volute can form a compression area on a second side of the first air movement device, opposite the first side.

In an aspect, the second volute can be positioned vertically above the second air movement device. In an aspect, the second volute can form a compression area on a first side of the second air movement device, and the second volute can form the air expansion area on a second side of the second air movement device, opposite the first side.

In an aspect, the cool air channel can extend over a top side, a bottom side, a left side, a right side, and a bottom of the first internal volume, and over a top side, a bottom side, a left side, a right side, and a bottom of the second internal volume. In an aspect, the air flow generated within the cool air channel can exhaust from the cool air channel through the air outlet positioned at a bottom of the housing.

In an aspect, a cooking system is provided. The cooking system includes a housing including an internal volume. A cooking container is removably positioned within the internal volume along an insertion axis, the cooking container having a cooking volume positioned therein and a bottom surface. A first cooking layer is positioned within the cooking volume at a first height from the bottom surface. A second cooking layer is positioned within the cooking volume at a second height from the bottom surface, the first height being different than the second height. An air movement device is positioned within the internal volume, and configured to generate an air flow through the cooking volume of the cooking container. A heating element is positioned within the internal volume. One or more of the following features can be combined in any feasible combination.

The cooking system described can vary in any number of ways. In an aspect, the first cooking layer can be positioned vertically above the second cooking layer. In an aspect, the first cooking layer and the second cooking layer can be vertically aligned within each other. In an aspect, the first cooking layer and the second cooking layer can be perforated to allow air flow therethrough.

In an aspect, the air flow generated by the air movement device can pass horizontally above the first cooking layer and second cooking layer prior to contacting a food product positioned on at least one of the first cooking layer and the second cooking layer.

In an aspect, the air flow generated by the air movement device can pass through the first cooking layer prior to contacting a food product positioned on the second cooking layer. In an aspect, the airflow can pass vertically downward through the first cooking layer and the second cooking layer.

In an aspect, the cooking container can include at least one projection configured to abut the first cooking layer in order to space the first cooking layer vertically above the second cooking layer.

In an aspect, a cooking system is provided. The cooking system includes a housing including a first internal volume and a second internal volume, the second internal volume isolated from the first internal volume. A first cooking container is removably positioned within the first internal volume along an insertion axis, the first cooking container having a first cooking volume positioned therein and a bottom surface. A first cooking layer is positioned within the first cooking volume at a first height from the bottom surface. A second cooking layer is positioned within the first cooking volume at a second height from the bottom surface, the first height being different than the second height. A first air movement device is positioned within the first internal volume, and configured to generate an air flow through the first cooking volume of the first cooking container. A first heating element is positioned within the first internal volume. A second cooking container is removably positioned within the second internal volume along the insertion axis, the second cooking container having a second cooking volume positioned therein and a bottom surface. A third cooking layer is positioned within the second cooking volume at a third height from the bottom surface. A fourth cooking layer positioned within the second cooking volume at a fourth height from the bottom surface, the third height being different than the fourth height. A second air movement device is positioned within the second internal volume, and configured to generate an air flow through the second cooking volume of the second cooking container. A second heating element is positioned within the second internal volume. One or more of the following features can be combined in any feasible combination.

The cooking system described can vary in any number of ways. In an aspect, the first cooking layer can be positioned vertically above the second cooking layer. In an aspect, the first cooking layer and the second cooking layer can be vertically aligned with each other. In an aspect, the first cooking layer and the second cooking layer can be perforated to allow air flow therethrough.

In an aspect, the third cooking layer can be positioned vertically above the fourth cooking layer. In an aspect, the third cooking layer and the fourth cooking layer can be vertically aligned with each other. In an aspect, the first cooking layer, the second cooking layer, the third cooking layer, and the fourth cooking layer can be vertically aligned with each other.

In an aspect, the air flow generated by the air movement device can pass horizontally above the first cooking layer and second cooking layer prior to contacting a food product positioned on at least one of the first cooking layer and the second cooking layer.

In an aspect, the air flow generated by the air movement device can pass through the first cooking layer prior to contacting a food product positioned on the second cooking layer. In an aspect, the airflow can pass vertically downward through the first cooking layer and the second cooking layer.

In an aspect, the cooking container can include at least one projection configured to abut the first cooking layer in order to space the first cooking layer vertically above the second cooking layer.

In an aspect, the first air movement device can be positioned vertically above the second air movement device.

In an aspect, a cooking system is provided. The cooking system includes a housing including an internal volume, the internal volume including an upper surface having a length and a width. A baffle extends across the width of the upper surface and extending vertically downward from the upper surface. A cooking container is removably positioned within the internal volume along an insertion axis, the cooking container having a cooking volume positioned therein. An air movement device is positioned within the internal volume, and configured to generate an air flow through the cooking volume of the cooking container. A heating element is positioned within the internal volume. One or more of the following features can be combined in any feasible combination.

The cooking system described can vary in any number of ways. In an aspect, a guide vane can be positioned within the internal volume that extends at least partially along the insertion axis from a rear section of the internal volume to a front section of the internal volume. In an aspect, the guide vane can be positioned on the upper surface of the internal volume. In an aspect, the guide vane can extend into the baffle, creating a first airflow and second air flow positioned side-by-side along the length of the upper surface.

In an aspect, the baffle can offset from the upper surface, creating a gap between the baffle and upper surface. In an aspect, an airflow traveling along the upper surface can be separated into a first airflow and a second airflow. In an aspect, the first airflow can travel through the gap and over the baffle. In an aspect, the second airflow can be directed downward by the baffle. In an aspect, the baffle can be positioned at an angle across the width of the upper surface.

In an aspect, the upper surface can includes at least two deflection surfaces arranged at different longitudinal positions along the length of the upper surface. In an aspect, the deflection surfaces can direct an airflow vertically downward. In an aspect, an edge of the baffle can align with at least one deflection surface of the upper surface.

In an aspect, the air flow can pass horizontally over a food load positioned within the cooking volume.

In an aspect, a cooking system is provided. The cooking system includes a housing including an internal volume therein. An upper shell forms the top surface of the internal volume, the upper shell having a length and a width. An air movement device is positioned within the internal volume, and configured to generate an air flow through the internal volume and along the length of the upper shell. A first air flow deflection surface is positioned on the upper shell and configured to direct a first portion of the air flow to a first area within the internal volume. A second air flow deflection surface is positioned on the upper shell and configured to direct a second portion of the air flow to a second area within the internal volume. One or more of the following features can be combined in any feasible combination.

The cooking system described can vary in any number of ways. In an aspect, the first portion of the air flow can be parallel to the second portion of the air flow along at least a portion of the length of the upper shell. In an aspect, the first portion of the air flow can be separated from the second portion of the air flow by a guide vane positioned on the upper shell.

In an aspect, the first air flow deflection surface can direct the air vertically downward from the upper shell into the internal volume. In an aspect, the second air flow deflection surface can direct the air vertically downward from the upper shell into the internal volume.

In an aspect, the first air flow deflection surface can be positioned at a first longitudinal position along the length of the upper shell, and the second air flow deflection surface can be positioned at a second longitudinal position along the length of the upper shell, wherein the first longitudinal position can different than the second longitudinal position.

In an aspect, a cooking system is provided. The cooking system includes a housing including an internal volume and an opening positioned in a front wall of the housing. A cooking container is removably positioned within the internal volume along an insertion axis, and has a cooking volume positioned therein and a guide channel positioned on an outer surface of the cooking container. A user interface (UI) is rotatably coupled to the housing adjacent to the opening. A pin extends from the UI and is configured to be removably received by the guide channel of the cooking container. A rotational force is translated to the UI through the pin as the pin moves within the guide channel. One or more of the following features can be combined in any feasible combination.

The cooking system described can vary in any number of ways. In an aspect, the UI can include a spring member configured to bias the UI to at least one of a first position and a second position. In an aspect, the UI can be spaced from the opening when in a first position, and partially blocks the opening when in a second position.

In an aspect, the guide channel can be curved. In an aspect, the guide channel can be positioned on a bottom surface of the cooking container.

In an aspect, the pin can be removed from the guide channel as the cooking container is removed from the internal volume. In an aspect, the pin can extend orthogonal to the insertion axis.

In an aspect, the UI can be horizontally aligned with the cooking container along the insertion axis when the cooking container is inserted into the internal volume.

In an aspect, a method is provided. The method includes inserting a cooking container having a cooking volume positioned therein and a guide channel positioned on an outer surface thereof, into an opening of an internal volume a housing of a cooking system along an insertion axis; receiving, by the guide channel, a pin extending from a user interface rotatably coupled to the housing in a first position adjacent to the opening; and translating the UI from the first position to a second position in front of the opening via a rotational force exerted on the pin as the pin moves within the guide channel. One or more of the following features can be combined in any feasible combination.

The method described can vary in any number of ways. In an aspect, the cooking container can include a handle coupled to the outer surface of the cooking container.

In an aspect, the cooking system can include a second internal volume located vertically above or below the internal volume, the method can further including inserting a second cooking container having a cooking volume positioned therein and a second guide channel positioned on an outer surface thereof into the an opening of the second internal volume.

In an aspect, the UI can include a spring member configured to bias the UI to at least one of the first position and the second position.

In an aspect, the guide channel can be curved. In an aspect, the guide channel can be positioned on a bottom surface of the cooking container, and the pin extends orthogonal to the insertion axis.

In an aspect, the method can further include removing the cooking container from the internal volume, wherein the pin can be removed from the guide channel when the cooking container is removed from the internal volume.

In an aspect, the UI can be horizontally aligned with the cooking container along the insertion axis when the cooking container is inserted into the internal volume.

In an aspect, a cooking system is provided. The cooking system includes a housing, a first internal volume within the housing and including a first opening positioned in a front wall of the housing, and a second internal volume within the housing, located vertically below the first internal volume and including a second opening positioned in the front wall of the housing. A first cooking container is removably positioned within the first internal volume along a first insertion axis, having a cooking volume positioned therein and a guide channel positioned on an outer surface of the first cooking container. A user interface is rotatably coupled to the housing adjacent to the first opening. A pin extends from the UI and configured to be removably received by the guide channel of the cooking container. A rotational force is translated to the UI through the pin as the pin moves within the guide channel. One or more of the following features can be combined in any feasible combination.

The cooking system described can vary in any number of ways. In an aspect, a second cooking container can be removably positioned within the second internal volume along a second insertion axis, the second cooking container having a cooking volume positioned therein and a second guide channel positioned on an outer surface of the second cooking container.

In an aspect, the first cooking container can be removably positioned within the second internal volume and the second cooking container can be removably positioned within the first internal volume.

In an aspect, a cooking operation can be performed with only one of the first or second cooking containers removably positioned within the first or second internal volumes.

In an aspect, a baffle can be positioned at least partially across the width of the upper shell and configured to direct the airflow downward into the internal volume.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Traditional countertop cooking systems such as air fryers typically consist of a heating element and a fan positioned overtop of a cooking cavity. The fan can circulate hot air around the cooking cavity in order to cook food that is disposed therein. Traditional air fryers can have limited cooking space, and typically, the more cooking space one has, the more countertop space the air fryer takes up.

In general, a cooking system is provided that includes a housing having two vertically stacked cooking compartments that can each receive a cooking container therein. The cooking system provided can further include at least one heating element disposed at a rear of the housing for heating an internal volume each cooking container and two vertically stacked air movement devices for circulating air independently through the two vertically stacked cooking compartments. The cooking system can also include a guide vane disposed on an upper surface of each of the two vertically stacked cooking compartments configured to redirect airflow from the air movement devices through the cooking volumes of the cooking containers.

Embodiments of the countertop cooking systems and methods described herein advantageously provide a system that requires a small amount of countertop space, while optimizing an amount of cooking space wherein food can be cooked.

Figure 1:
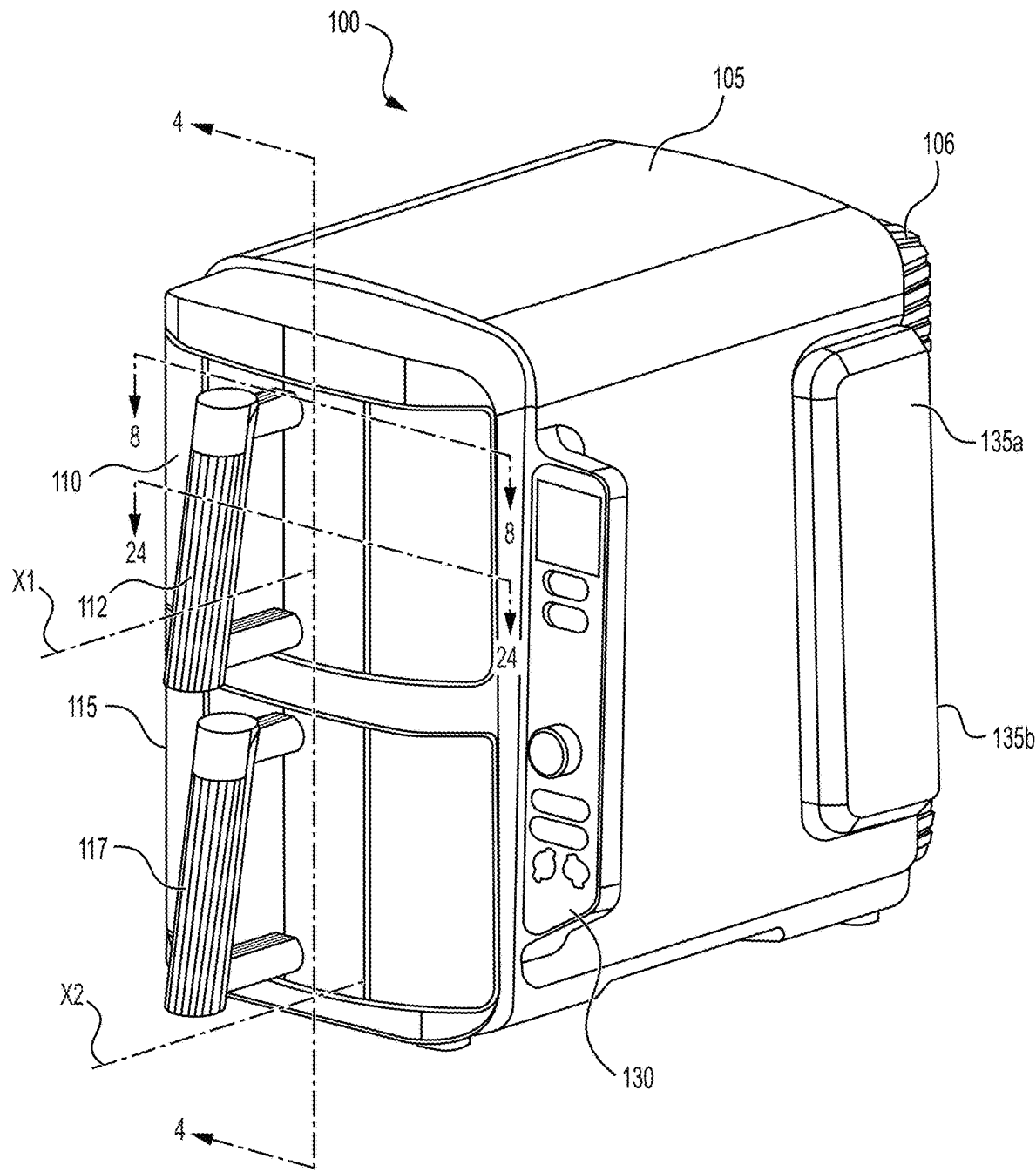
FIG. 1 is a front perspective view of an embodiment of a cooking system according to the subject matter described herein.
Figure 2:
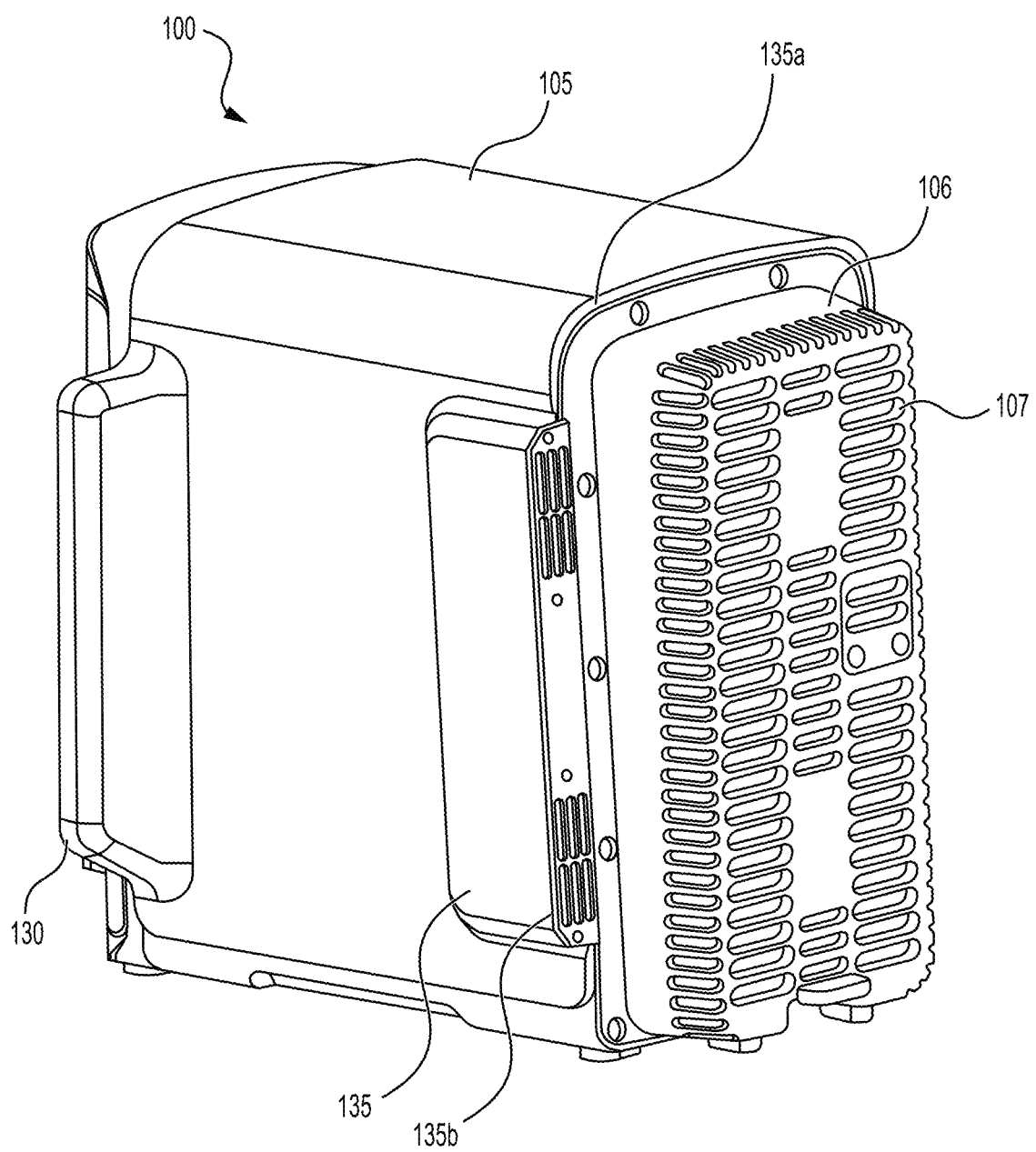
FIG. 2 is a rear perspective view of the cooking system of FIG. 1.
Figure 3:
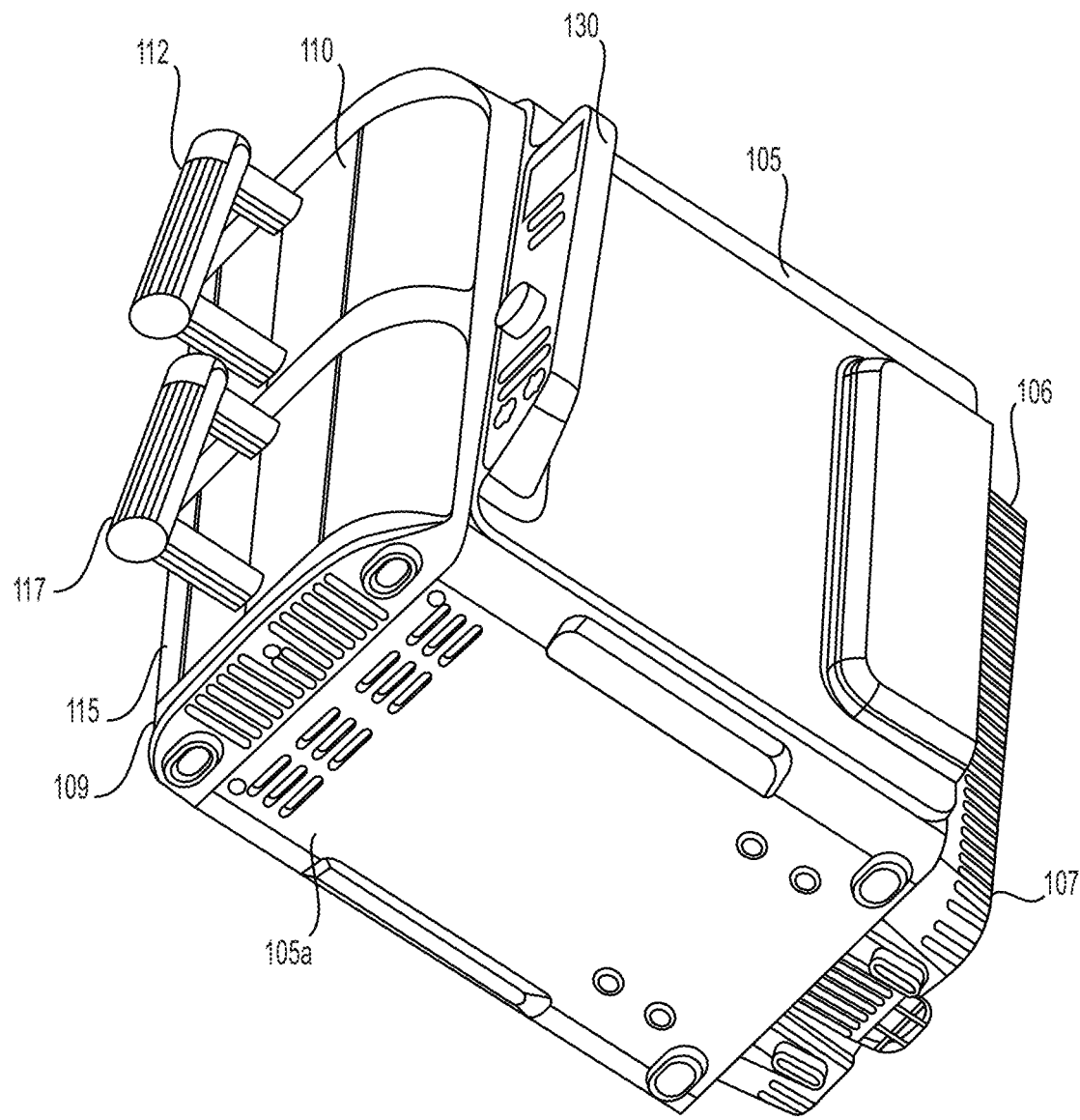
FIG. 3 is bottom perspective view of the cooking system of FIG. 1.

FIGS. 1-3 are perspective views of an embodiment of a cooking system 100 according to the subject matter described herein. In some embodiments, the cooking system 100 can include a housing 105, and first and second cooking containers 110, 115 that can be removably positioned within vertically aligned first and second internal volumes 120, 125, along first and second insertion axes X1, X2 respectively, as discussed in greater detail below. The first and second cooking containers 110, 115 can include first and second cooking volumes (e.g. first and second cooking volumes 111, 116 of FIG. 4) and first and second handles 112, 117 located on a front face of the first and second cooking containers 110, 115, respectively. In some embodiments, the first and second cooking containers 110, 115 can be identical. In this case, the first and second cooking containers 110, 115 can be interchangeably positioned within either the first or the second internal volumes 120, 125. In some embodiments, the cooking system 100 can further include a user interface 130 that is coupled to the housing 105 as discussed in greater detail below. The cooking system 100 can also include first and second moisture vents 135a, 135b configured to vent moisture from the first and second internal volumes 120, 125, respectively, during a cooking operation. The vents 135a, 135b can direct the air towards the rear of the housing, or can direct the air out the side of the housing. In addition to the moisture vents, the housing 105 includes a base 105a, where outlet vents 109 are positioned. The outlet vents 109 allow for cooling air passing through a cooling channel within the housing to exhaust from the housing 105.

The cooking system 100 also includes a rear housing 106 arranged at the back of the housing 105. The rear housing 106 includes a plurality of inlet air vents 107 which are configured to allow cooling air to enter a cooling channel within the housing 105, which will be described in more detail below. Additionally, the rear housing 106 can house the motors which operate the convection and cooling fans (as seen in FIG. 4).

Figure 4:
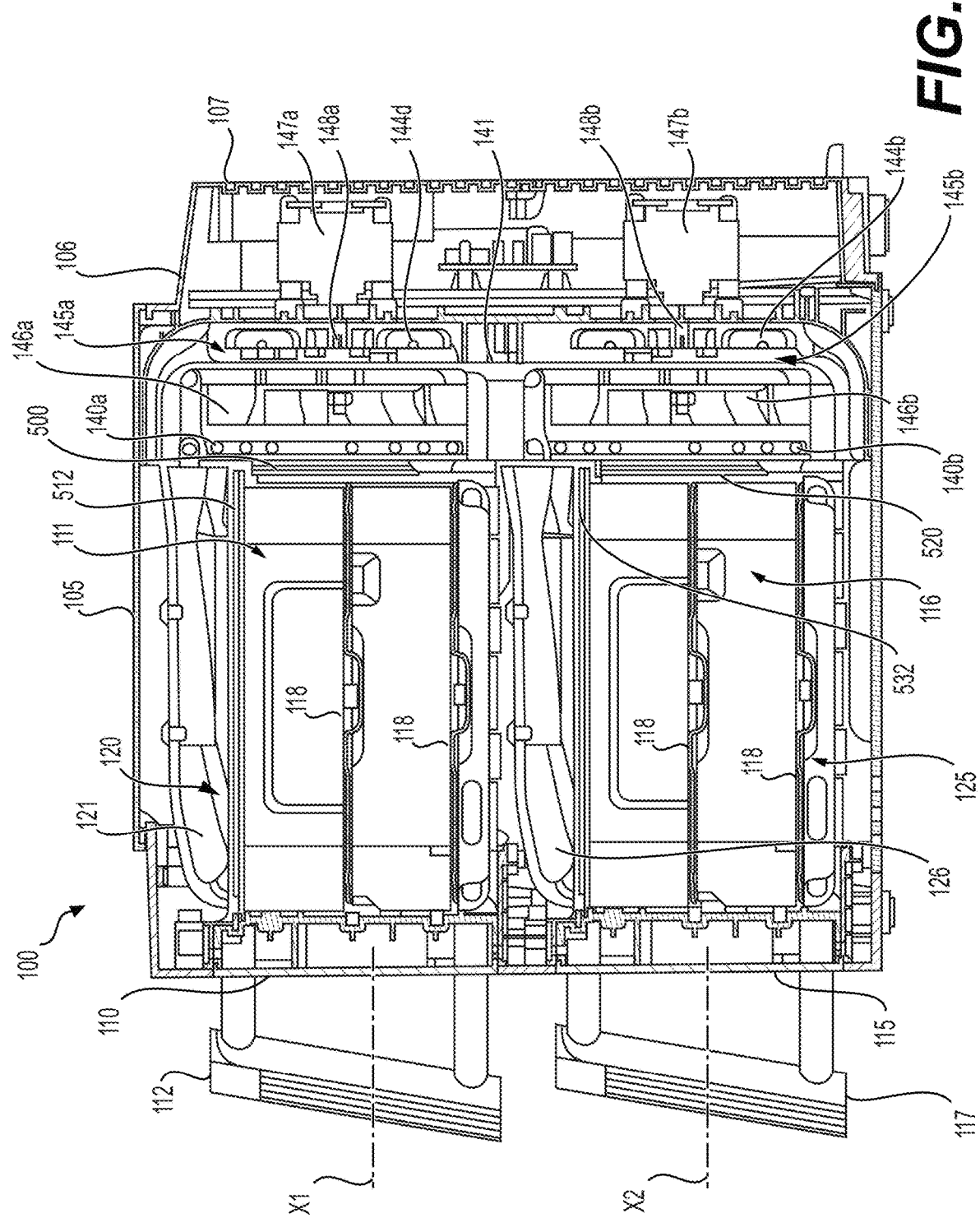
FIG. 4 is a cross-sectional view of the cooking system of FIG. 1 taken along line 4-4 in FIG. 1 depicting the flow of heated air through the cooking system.

FIG. 4 is a cross-sectional view of the cooking system 100 of FIG. 1 with the first and second cooking containers 110, 115 positioned within the vertically aligned first and second internal volumes 120, 125, respectively. As illustrated in FIG. 4, the first and second internal volumes 120, 125 are fluidly separate from one another.

Figure 5:
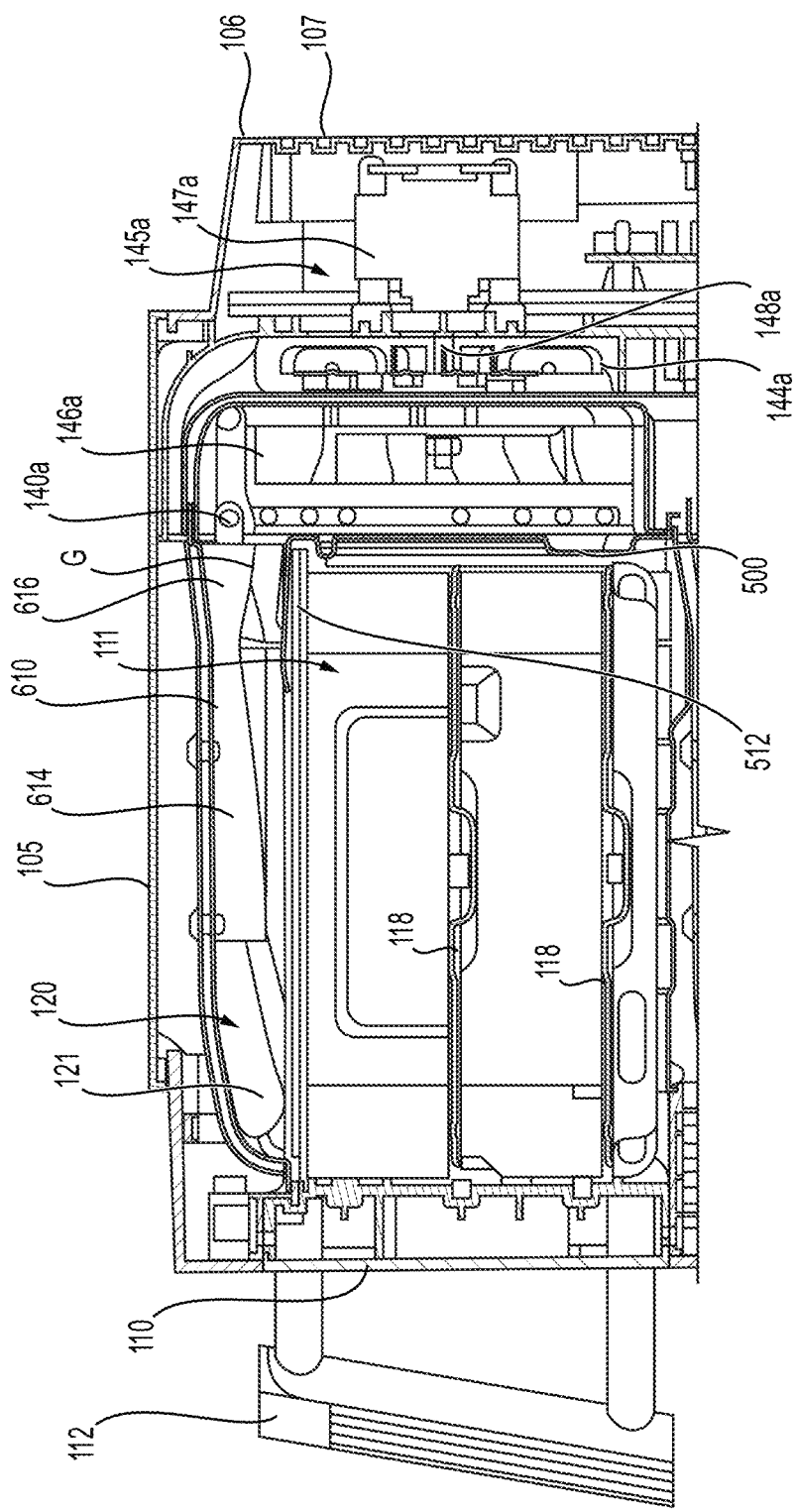
FIG. 5 is a detailed cross-sectional view of the cooking system of FIG. 1.
Figure 6:
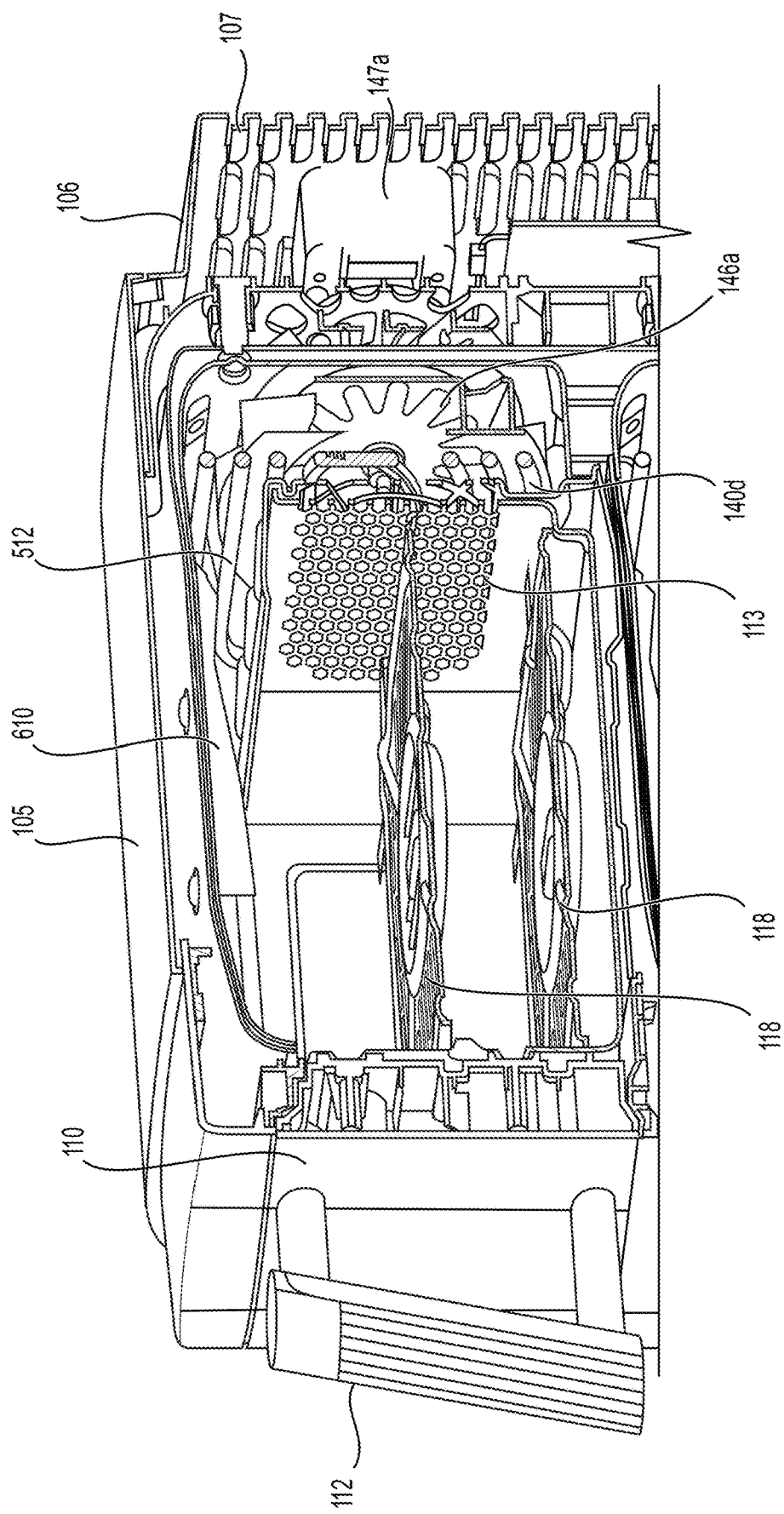
FIG. 6 is a partial perspective cross-sectional view of the cooking system of FIG. 1.
Figure 7:
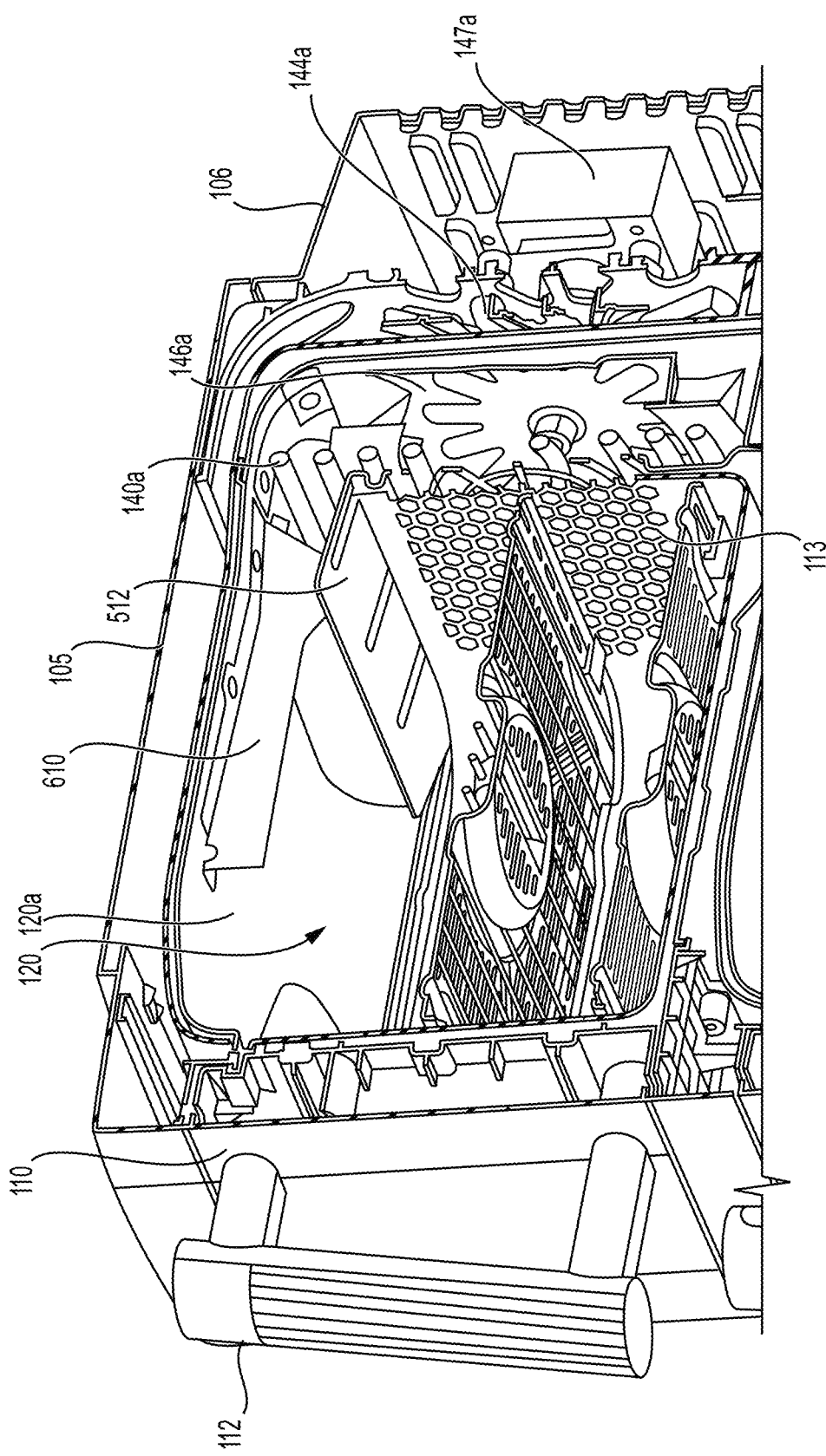
FIG. 7 is a partial perspective cross-sectional view of the cooking system of FIG. 1.
Figure 8:
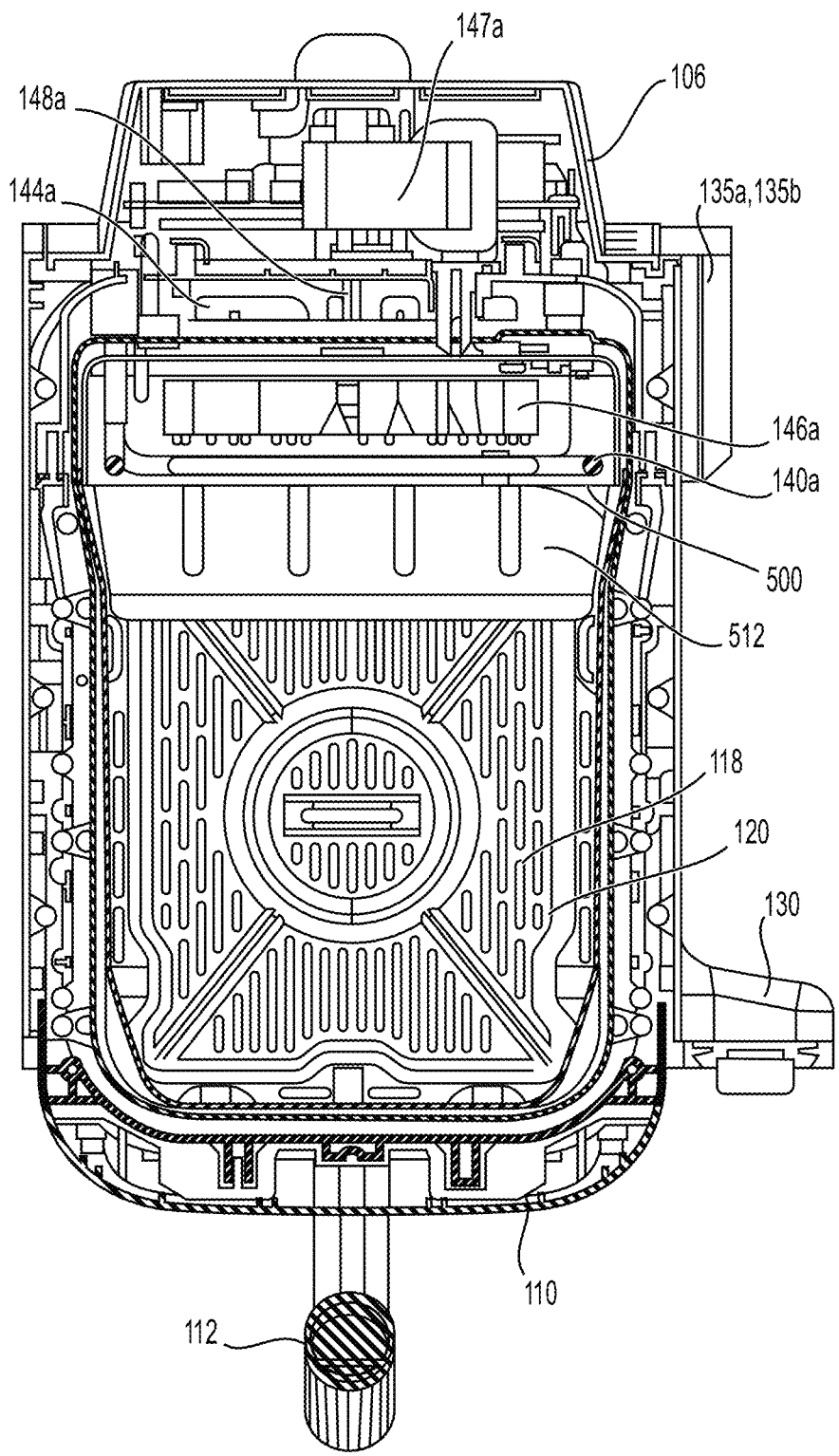
FIG. 8 is a cross-sectional view of the cooking system of FIG. 1 taken along line 8-8 in FIG. 1.
Figure 9:
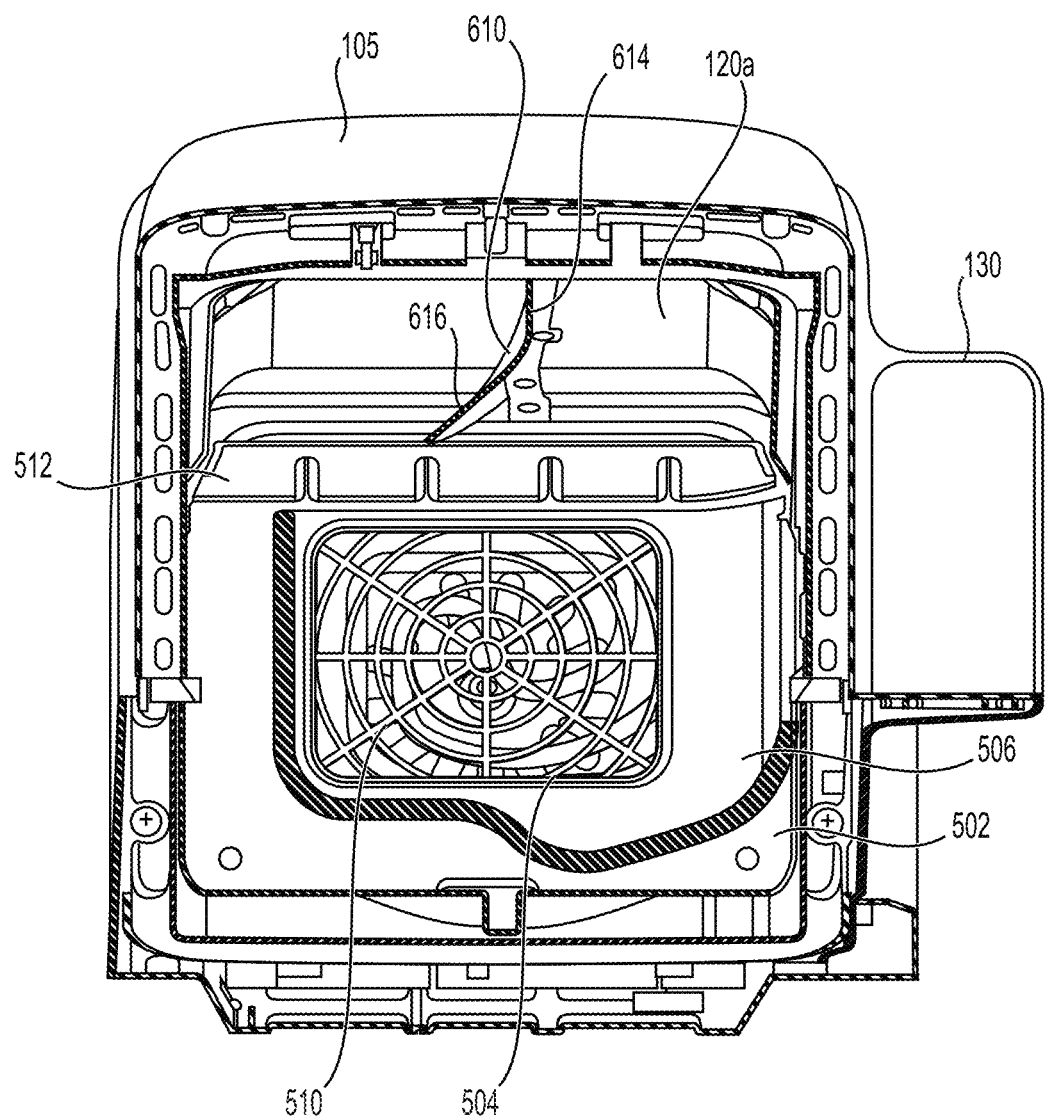
FIG. 9 is a partial perspective cross-sectional view of the cooking system of FIG. 1.

As further illustrated in FIGS. 4-6, the cooking system 100 can include first and second heating elements 140a, 140b configured to impart heat to the first and second internal volumes 120, 125, respectively during one or more modes of operation of the cooking system 100. As shown in FIG. 4, the first and second heating elements 140a, 140b are positioned within the housing 105 at a rear of the first and second internal volumes 120, 125, respectively. The first and second heating elements 140a, 140b can be configured to heat one or more food items located within the cooking volumes of the first and second cooking containers 110, 115 via conduction, convection, radiation, and/or induction. In the illustrated embodiment, the first and second heating elements 140a, 140b are convective heating elements, and the cooking system 100 additionally includes first and second air movement devices 145a, 145b, including fans 146a, 146b, operable to circulate air through the first and second internal volumes 120, 125, respectively. In some embodiments, the fans 146a, 146b can be powered by motors 147a, 147b, that can be arranged horizontally and located at a back of the housing 106. The first fan 146a, first heating elements 140a, and first container 110 can be horizontally aligned along the first insertion axis X1. Similarly, second fan 146b, second heating element 140b, and second container 115 can be horizontally aligned along the second insertion axis X2. In some embodiments, one or more vents 107 can be provided at the rear of the housing 105 for exhausting hot air generated by operation of the motors 147a, 147b to the exterior of the cooking system 100. In some embodiments, fans 146a, 146b can be variable speed fans operable at a plurality of rotational speeds. In some embodiments, the operational speed of the first and second air movement devices can vary based on the cooking mode selected. For example, the speed of the first and second air movement devices during operation in a first cooking mode may be different than the speed of the first and second air movement devices during operation in a second cooking mode. The operational speed of the first and second air movement devices may be controlled by interacting with the user interface 130 of FIG. 1, as discussed in greater detail below.

Arranged adjacent to the first and second internal volumes 120, 125 are cooling fans 144a and 144b. The cooling fan 144a shares a common driveshaft 148a with the fan 146a, and the cooling fan 144b shares a common driveshaft 148b with the fan 146b. The driveshaft 148a is powered by the motor 147a, and the driveshaft 148b is powered by the motor 147b. The cooling fans 144a, 144b are separated from the fans 146a, 146b via a rear wall 141, with the driveshaft protruding through an opening therein.

Arranged between the cooking container 110 and the heating element 140a is a shroud 500. The shroud 500 is a vertical member that extends from the bottom surface of the internal volume 120 and creates a gap G (shown in FIG. 5) between the top surface 120a of the first internal volume 120 and the overhanging portion 512 of the shroud 500, which allows air to pass from the fan 146a to the cooking volume 111. Similarly, a shroud 520 is arranged between the cooking container 115 and the heating element 140b. As explained in detail below, the shrouds 500, 502 include an overhanging portion 512, 532, which aids in directing air horizontally from the gap.

Figure 14:
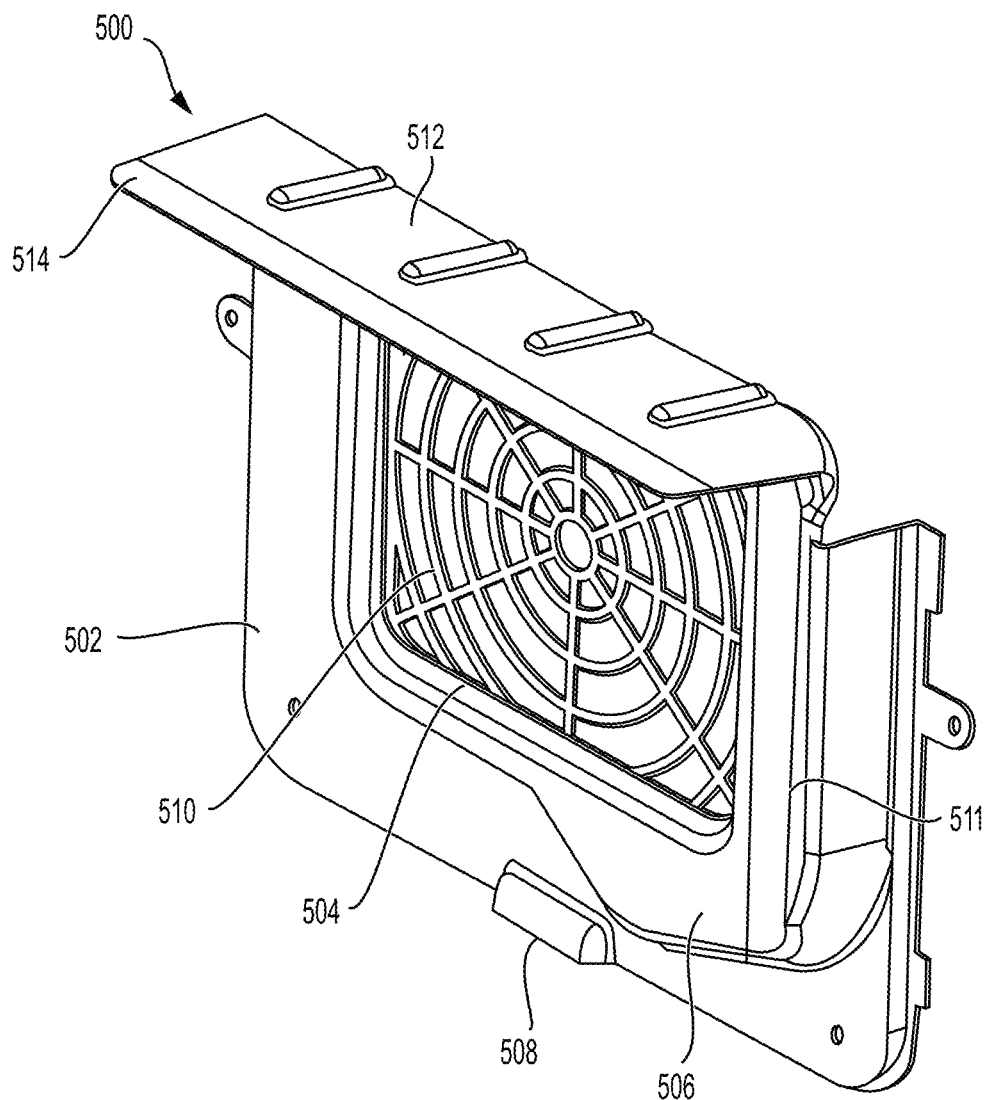
FIG. 14 is a front top perspective view of a shroud of the cooking system of FIG. 1.
Figure 15:
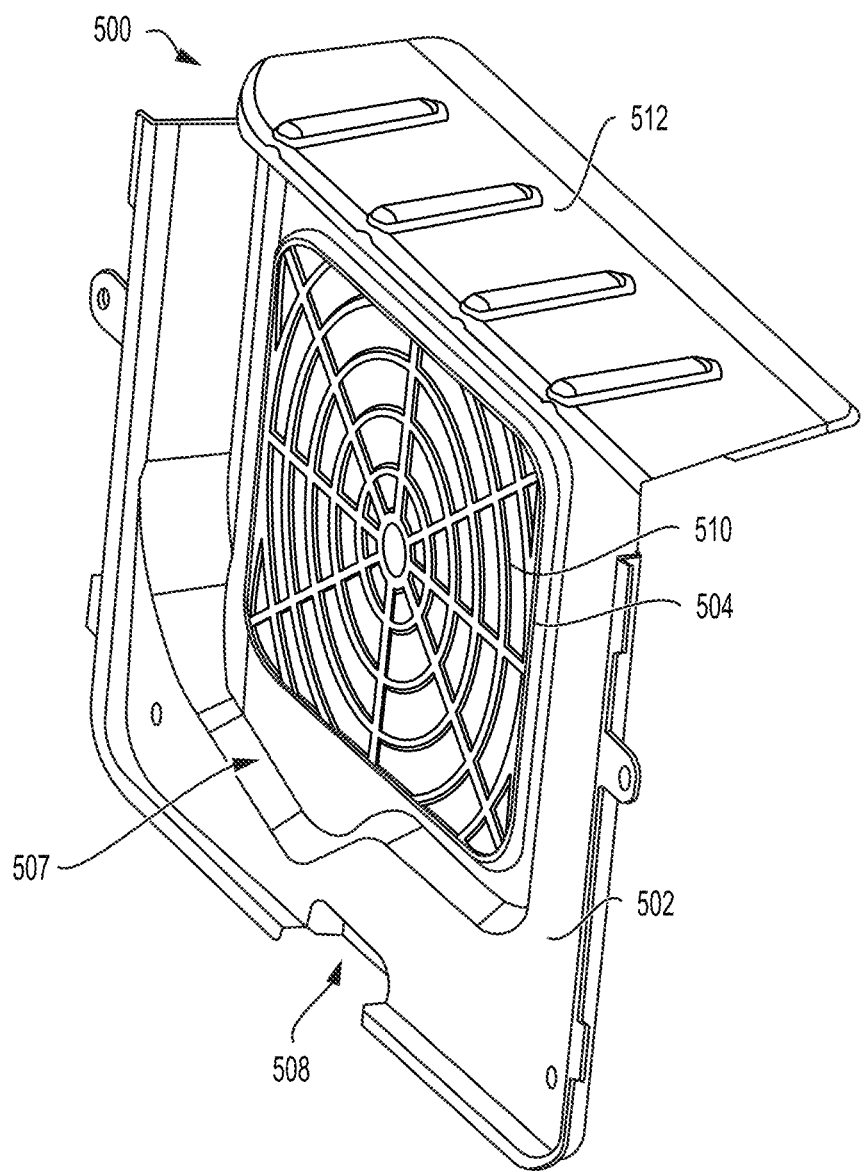
FIG. 15 is a rear top perspective view of the shroud of FIG. 14.
Figure 16:
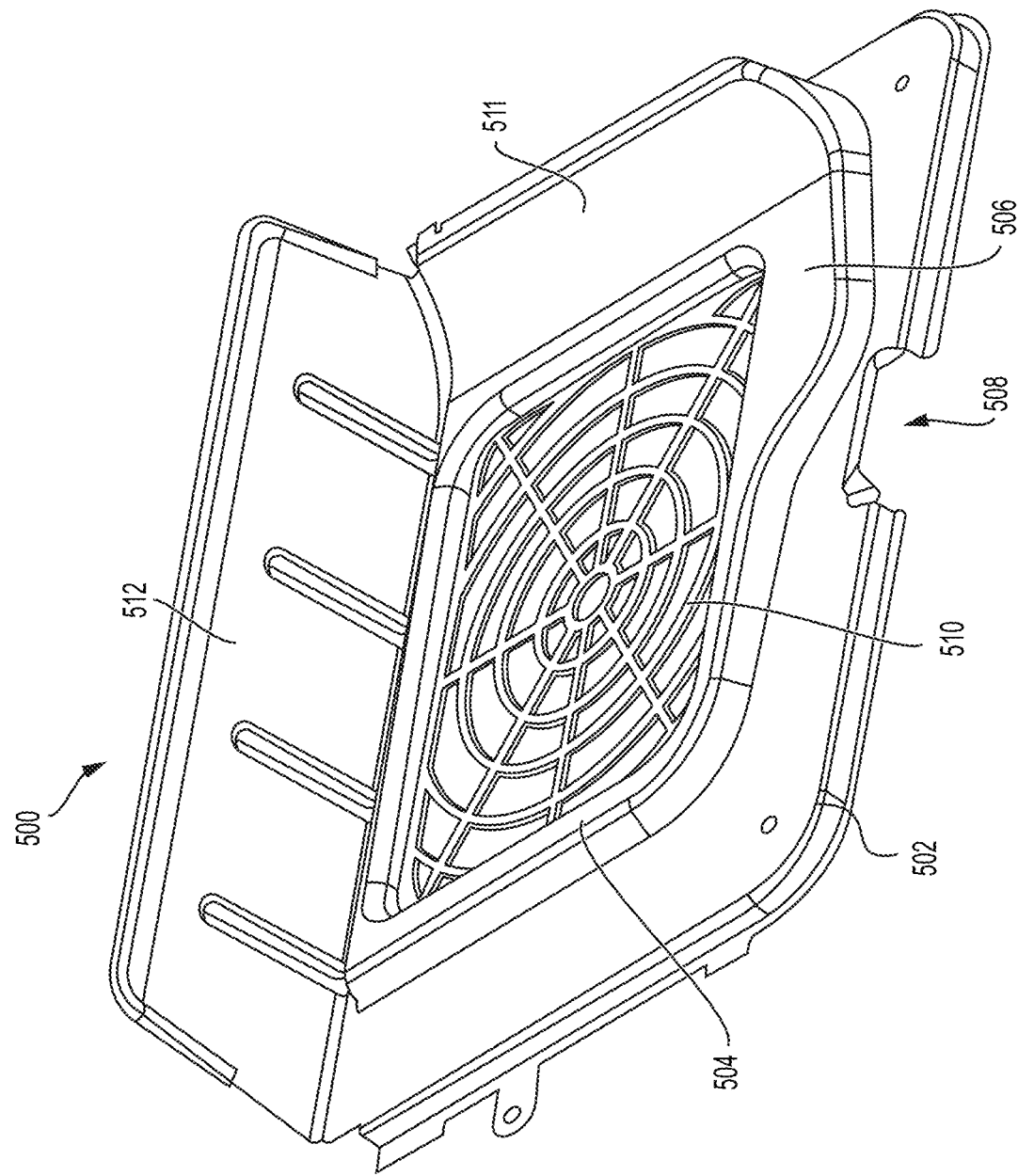
FIG. 16 is a front bottom perspective view of the shroud of FIG. 14.

As illustrated in FIGS. 14-16, the shroud 500 can be a body that includes various air directing features. The shroud 500 includes a body 502, a through-bore 504, an indent 506, a drainage port 508, a guard 510, a curved surface 511, and the overhanging portion 512. In an aspect, the guard 510 can be removed. The body 502 can be formed from stamped metal and is sized such that the bottom edge of the body 502 meets the bottom surface of the internal volume 120 to block any air flow from traveling underneath the shroud 500. The through-bore 504 is configured to serve as an air inlet to the fan 146a such that air can travel from the cooking container, 110, and through the through-bore 113 of the cooking container 110. The guard 510 is a plurality of thin segments that overlay the through-bore 504 to allow air to flow through the shroud 500, but prevent large particles from passing through the shroud 500. As stated above, the shroud 500 also includes the overhanging portion 512, which can extend over a portion of the cooking container 110. The overhanging portion 512 can also include a curved end portion 514, which aids in reducing the turbulence of air passing over the overhanging portion 512.

Referring now to FIG. 15, the indent 506 creates an air expansion chamber 507 positioned behind the shroud 500. The air expansion chamber 507 extends along the bottom portion of the shroud 500 and vertically upward along a side of the shroud 500. The air expansion chamber works in combination with the fan 146a in order to reduce back pressure and aid in compressing air into the fan 146a as it passes through a down stroke. Excess air that builds up within the air expansion chamber 507 can migrate upwards and over the top of the shroud 500. Additionally, the curved surface 511 corresponds to the outer surface of the cooking container 110 in order to maximize the volume of the air expansion chamber 507. Additionally, the shroud 500 can also increase radiative heat transfer from the heating elements 140a, 140b to the cooking container 110, 115. A small gap between the heating elements 140a, 140b and the shroud 500 aids in efficient radiant heat transfer.

Figure 20:
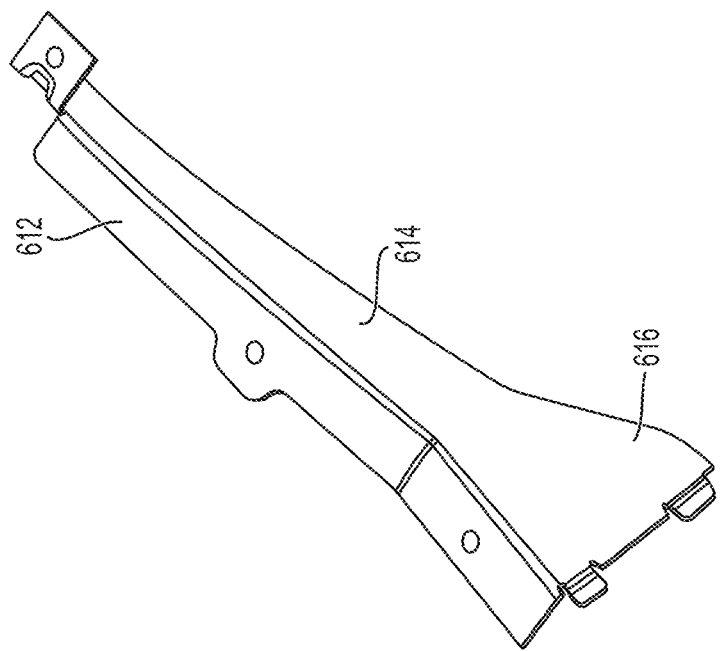
FIG. 20 is a top perspective view of the guide vane of FIG. 19.
Figure 19:
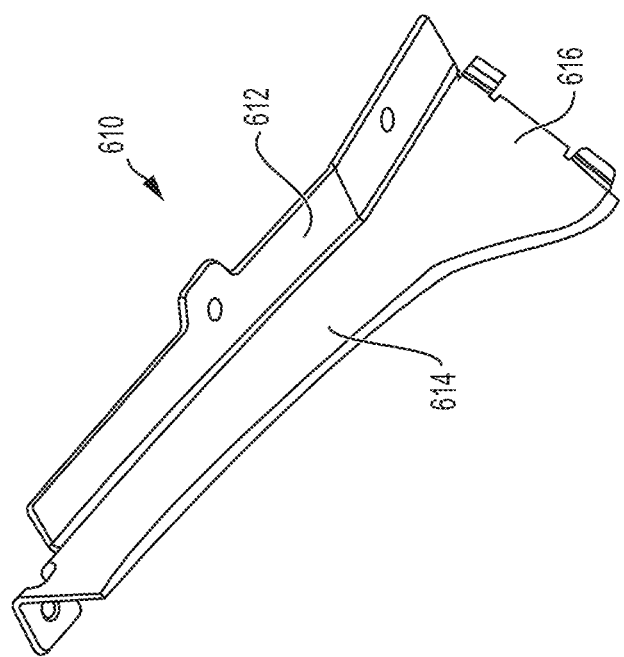
FIG. 19 is a bottom perspective view of a guide vane of the cooking system of FIG. 1.

The top surface 120a of the first internal volume 120 of cooking system 100 can include chamfers 121, which help direct air downward after it travels along the horizontal length of the cooking volume 111. In some embodiments, a top surface of the second internal volume 125 of cooking system 100 can be the same as the top surface 120a, accordingly, like components will not be described. As shown in FIGS. 5-9, the top surface 120a can include one or more guide vanes 610 extending along the top surface 120a from a rear section of the internal volume 120 to a front section of the internal volume 120. As shown in FIGS. 5 and 19-20, in some embodiments, the guide vane 610 can include a straight portion 614 and an angled portion 616. The straight portion 614 can be substantially perpendicular to the top surface 120a, and the angled portion 616 can be positioned at an acute angle relative to the top surface 120a. The guide vane 610 can also include a mounting section 612 that allows for mounting of the guide vane 610 to the upper surface 120a via rivets, bolts, screws, or any mechanical fastening mechanism.

As mentioned above, some of the airflow from the fan 146a can be configured to pass through the gap and vertically over the shroud 500 and the overhanging portion 512. However, due to the central axis of the fan (insertion axis X1) being perpendicular to the shroud 500, the airflow from the fan 146a that passes vertically over the shroud 500 can naturally flow diagonally across the top surface 120a, and adversely provide more airflow to one side of the cooking volume than the other. Accordingly, guide vane 610 can be provided to redirect the airflow from the fan 146a that passes vertically over the shroud 500 to evenly disperse the airflow across the top surface 120a, as discussed in greater detail below. In some embodiments, the guide vanes can be fin-shaped and protrude orthogonally (or at some other angle) downward from the top surface 120a. In some aspects, the one or more guide vanes can be formed integrally with the top surface 120a. In some aspects the guide vanes can be formed separately and attached and can be permanently, or removably coupled to the top surface 120a (e.g., via a welded or a bolted connection, respectively).

Figure 10:
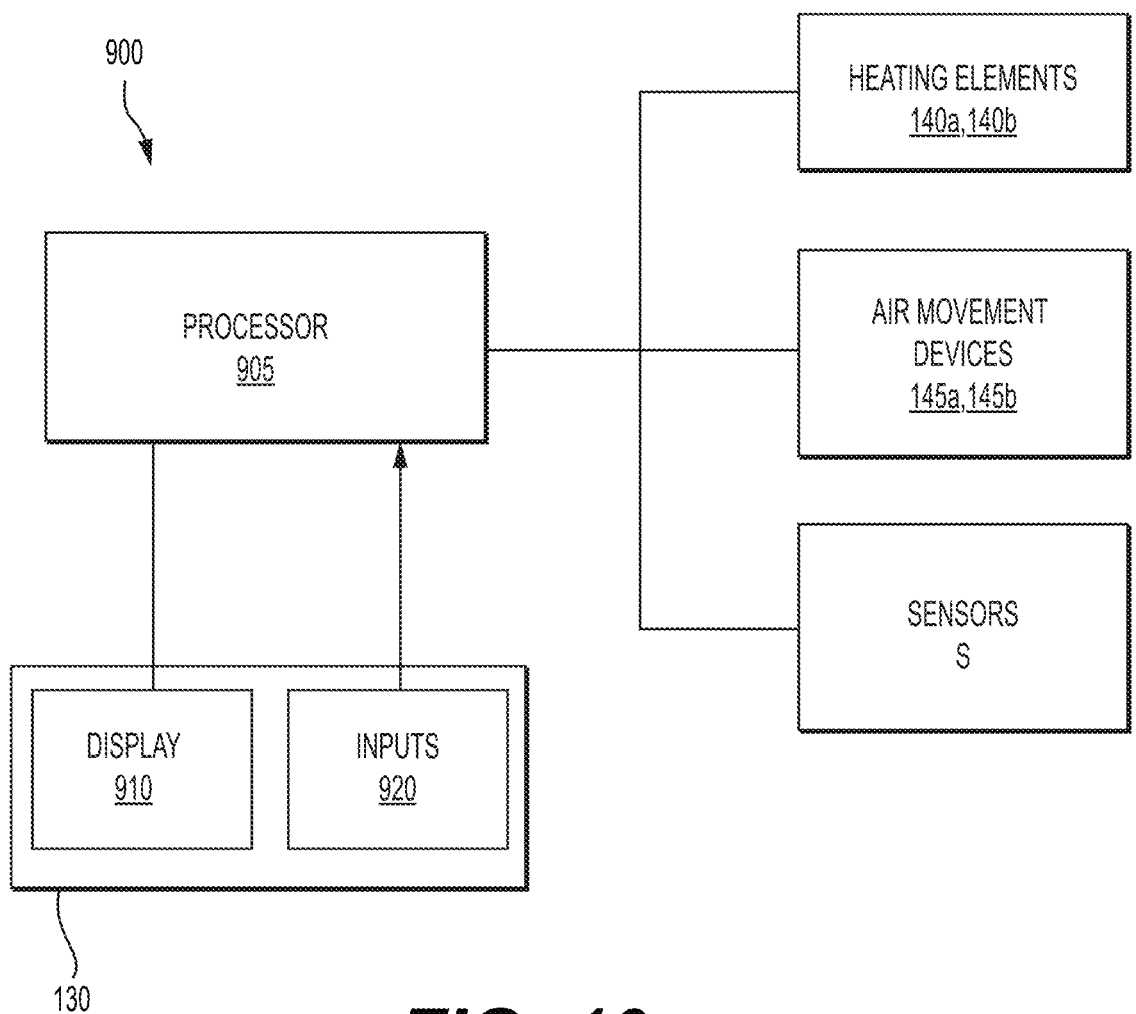
FIG. 10 is a schematic illustration of a control system for the cooking system of FIG. 1.

FIG. 10 illustrates an exemplary embodiment of a control system 900 for a cooking system as described herein with reference made to cooking system 100 of FIG. 1. In some embodiments, the control system 900 can include a controller or processor 905 for controlling operation of the heating elements 140a, 140b and air movement devices 145a, 145b, and in some embodiments for executing stored sequences of a cooking operation. The processor 905 is operably coupled to the UI 130, the heating elements 140a, 140b, air movement devices 145a, 145b, and optionally a sensor 915 (e.g., a temperature sensor). In some embodiments, the UI 130 can include a display 910 and one or more inputs 920 associated with energizing the heating elements 140a, 140b of the cooking system 100 and for selecting various modes of operation of the cooking system 100. One or more of the inputs 920 can include a light or other indicator to show that the respective input has been selected.

In one embodiment, at least one input 920 on the UI 130 is an on/off button which allows the user to activate or deactivate the UI 130. When the UI 130 is deactivated, the one or more heating elements 140a, 140b are not energized and the entire cooking system 100 is turned off. In an exemplary embodiment, the at least one input 920 is operable to select one or more manual modes of operation of the heating elements 140a, 140b, e.g., allowing the user to control the temperature and/or time of a cooking operation. For example, a user may be able to enter a time associated with operation of the cooking system 100 in a manual mode. The time may be entered via the same input 920 or a separate input 920 as used to select a mode of operation. Alternatively, or in addition, at least one input 920 is operable to select a stored sequence of operation. In some cases, the stored sequences may be particularly well suited for a given method of food preparation and/or for particular ingredients or types of ingredients. The plurality of stored sequences associated with the at least one input 920 may be stored within a memory accessible by the processor 905. Alternatively, the plurality of stored sequences may be stored remotely from the cooking system 100, and may be accessed by the processor 905, such as via wireless communication. The display 910 can also be configured to indicate a time remaining during any cooking operation. Temperature or other parameters may also be entered via inputs 920 and/or shown on the display 910.

The at least one input 920 may include a distinct start button intended to initiate operation in a desired mode, a distinct stop button to cease all operation, or a stop/start button intended to initiate and cease functions. The cooking system 100 can also or alternatively be operable to automatically start operation after a predetermined time has elapsed once an input 920 has been selected and any necessary information has been provided to the UI 130. Alternatively or in addition, one or more of the other inputs 920 may be operable to start and stop operation of the cooking system 100, regardless of whether the cooking system 100 is following a stored sequence or is in a manual mode.

As previously noted, the one or more inputs 920 may be operable to initiate operation of the cooking system 100 in a plurality of cooking modes. In one embodiment, the cooking system 100 is operable in a cooking mode where the heating elements 140a, 140b are employed to perform a non-contact heating operation, such as a convective or radiative heating operation. Suitable cooking operations that may be performed in this first cooking mode include, but are not limited to, air frying, broiling, baking/roasting, and dehydrating.

Figure 11:
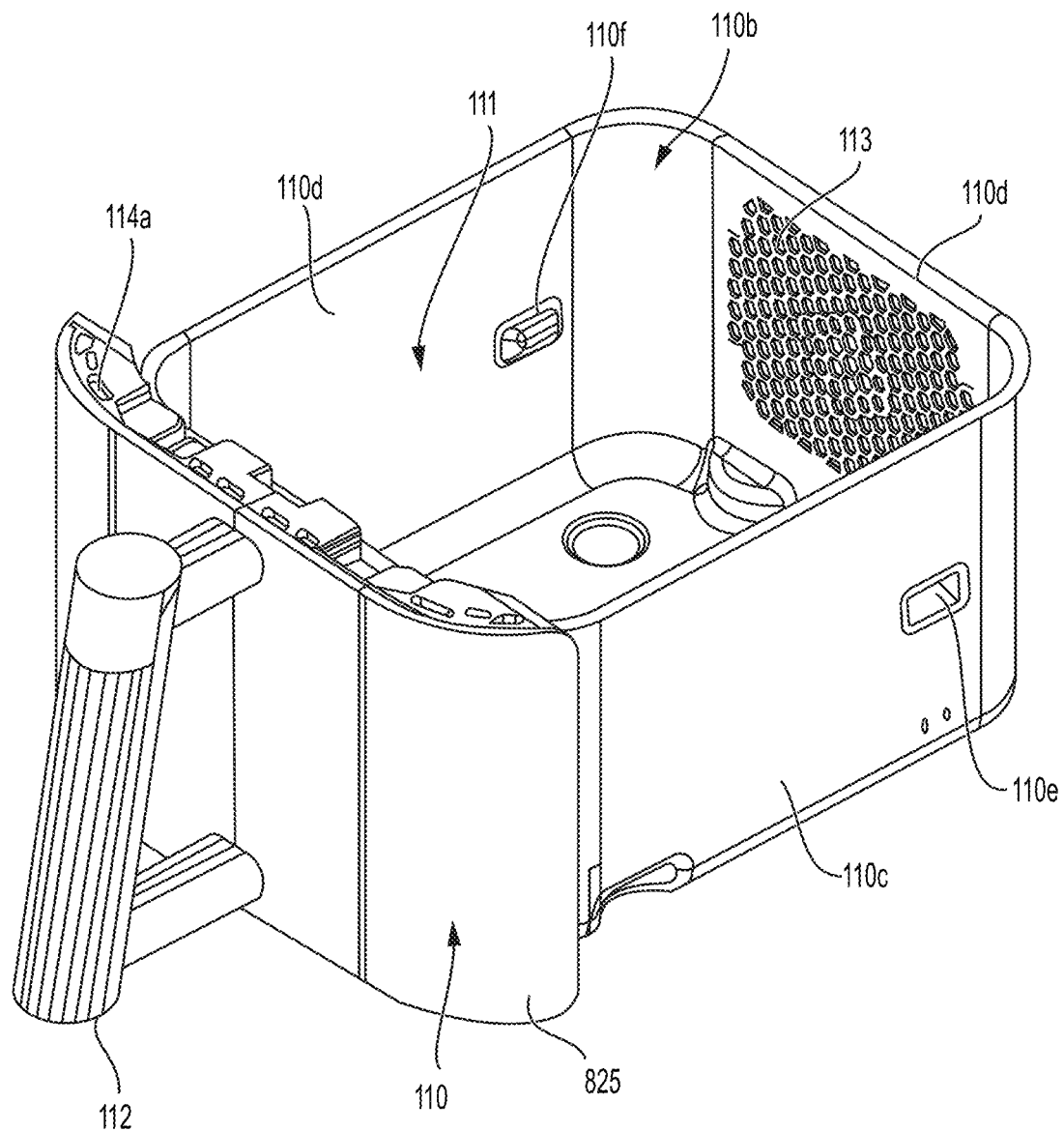
FIG. 11 is a front top perspective view of a cooking container of the cooking system of FIG. 1.
Figure 12:
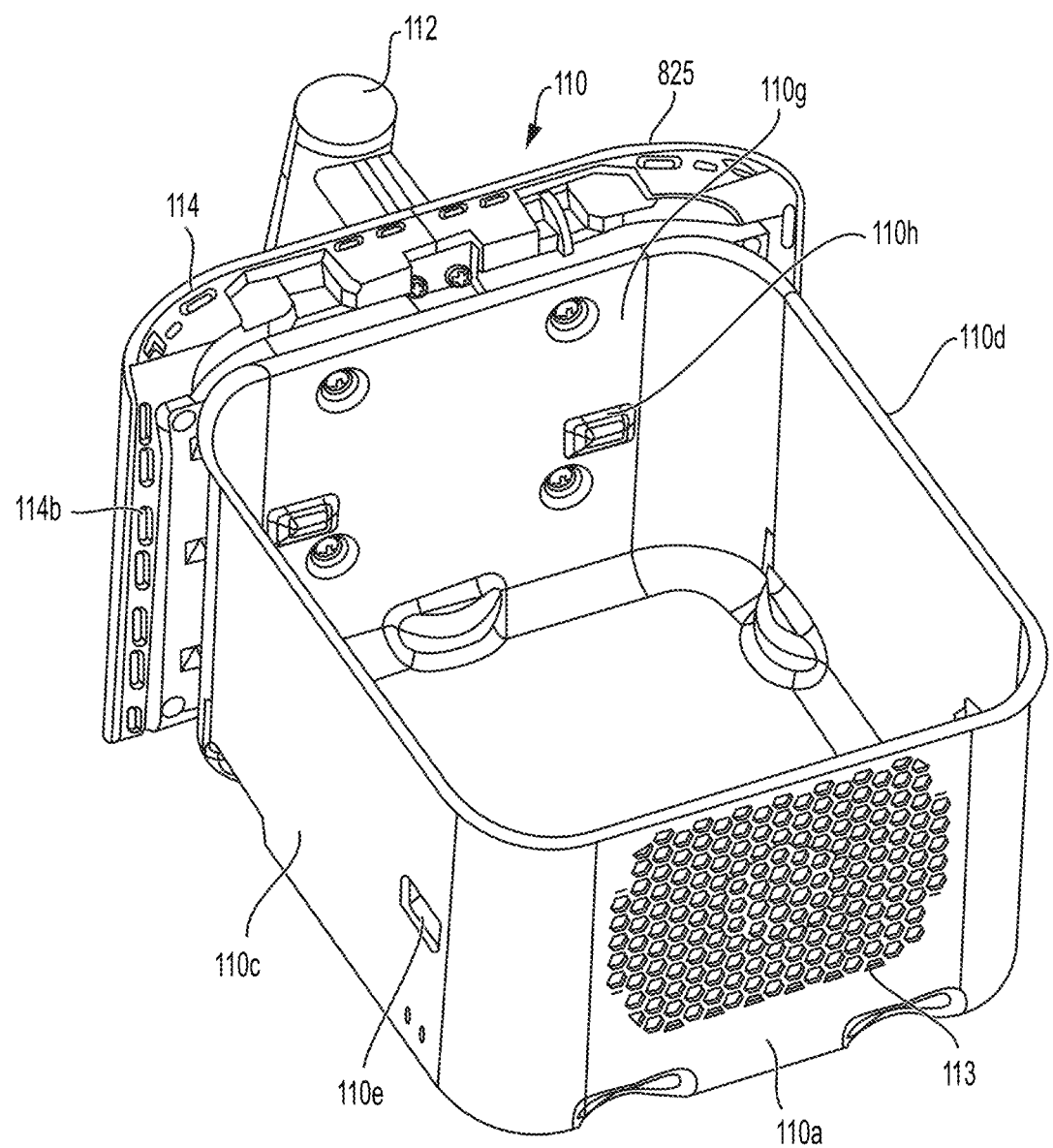
FIG. 12 is a rear top perspective view of the cooking container of FIG. 11.
Figure 13:
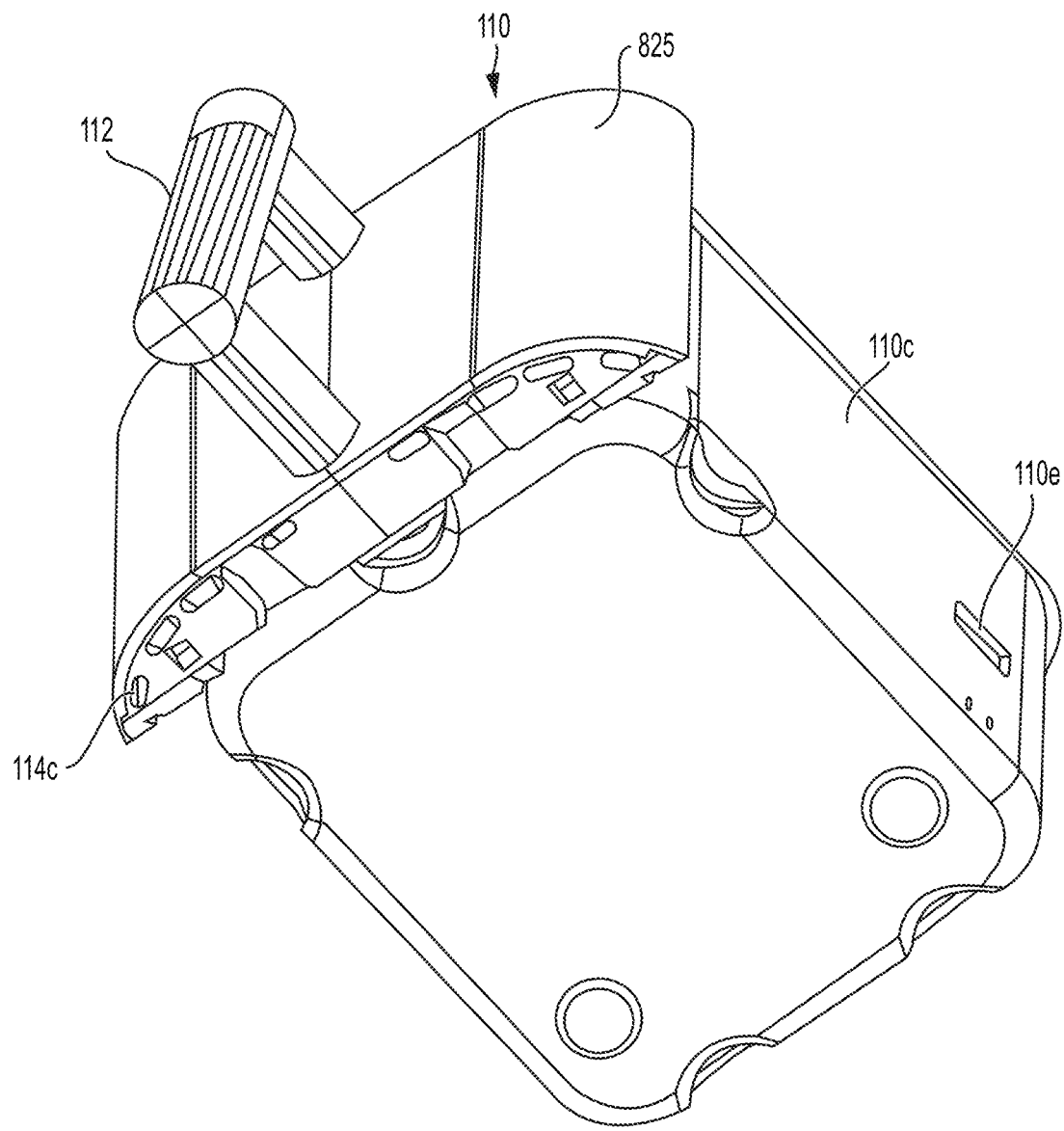
FIG. 13 is a bottom perspective view of the cooking container of FIG. 11.

FIGS. 11-13 illustrate the cooking container 110. As stated above, the cooking container 110 is positioned within the internal volume 120. The cooking container 110 includes a rear wall 110a having through-bores 113 arranged therein in order to allow air to pass back to the heater and air movement device. Additionally, the cooking container 110 also includes an open top 110b, which allows air from the guide vanes to enter the cooking container and pass over a food load therein. Similarly, the cooking container 115 includes a rear wall having through-bore. The cooking container 110 can be substantially similar to cooking container 115, and cooking container 110 is also representative of cooking container 115. The cooking container also includes side walls 110c, 110d, and front wall 110g. Projections 110e, 110f, and 110h are arranged on the sidewalls 110c, 110d, and front wall 110g in order to allow for vertical stacked positioning of perforated plates 118 (shown in FIG. 4) so multiple layers of food can be cooked simultaneously. The cooking container 110 also includes a front housing 825 positioned between the handle 112 and the front wall 110g. The front housing 825 includes air inlet openings 114a, 114b arranged about the top and sides of the front housing 825 to allow air from a cooling channel to pass therethrough. The front housing 825 is hollow, and includes a cool air channel extending from the air inlets 114a, 114b to an air outlet 114c arranged on the bottom of the front housing 825.

Figure 17:
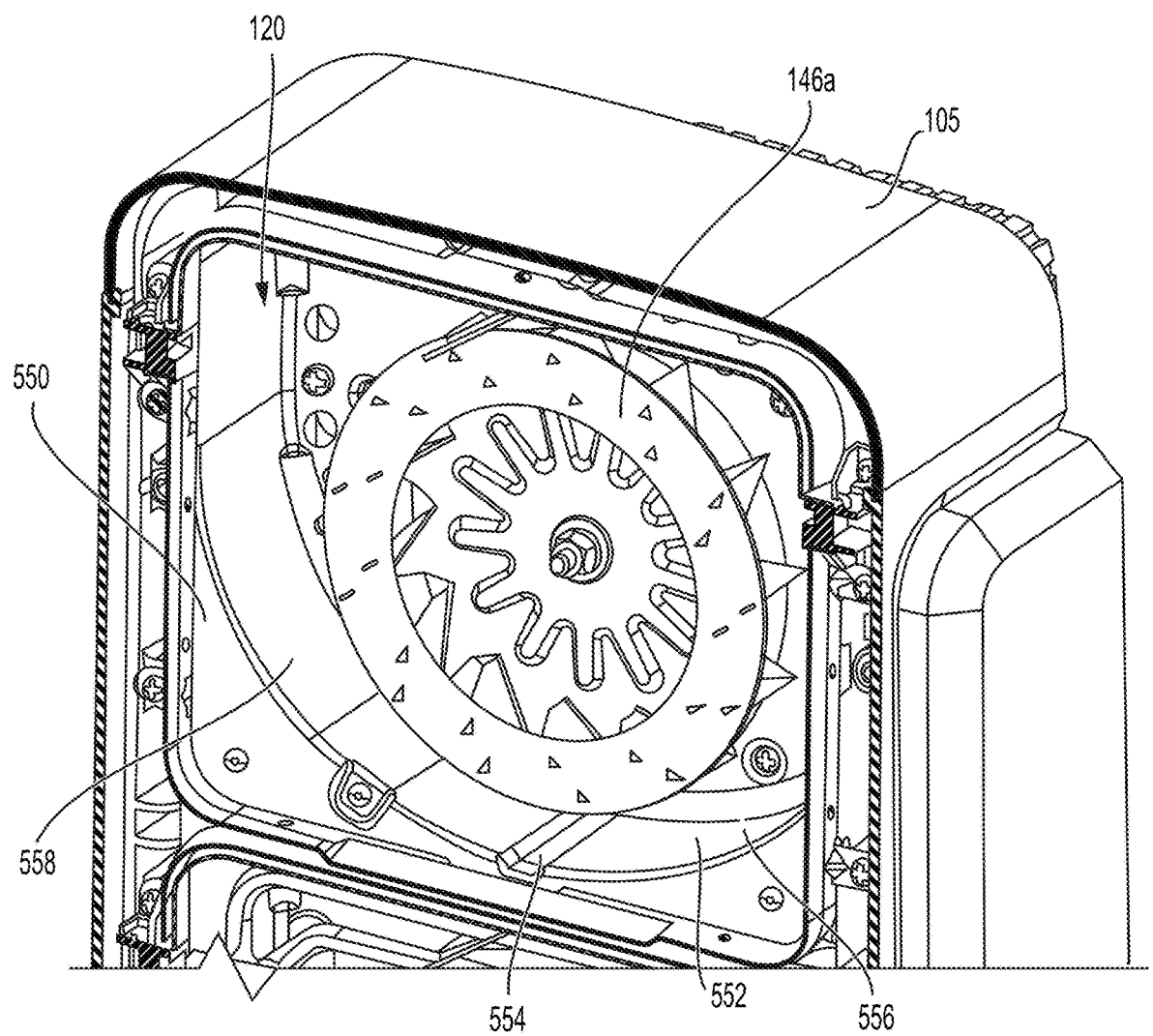
FIG. 17 is a perspective cross-sectional view of the cooking system of FIG. 1 with the heating element removed.
Figure 18:
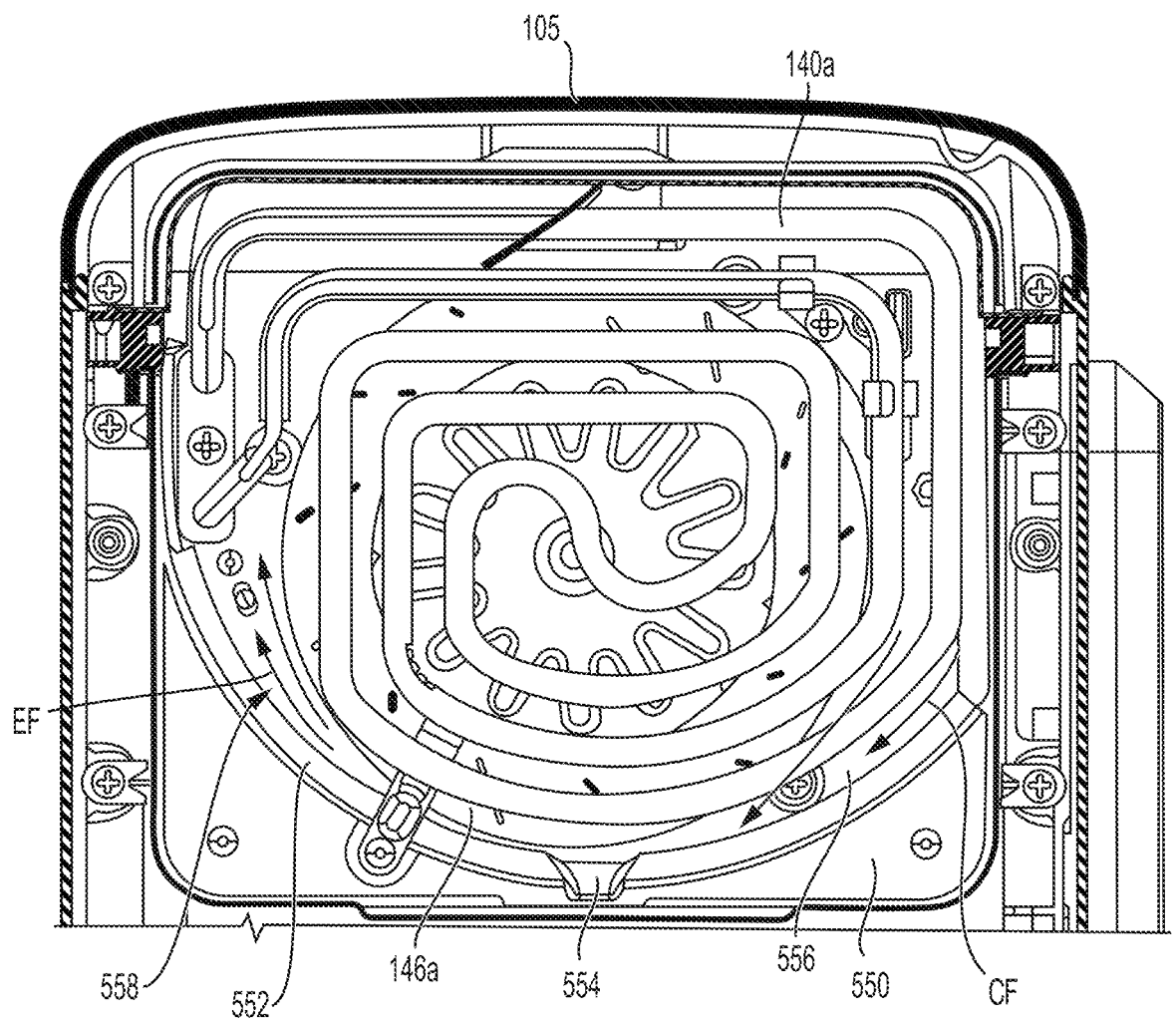
FIG. 18 is a front cross-sectional view of the cooking system of FIG. 1.

Referring now to FIGS. 17-18, a volute 550 is positioned within the internal volume 120. The volute 550 includes a curved surface 552 and, optionally, a drainage channel 554. The curved surface 552 is positioned adjacent to and vertically below the fan 146a. Due to the position of the fan 146a relative to the curved surface 552, the volute creates a compression chamber 556 on a right side of the fan 146a, and an expansion chamber 558 on the left side of the fan 146a. As the fan 146a rotates in a clockwise direction, the volute 550 helps direct air into the fan 146a at the compression chamber 556 as the air is moved by the fan 146a through the compression chamber 556 (as shown by compression flow arrows CF). As the air enters into the expansion chamber 558, the air can expand (shown by expansion flow arrows EF), creating a greater volumetric flow and reduction in turbulence of the air, which will then travel over the shroud 500. The second internal volume 125 also includes a similar volute arranged in an identical matter.

Figure 22:
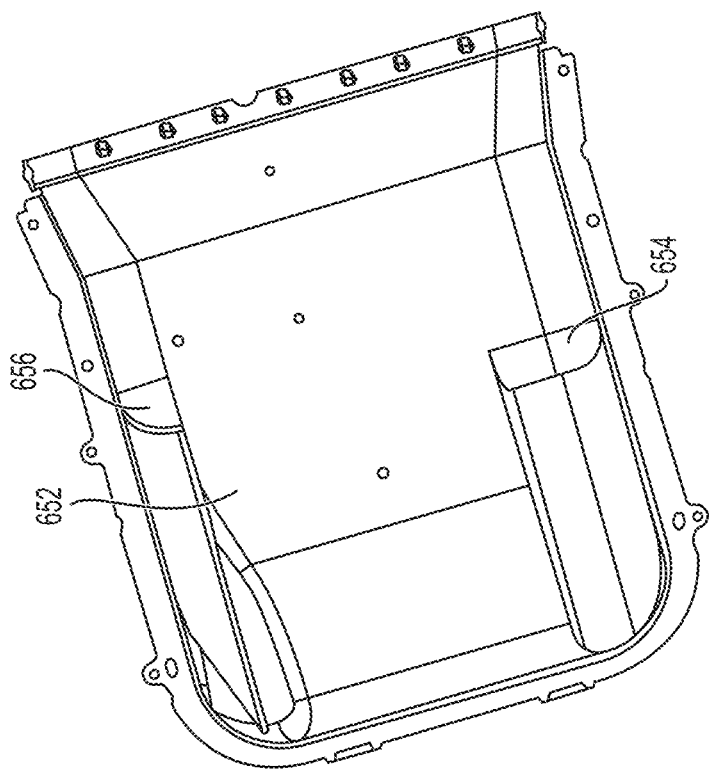
FIG. 22 is a bottom perspective view of the cooking chamber top plate of FIG. 21.
Figure 21:
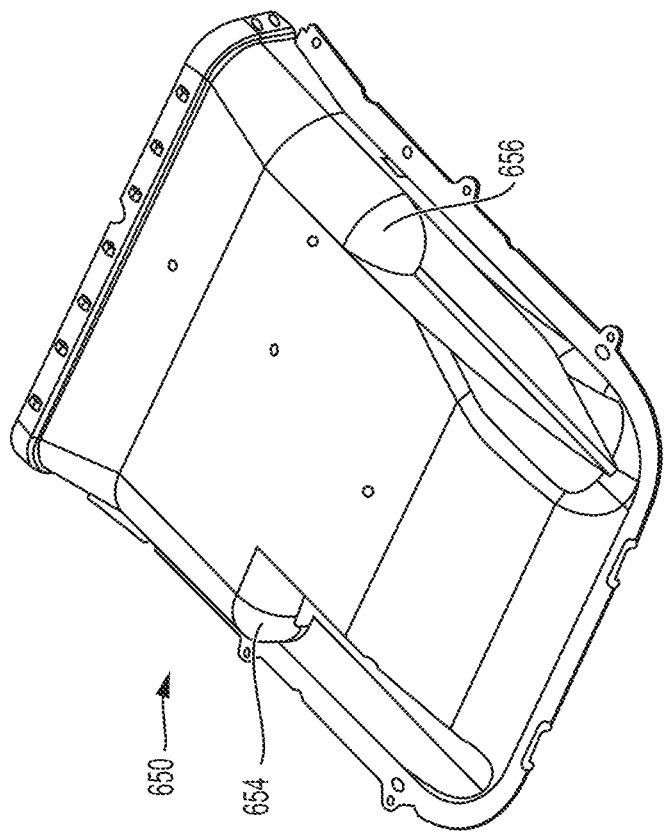
FIG. 21 is a top perspective view of an embodiment of a cooking chamber top plate for use with the cooking system of FIG. 1.
Figure 23:
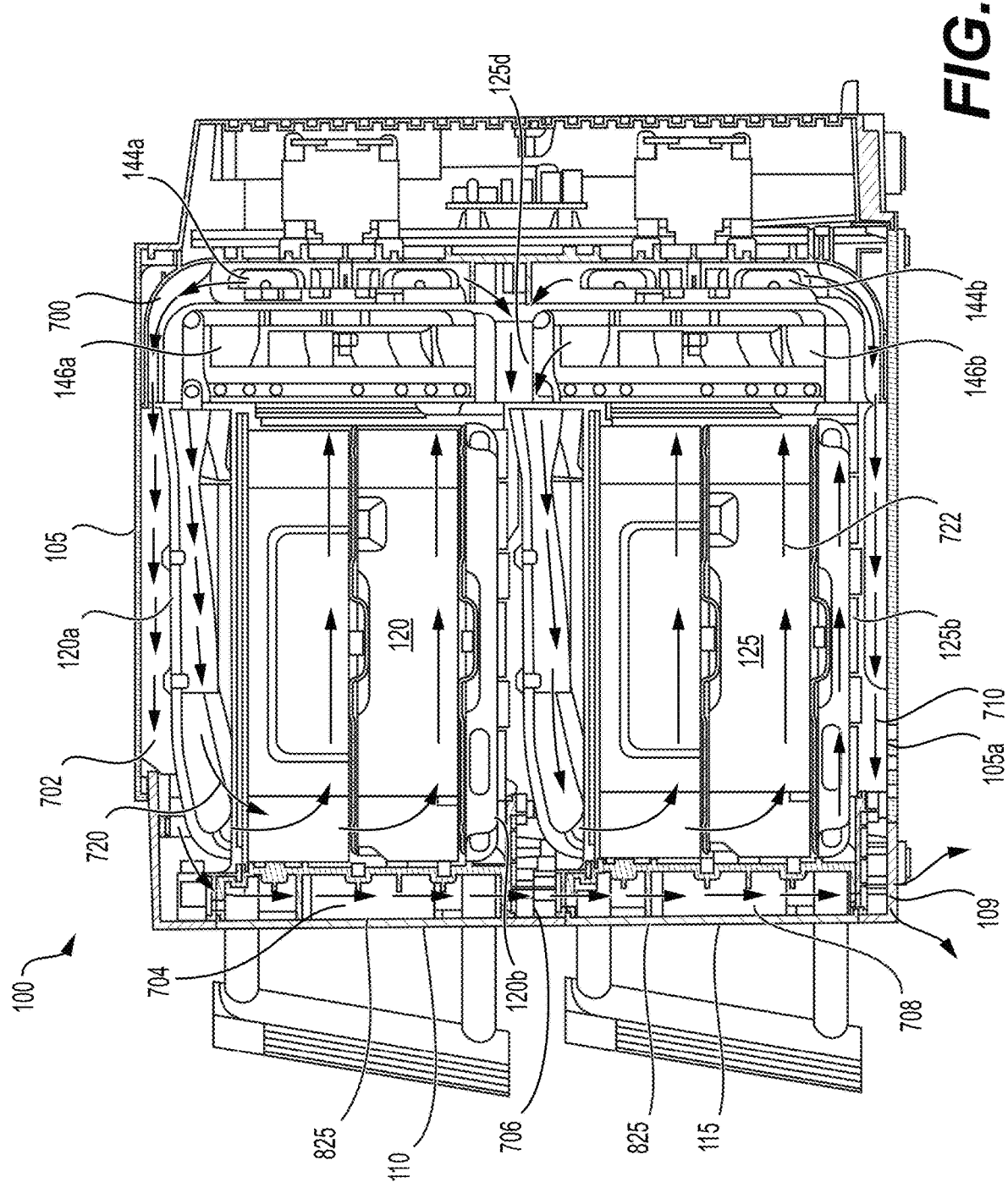
FIG. 23 is a cross-sectional view of the cooking system of FIG. 1 taken along line 4-4 in FIG. 1 depicting the flow of cooling air through the cooking system.
Figure 24:
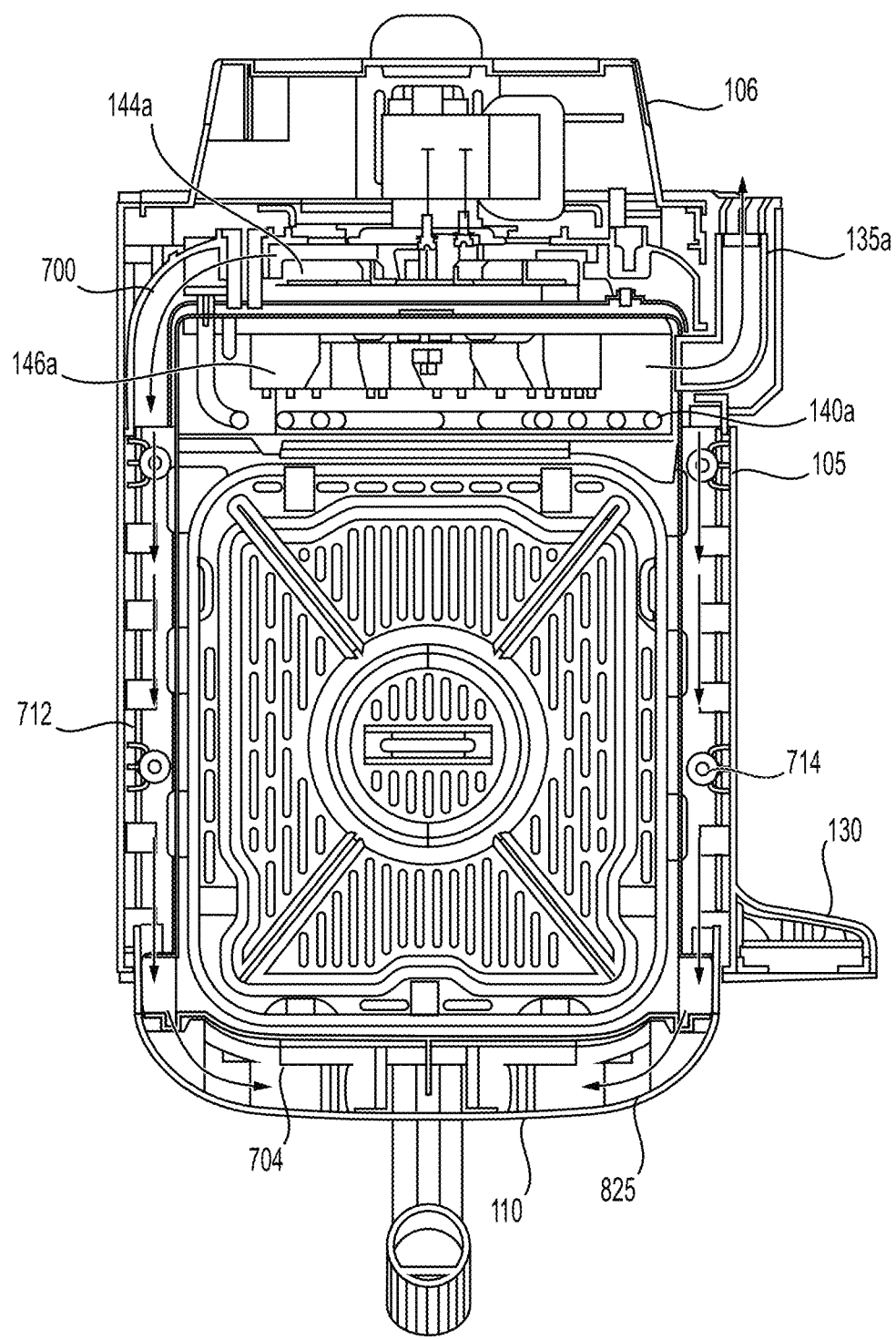
FIG. 24 is a cross-sectional view of the cooking system of FIG. 1 taken along line 24-24 in FIG. 1.

Referring now to FIGS. 21-22, the internal volumes 120, 125 can also include an upper shell 650 that includes directional indents 654, 656. The indents 654, 656 are arranged on opposite sides of the upper shell 650, and can be arranged at different longitudinal lengths along the upper shell 650. The indents 654, 656 are configured to direct a portion of the horizontal air moving over the shroud 500 downward into the cooking containers 110, 115 prior to traveling along the entire length of the internal volumes 120, 125. A center portion of the horizontally moving air can bypass the indents 654, 656 and travel along the full horizontal length of the internal volumes 120, 125 (as shown in FIG. 23 as arrows 720, 722). As shown in FIG. 23, the airflow 720, 722 passes along the horizontal length of the cooking volume, and then is deflected downward at the end of the cooking volumes 120, 125 opposite the heating elements. The airflow 720, 722 passes through the upper cooking layers formed by perforated plates 118 positioned within the cooking containers 110, 115. The airflow then passes horizontally over the perforated plates 118 and returns to the fans 146a, 146b. This enables dual layer cooking within a single cooking container 110, 115, where vertically spaced food products can be cooked simultaneously, doubling the capacity of the cooking containers. By passing the heated air above the food volume prior to directing the airflow downward and into the cooking containers, the full volume of the airflow can be directed over the entirety of the food product. Additionally, the air flow can be directed horizontally through the cooking volume using vanes, which help increase horizontal flow. As discussed below in more detail, baffles formed through indents in the top surface of the cooking volume can be used to direct at least a portion of the horizontal air downward into the cooking container in order to more evenly distribute the heated air along a food product. The baffles can be arranged at least partially along the length of the cooking container such that a portion of the heated air does not travel the full length of the cooking volume.

As described above, the user interface 130 includes inputs 920. In an aspect, the inputs 920 can include a "dual layer" function, which can alter the control logic of the cooking system 100 in order to properly cook the increased food load when using a dual layer configuration. For example, if a food product in a single layer configuration was to be cooked at 350° F., the processor can calculate an increased temperature to operate the heating elements 140a, 140b in order to properly cook the larger food load in a dual layer configuration. This would allow for a dual layer cooking process to mirror a single layer cooking process without a user having to perform calculations for increased temperature and cook time. In some aspects, the processor 905 adjusts the temperature internally in the chamber to the maximum allowable 450° F. to help cook the larger volume of food when in a dual layer configuration.

In some aspects, the two cooking zones can share power in a dual zone configuration due to power draw limitations. For example, the power sharing logic cycles power between the upper and lower cooking zones every 16 seconds. However, additional cycle times can be used, such as cycling between cooking zones every 5 minutes.

As stated above, the fans 144a, 144b generate an airflow within a cooling channel in order to insulate the outer housing 105 from the heat generated during a cooking process. As shown in FIG. 23, the cooling channels are arranged between the upper surfaces 120a, 125a, bottom surfaces 120b, 125b, and the outer housing 105. A cooling channel 700 is arranged at the rear of the housing 105 and is where the fans 144a, 144b are arranged. The cooling air flow generated by the fans 144a, 144b is then sent both upward and downward through a plurality of cooling channels arranged on the top, bottom, left, and right or the internal volumes 120, 125. A cooling channel 702 is arranged above the upper surface 120a. A cooling channel 704 is positioned to receive the air from the cooling channel 702 and direct it downward through the front housing 825 of the cooking container 110. A cooling channel 706 is positioned between the internal volumes 120, 125, and is defined by the bottom surface 120b and the upper surface 125a. The cooling channel 706 receives a cooling air flow from the cooling channel 700, and also from the cooling channel 704. A cooling channel 708 is arranged within the front housing 825 of the cooking container 115, and receives cooling air from the cooling channel 706. The air leaving the cooling channel 709 is then exhausted form the housing 105 through the outlet 109 arranged at the base of the housing 105. Additionally, a cooling channel 710 is positioned below the bottom surface 125b and the base 105a. The air from the cooling channel 710 is also exhausted through the outlet 109.

Figure 25:
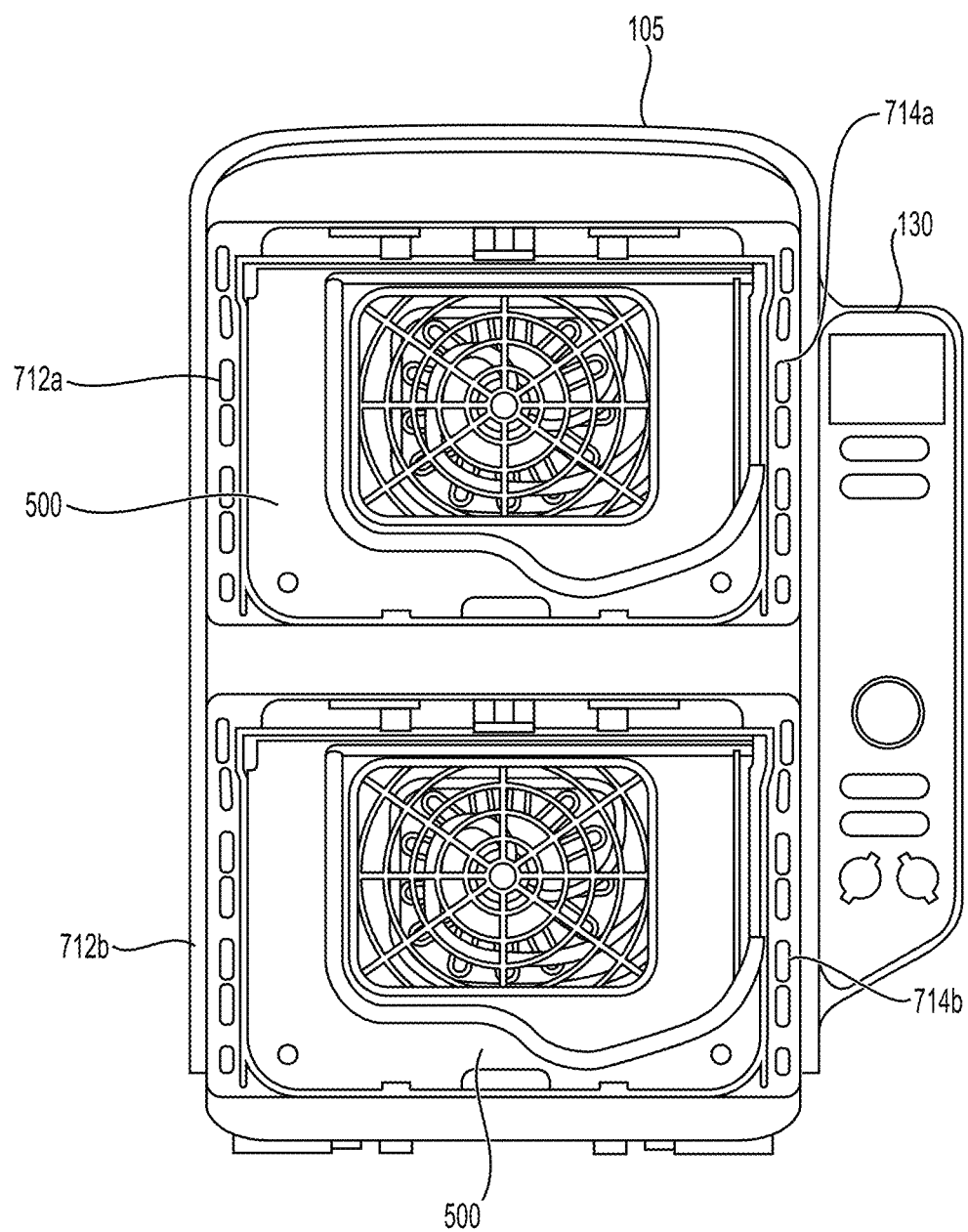
FIG. 25 is a front view of the cooking system of FIG. 1 with the cooking containers removed.

In addition to the vertically arranged cooling channels, side cooling channels are also positioned to insulate the sides of the housing 105. A cooling channel 712 is positioned on the left side of the housing 105, and receives cooling air from cooling channel 700. Additionally, a cooling channel 714 is arranged on the right side of the housing 105, and also receives air from the cooling channel 700. Both the cooling channels 712, 714 deposit air into the cooling channels 704, 706, and 708, which direct the air to the outlet 109. The connection between the cooling channels 712, 714 and the cooling channels 704, 708 are through the outlets 712a, 712b, 714a, 714b (shown in FIG. 25), which allow the air to flow into the front housing 825 when the cooking container 110, 115 are positioned within the housing 105.

Figure 26:
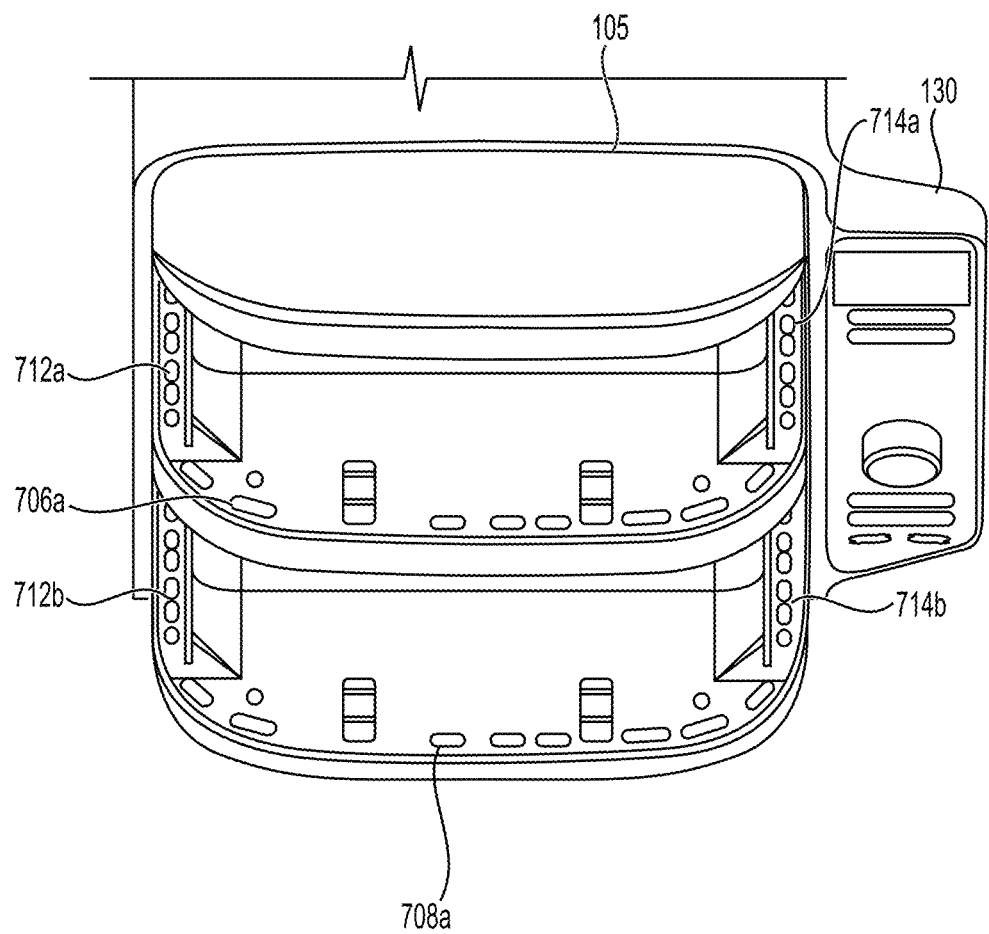
FIG. 26 is a top perspective view of the cooking system of FIG. 25.
Figure 27:
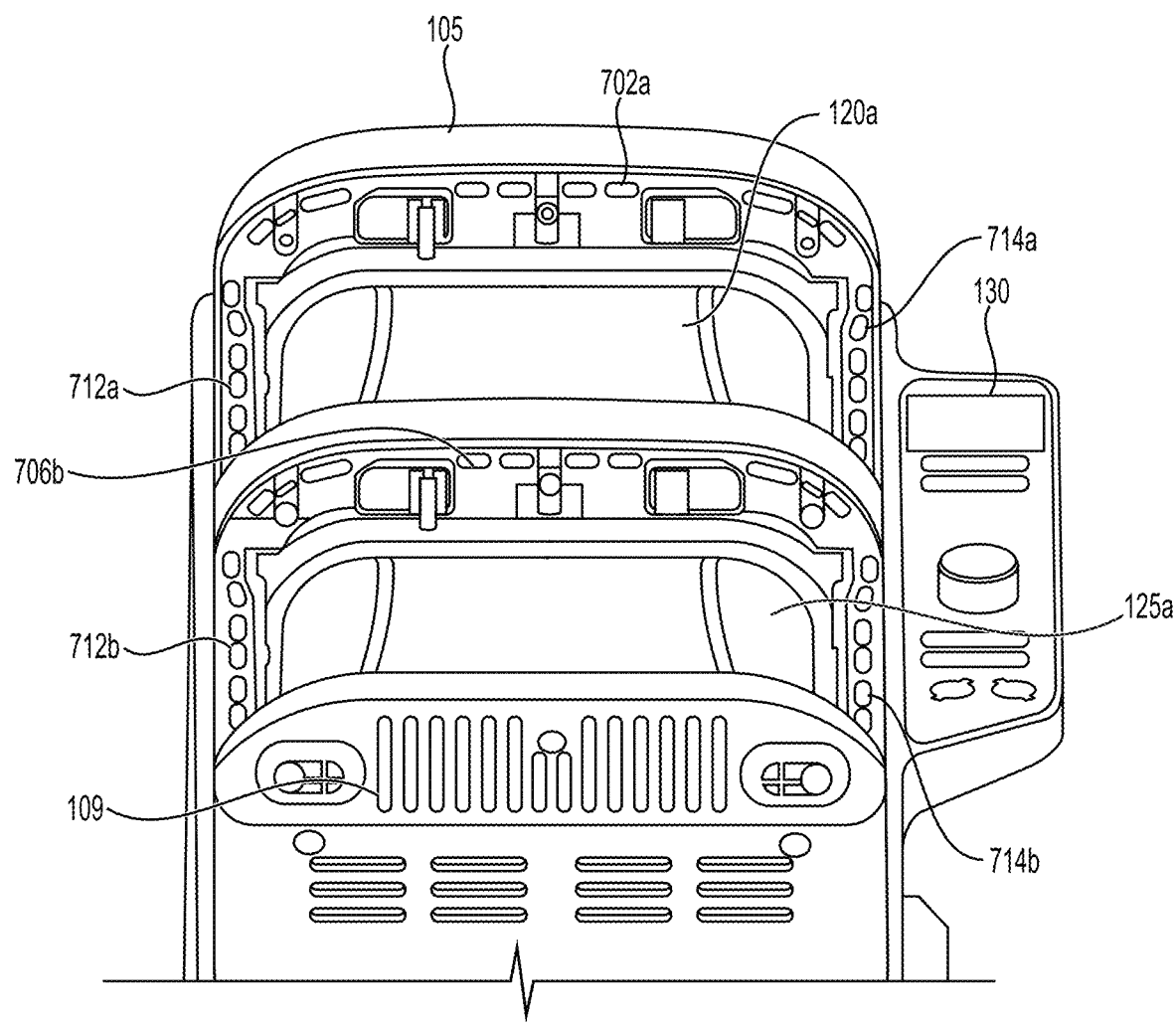
FIG. 27 is a bottom perspective view of the cooking system of FIG. 25.

Additionally, as illustrated in FIGS. 26-27, the cooling channel 702 includes an outlet 702a which allows air to travel from the cooling channel 702 to the cooling channel 704. The cooling channel 706 also includes an inlet 706a configured to receive air from the cooling channel 704, and an outlet 706b configured to direct air into cooling channel 708. An inlet 708a is positioned at the bottom of the housing 105 to receive the air from the cooling channel 708.

Figure 28:
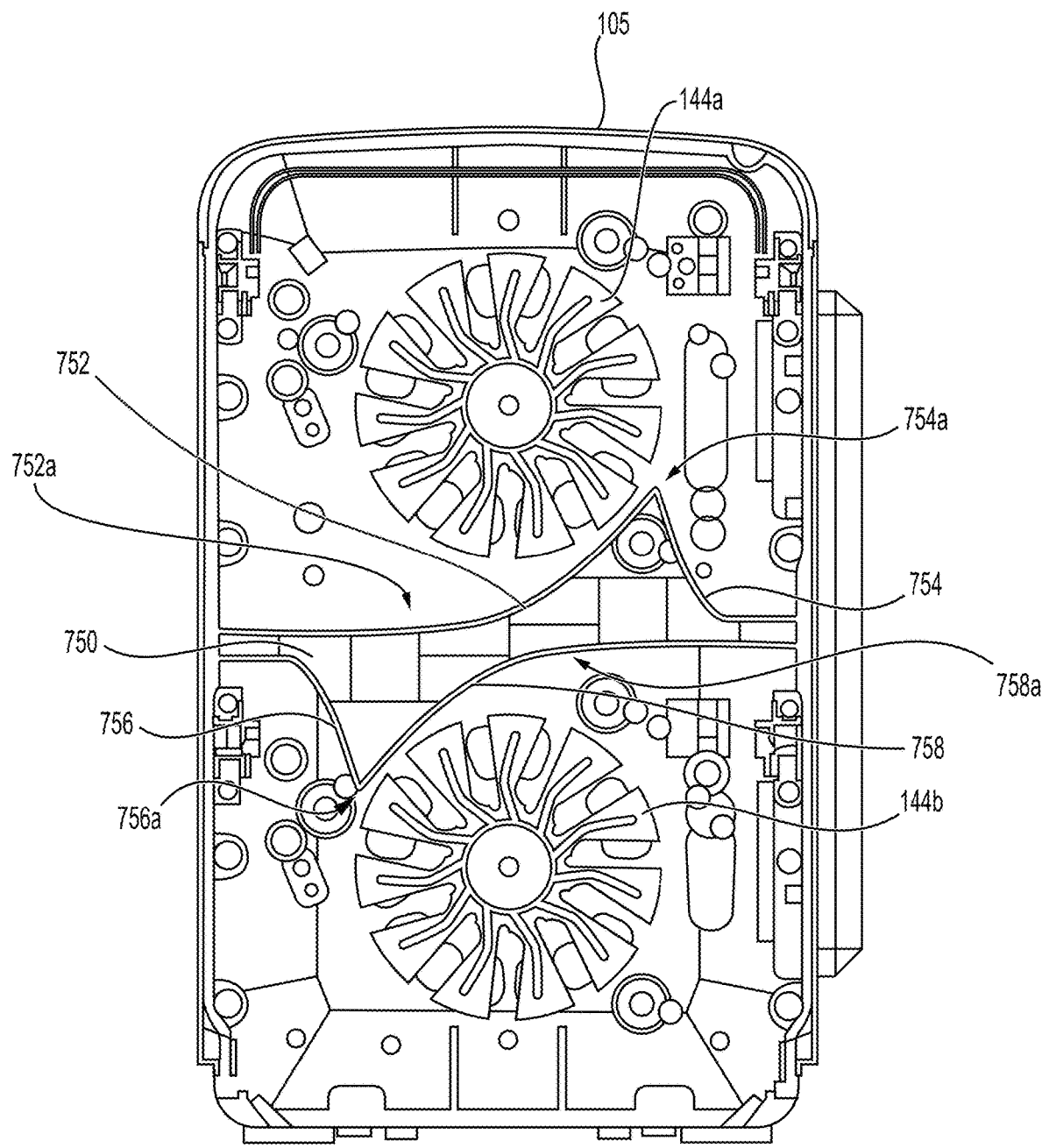
FIG. 28 is a cross-sectional view of the cooking system of FIG. 1.
Figure 29:
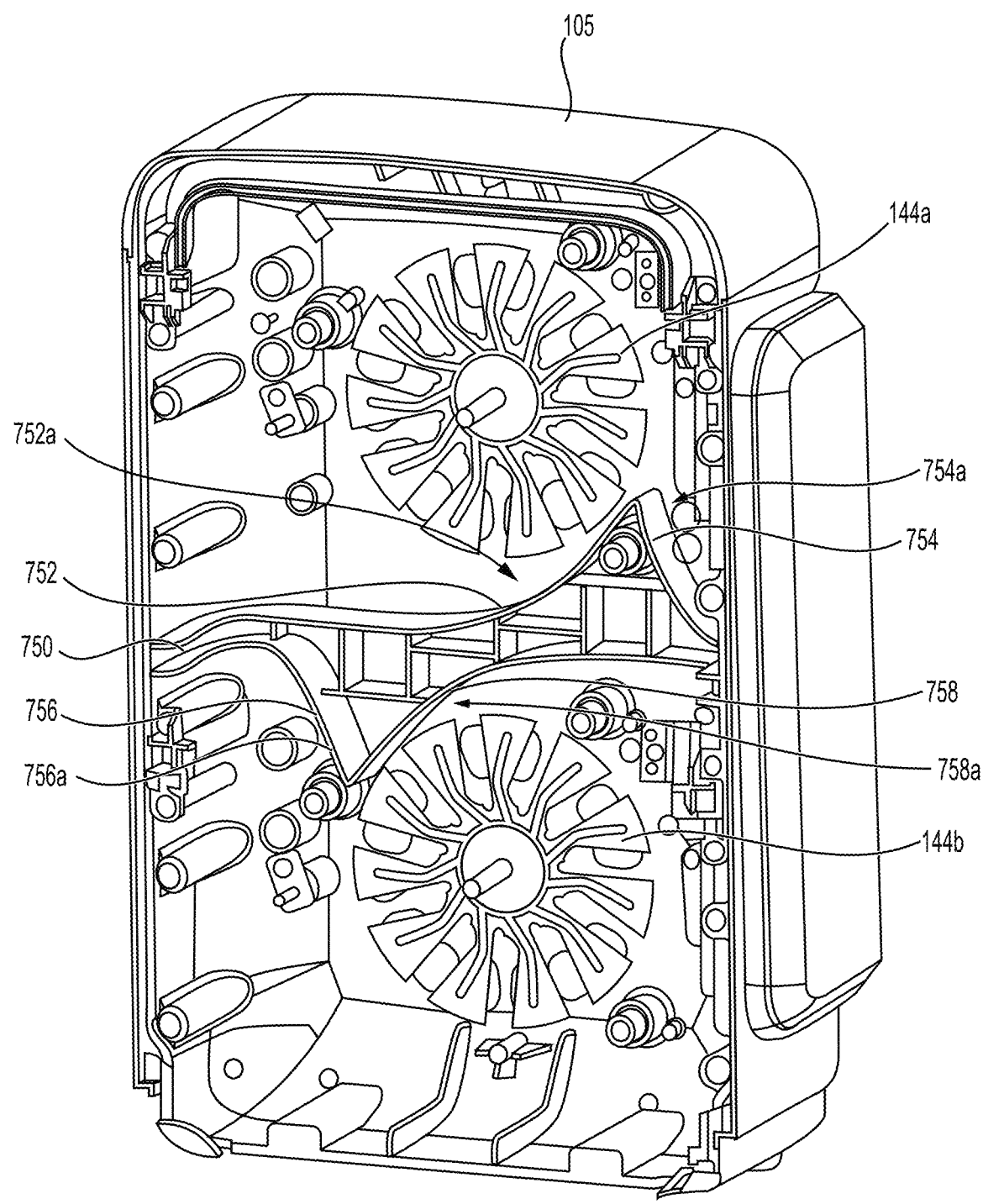
FIG. 29 is a perspective view of the cooking system of FIG. 28.
Figure 30:
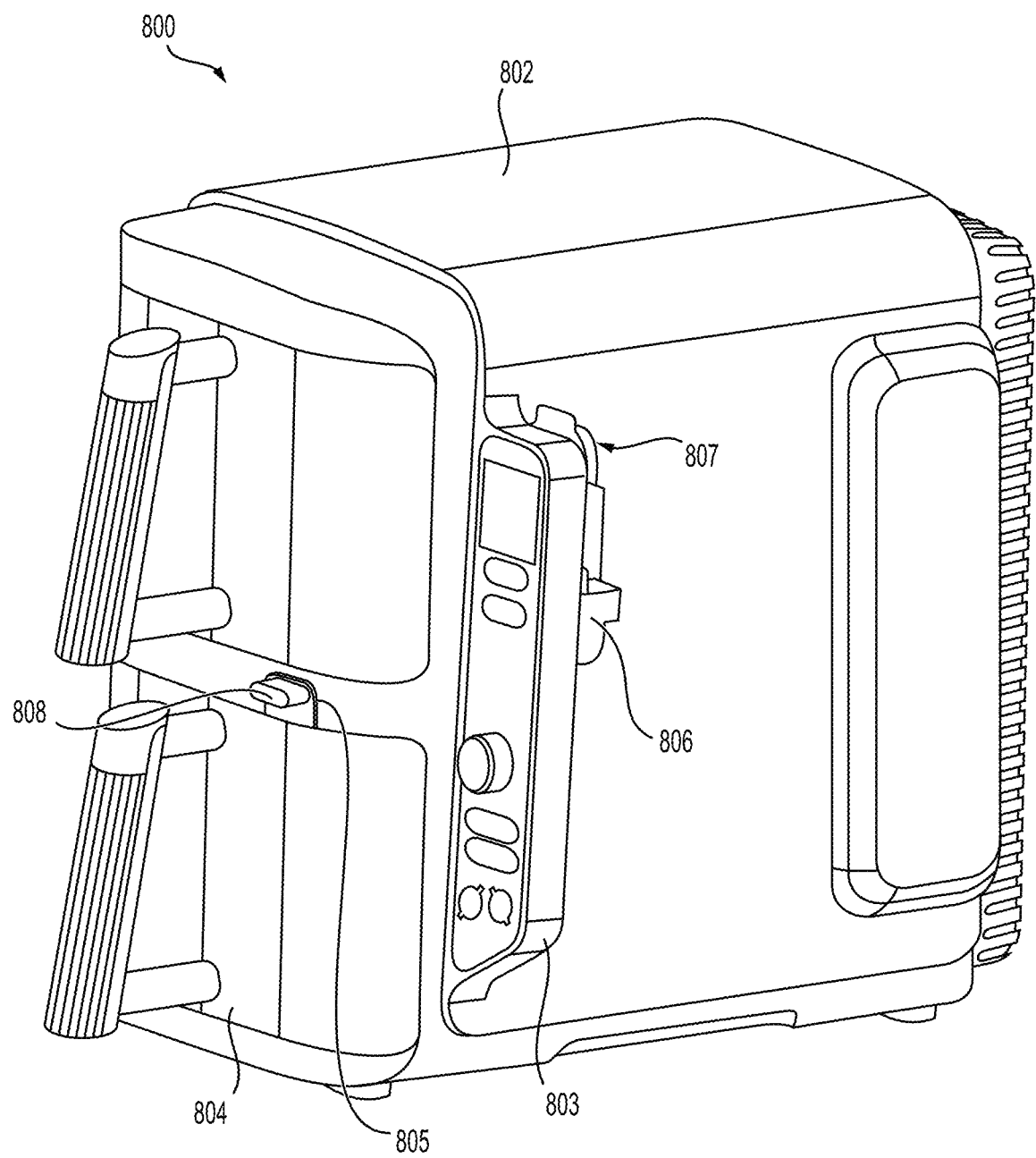
FIG. 30 is a perspective view of an embodiment of a cooking system having a temperature probe.
Figure 31:
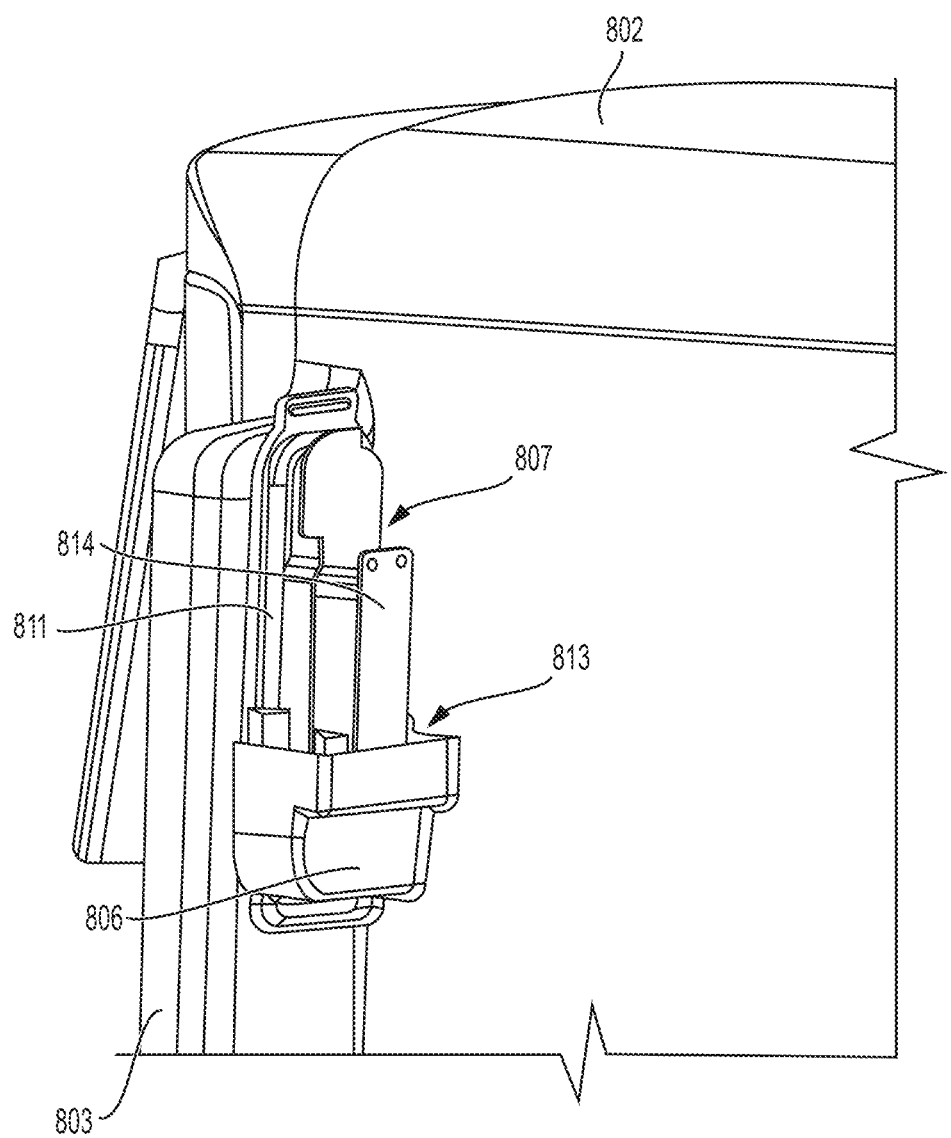
FIG. 31 is a detailed perspective view of the probe storage of the cooking system of FIG.
Figure 32:
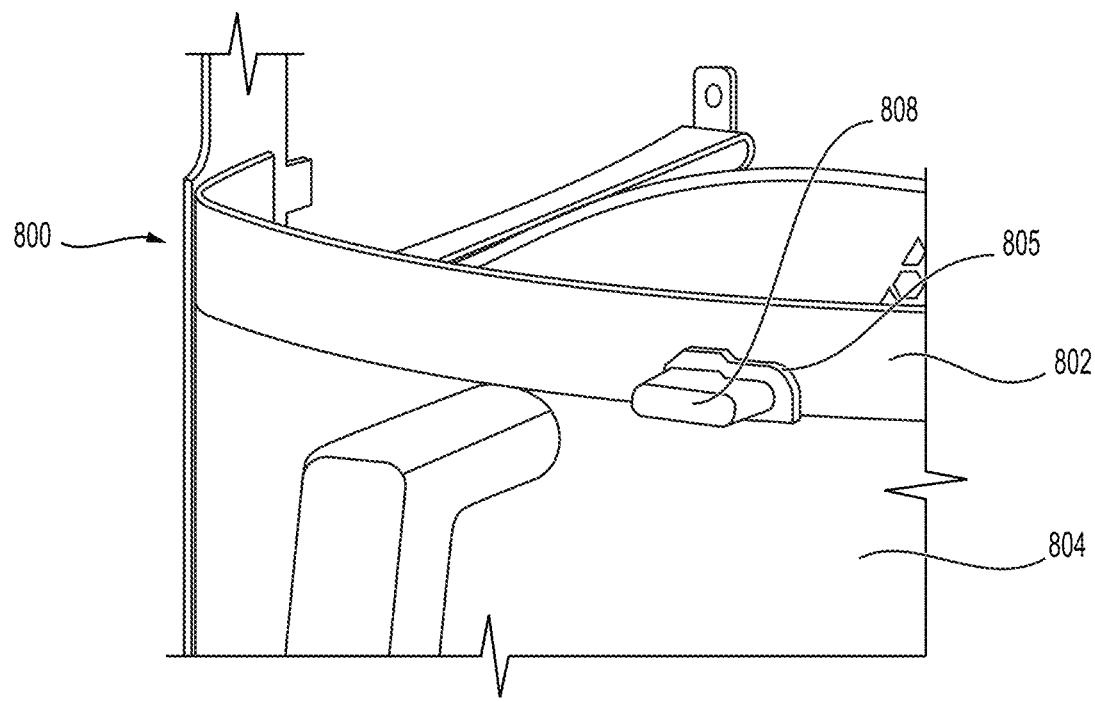
FIG. 32 is a partial perspective view of a lower cooking container arranged within a housing of the cooking system of FIG. 30.
Figure 33:
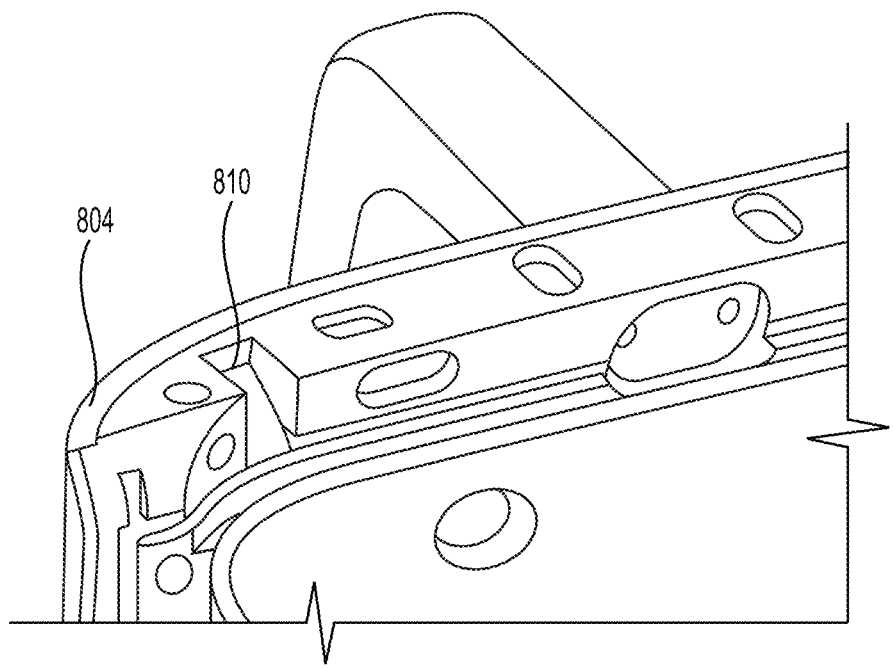
FIG. 33 is a detailed perspective view of the cooking container of FIG. 32.

In order to aid in directing the cooling air flow form the fans 144a, 144b, and to increase the volumetric flow rate by reducing generated back pressure, a volute 750 is positioned within the cooling channel 700 and between the fans 144a, 144b. As illustrated in FIGS. 28-29, the volute 750 includes upper curved surfaces 752, 754, and lower curved surfaces 756, 758. The upper curved surfaces 752, 754 correspond to the fan 144a, where the curved surface 754 creates a compression chamber 754a, and the curved surface 752 creates an expansion chamber 752a. Additionally, the curved surfaces 756, 758 correspond to the fan 144b, where the curved surface 756 creates a compression chamber 756a, and the curved surface 758 creates an expansion chamber 758a. The compression and expansion chambers aid in guiding the air flow generated by the fans 144a, 144b into the cooling channels arranged about the housing 105.

Referring to FIGS. 30-35, an embodiment of a cooking system 800 is depicted. The cooking system 800 is substantially similar to the cooking system 100. Therefore, like components will not be explained in detail. The cooking system 800 includes a housing 802 and a user interface 803 attached to the housing 802. On the rear of the user interface 803 is a holder 806 having an opening 813, which is configured to receive a probe assembly 807. The probe assembly 807 includes a storage body 814 and a probe 811. The probe 811 can also include a wire 816 that wraps around the storage body 814. The probe 811 also can be secured to the storage body 814.

Figure 35:
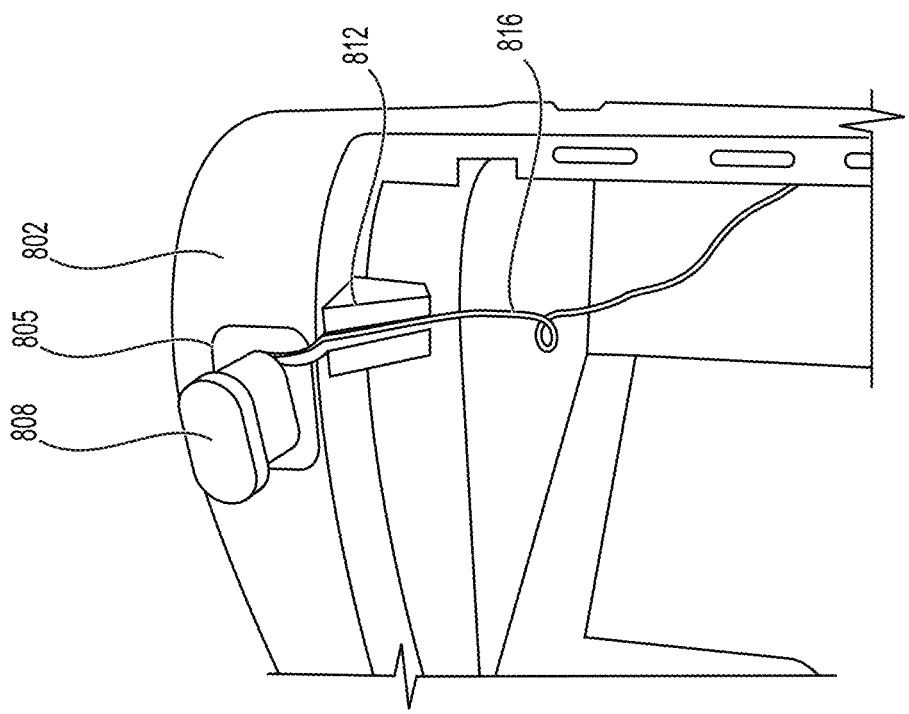
FIG. 35 is a detailed perspective view of a probe channel arranged within the housing of the cooking system of FIG. 30.
Figure 34:
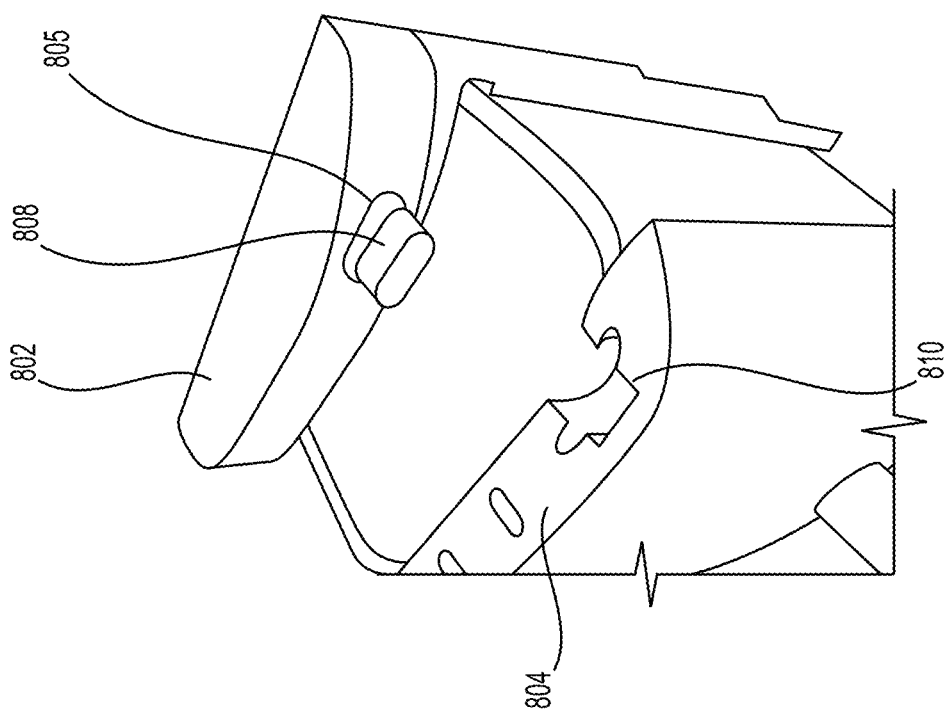
FIG. 34 is a detailed perspective view of the cooking container of FIG. 32 partially removed from the housing of the cooking system of FIG. 30.
Figure 36:
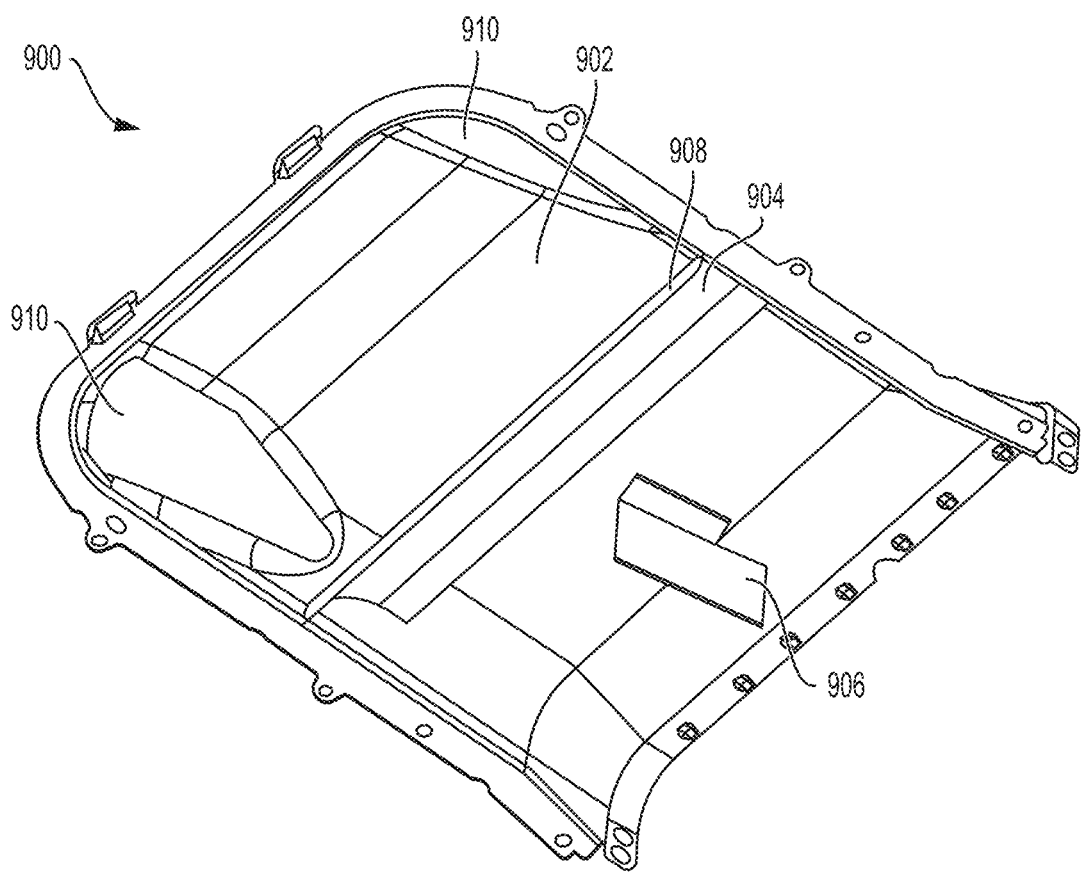
FIG. 36 is a front bottom perspective view of an embodiment of a cooking chamber top plate for use with the cooking system of FIG. 1.
Figure 37:
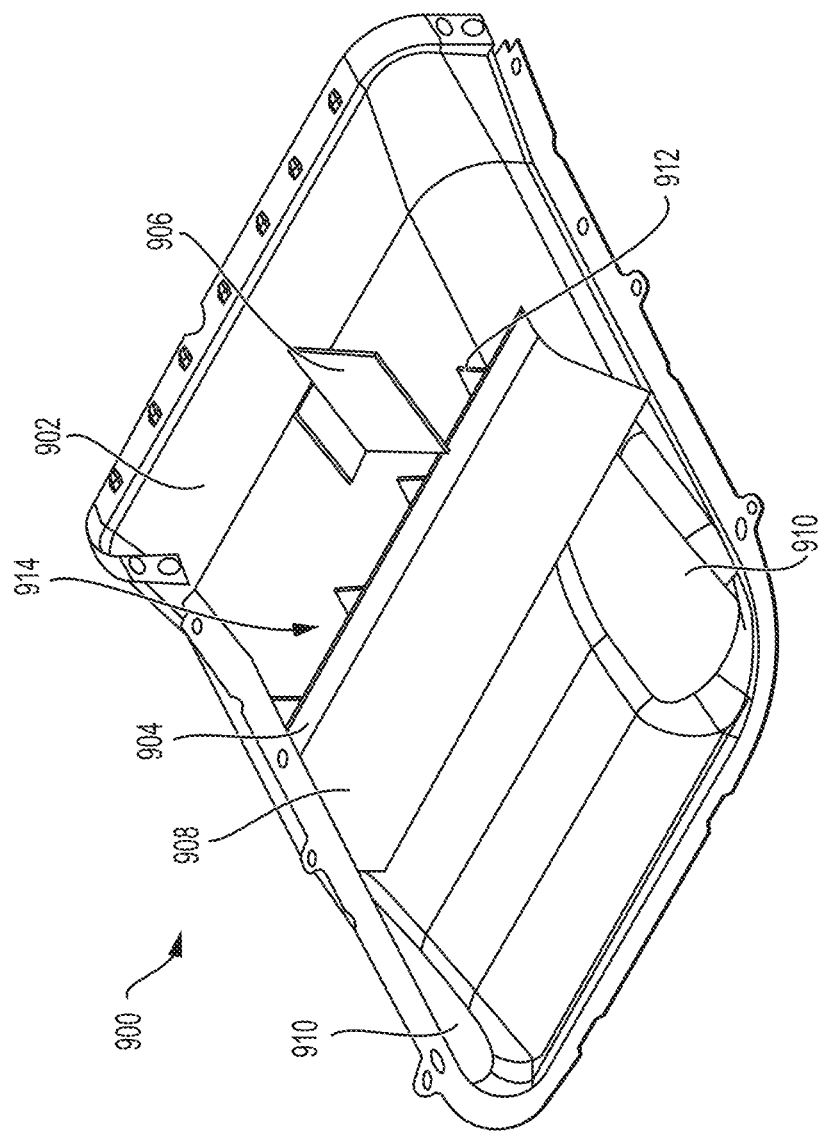
FIG. 37 is a rear bottom perspective view of the cooking chamber top plate of FIG. 36.
Figure 38:
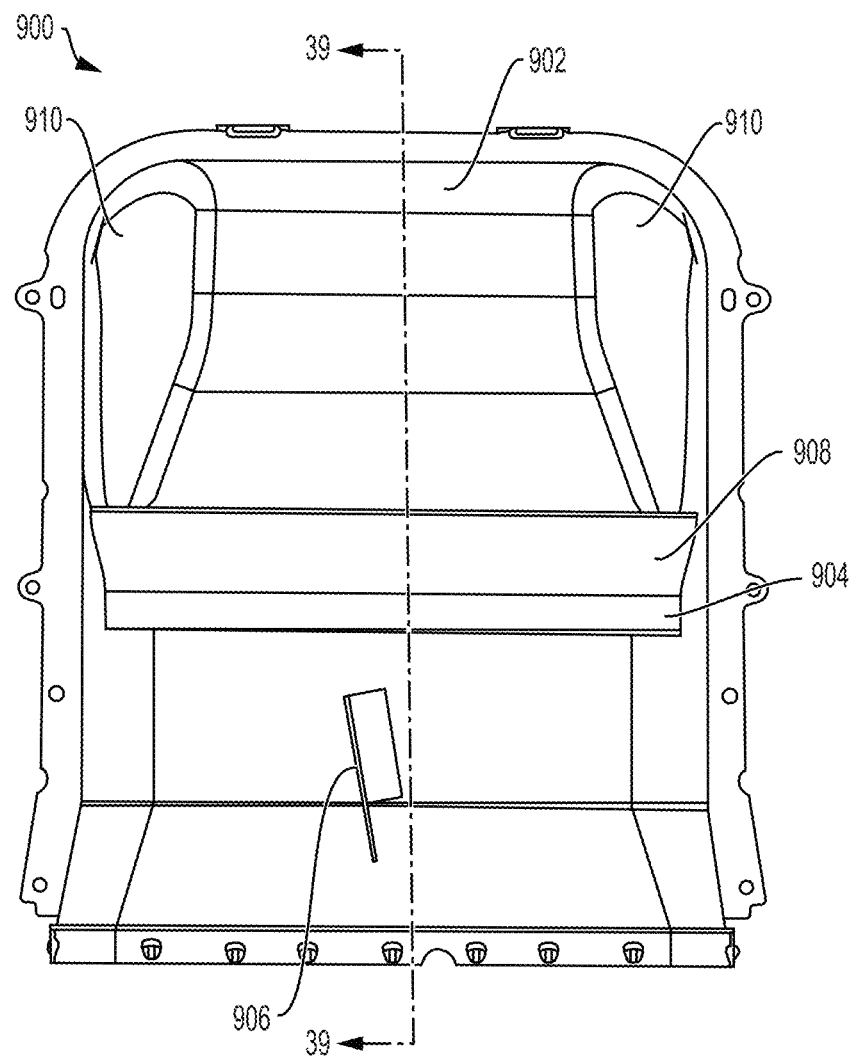
FIG. 38 is a bottom view of the cooking chamber top plate of FIG. 36.

In order for a user to use the probe 811, the probe 811 is removed from the storage body 814. A jack 808 attached to the opposite end of the wire 816 relative to the probe 811 can be connected to a jack port 805. The probe 811, probe jack port 805, and the jack 808 are substantially similar to the probe, jack, and jack port disclosed in U.S. Pat. No. 11,619,394, titled "Cooking Devices and Components Thereof," which is incorporated by reference in its entirety. Further, the cooking container 804 includes a channel 810 which extends downward into the cooking container 804. As shown in FIGS. 34-35, the jack 808 and housing channel 812 align with the channel 810 such that when the cooking container 804 is positioned within the housing 802, the wire 816 from the jack 808 passes through the housing channel 812, channel 810, and then into the cooking container 804. This auto-aligns the wire 816 with the channel 810 when opening and closing the cooking container 804. The probe 811 is configured to measure the temperature of a food item in the cooking container 804, and to communicate with the processor 905 in order to control a cooking process.

Figure 39:
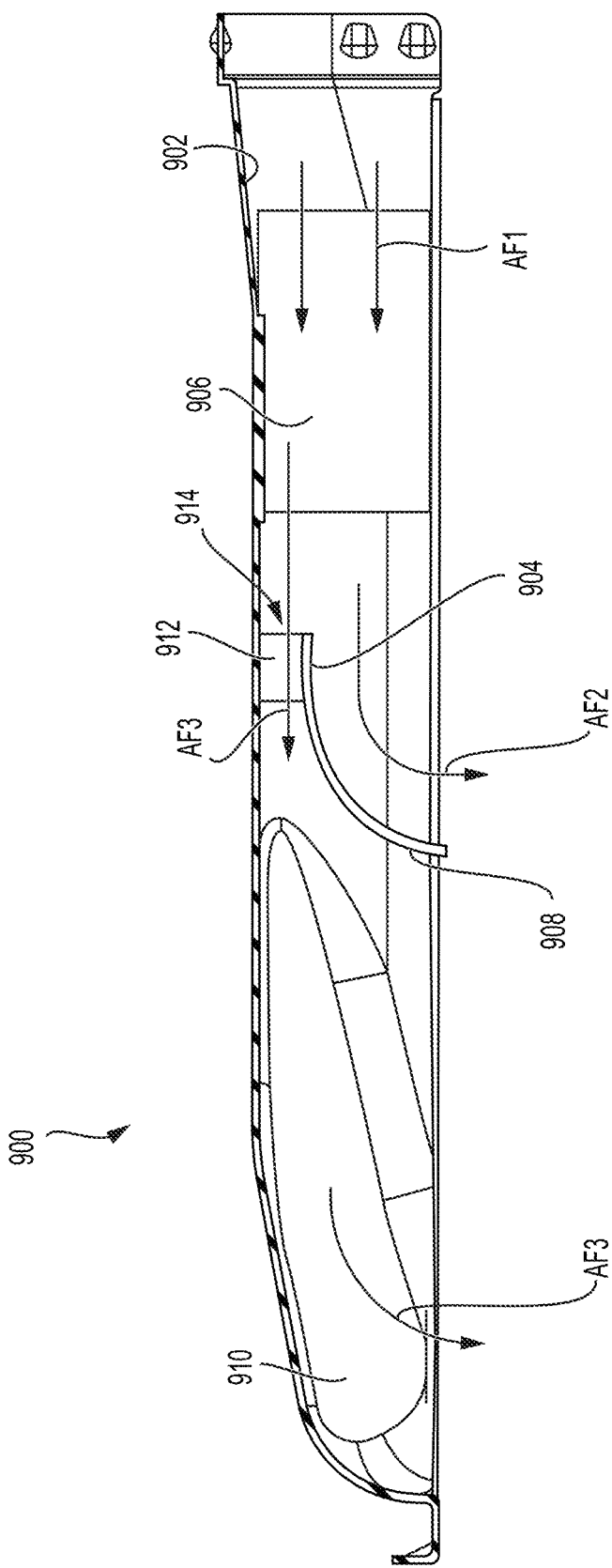
FIG. 39 is a cross-sectional view of the cooking chamber top plate of FIG. 36 taken along line 39-39 in FIG. 38.
Figure 40:
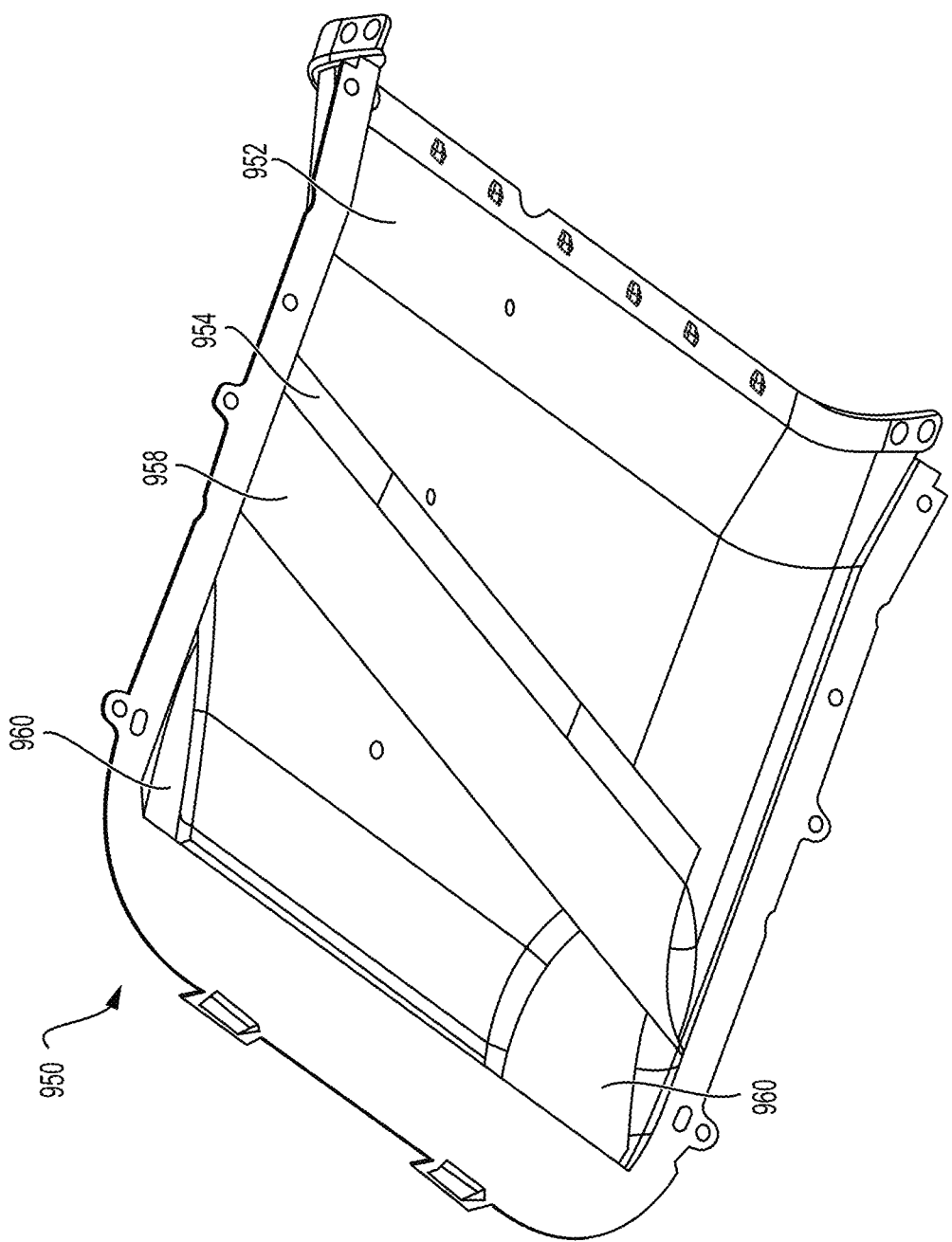
FIG. 40 is a front bottom perspective view of an embodiment of a cooking chamber top plate for use with the cooking system of FIG. 1.
Figure 41:
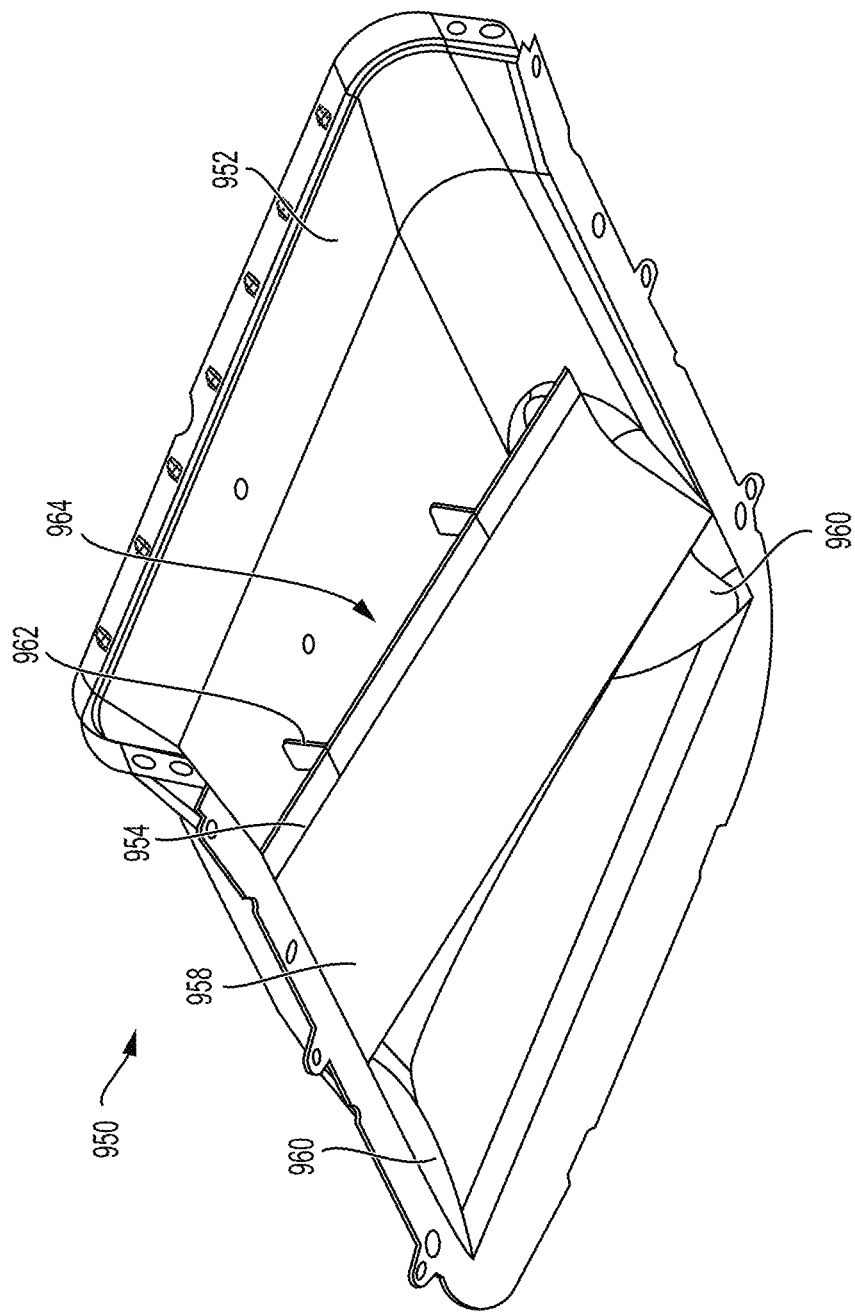
FIG. 41 is a rear bottom perspective view of the cooking chamber top plate of FIG. 40.
Figure 42:
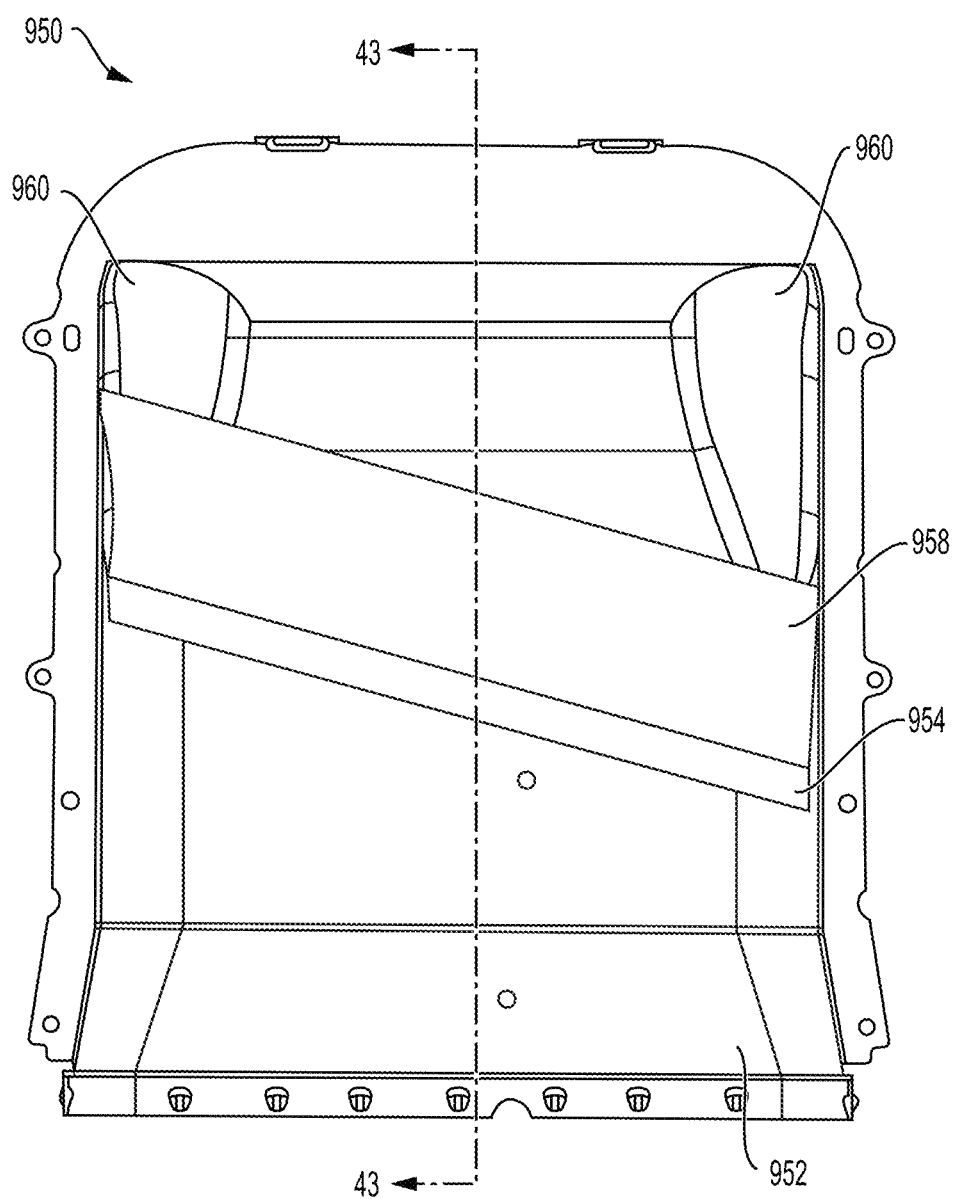
FIG. 42 is a bottom view of the cooking chamber top plate of FIG. 40.

Referring now to FIGS. 36-39, an embodiment of an upper shell 900 is depicted. The upper shell 900 is similar to the upper shell 650, depicted in FIGS. 21-22. As such, like components are not described in detail. The upper shell 900 includes a top surface 902, a baffle 904, and a vane 906. The baffle 904 is positioned substantially perpendicular across the width of the upper shell 900 and aids in separating the air passing horizontally along the top surface 902 into two separate air flows. As shown in FIG. 39, airflow AF1 is separated into airflow AF2, which is directed downward by the baffle 904, and air flow AF3, which travels over the baffle 904. The baffle 904 is connected to the top surface 902 by extensions 912, which forms the gap 914 between the baffle 904 and the top surface 902 for airflow AF3 to pass through. The extensions 912 can also aid in reducing the rotation flow of the airflow coming off the fan. The airflow AF2 is directed downward by contacting a curved section 908 of the baffle 904 prior to traveling along the entire length of the internal volumes 120, 125. By separating the airflows at different longitudinal lengths along the upper shell 900, an equal distribution of heated air can be applied to the cooking chamber.

The gap 914 can have a height in the range of 6 mm to 15 mm, and preferably between 10 mm to 11 mm. The height of the gap 914 separates a percentage of the airflow AF1 into airflow AF3. For example, based on the cross-sectional height of the gap 914, approximately 30%-35% of the airflow AF1 can be used to form airflow AF3.

Additionally, the upper shell 900 includes directional indents 910. The indents 910 are arranged on opposite sides of the upper shell 900, and can be arranged at different longitudinal lengths along the upper shell 900. The indents 910 are configured to direct a portion of the horizontal airflow AF3 downward into the cooking containers 110, 115.

In addition to the baffle 904, the vane 906 is positioned to aid in reducing the rotational flow of the airflow AF1 coming off the fan. The air flow can be directed horizontally through the cooking volume using the vane 906, which helps increase horizontal flow. The vane 906 is oriented at an acute angle relative to the side edge of the upper shell 900, where the vane 906 of the upper shell 900 initially receives airflow from the fan due to its closer proximity when compared longitudinal position of the baffle 904. The vane 906 is secured to the top surface 902, and can extend partially along the longitudinal length of the top surface 902. In some embodiments, the vane 906 can extend such that it contacts the baffle 904, separating the airflow into two side by side airflows. In an embodiment, the baffle 904 can be arranged within a range of ¼ to ¾ along the total longitudinal length of the upper shell 900. Additionally, the vane 906 can be positioned at a range of 0 to ½ along the total longitudinal length of the upper shell 900.

Figure 43:
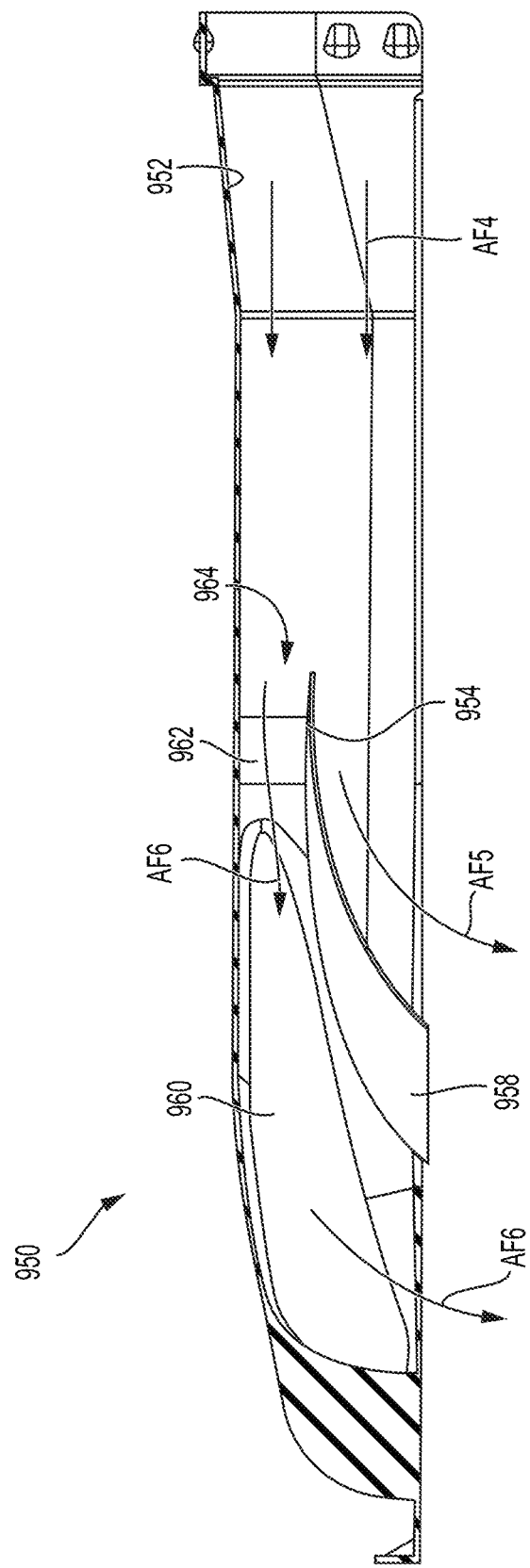
FIG. 43 is a cross-sectional view of the cooking chamber top plate of FIG. 40 taken along line 43-43 in FIG. 42.
Figure 44:
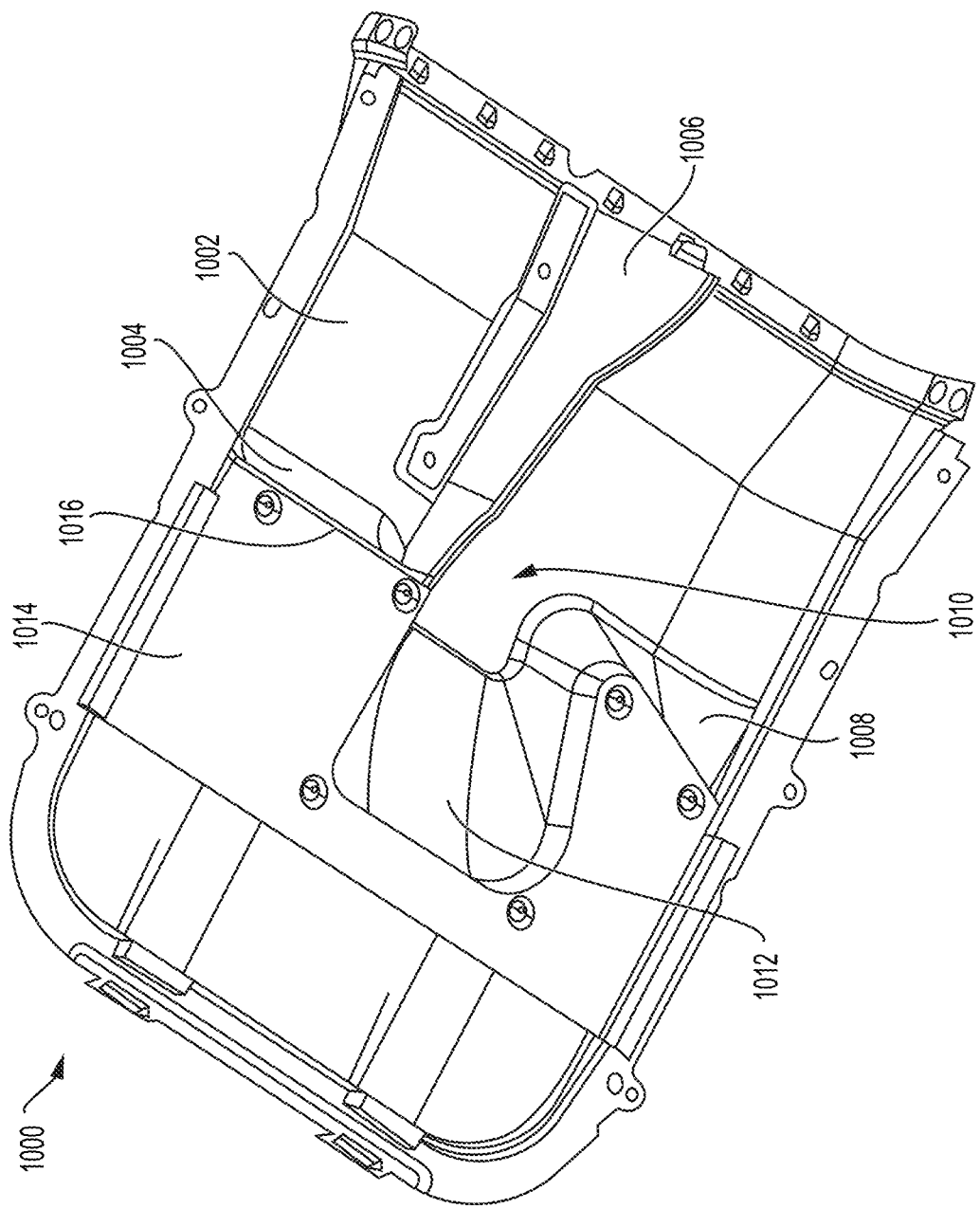
FIG. 44 is a front bottom perspective view of an embodiment of a cooking chamber top plate for use with the cooking system of FIG. 1.
Figure 45:
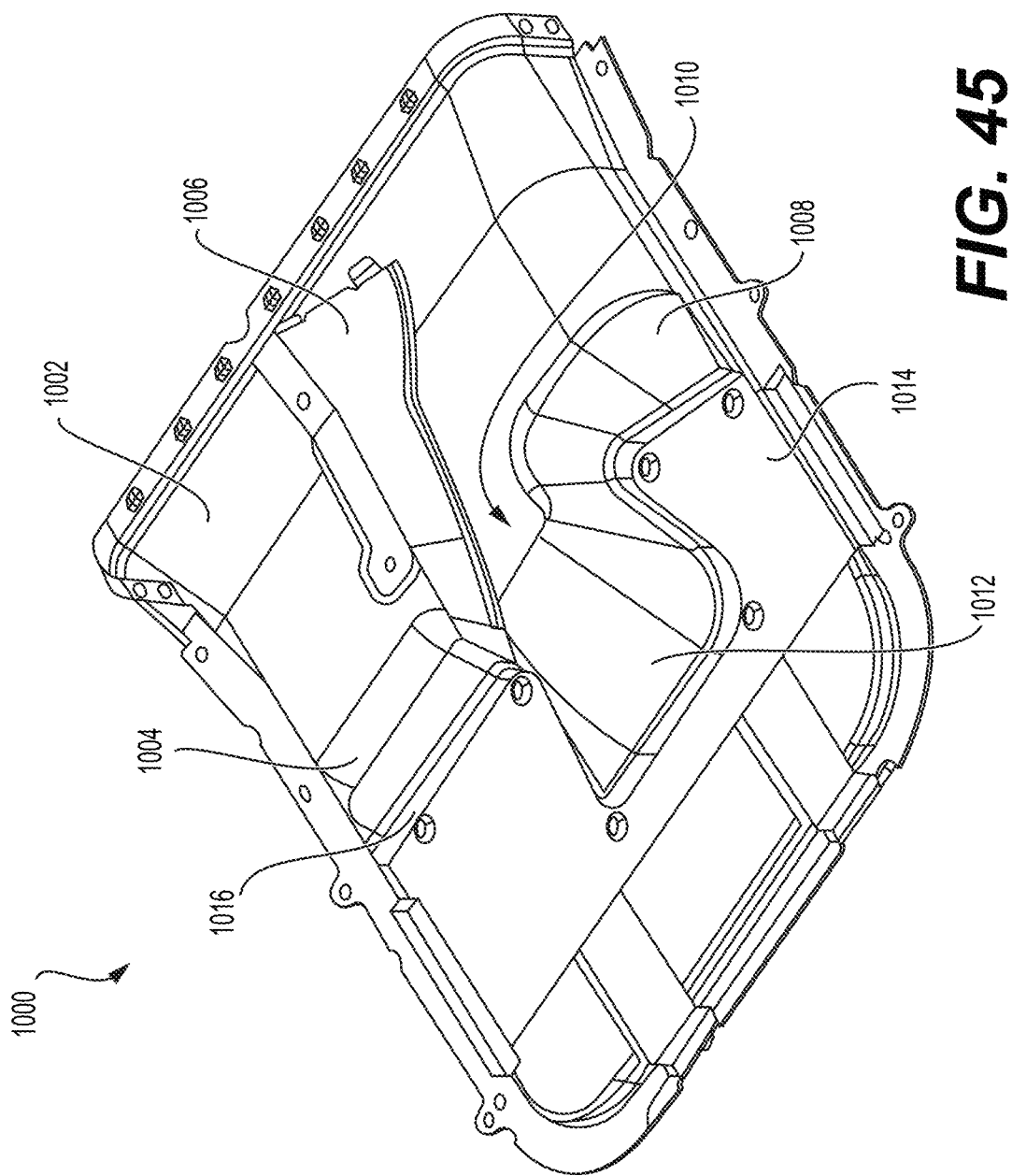
FIG. 45 is a rear bottom perspective view of the cooking chamber top plate of FIG. 44.
Figure 46:
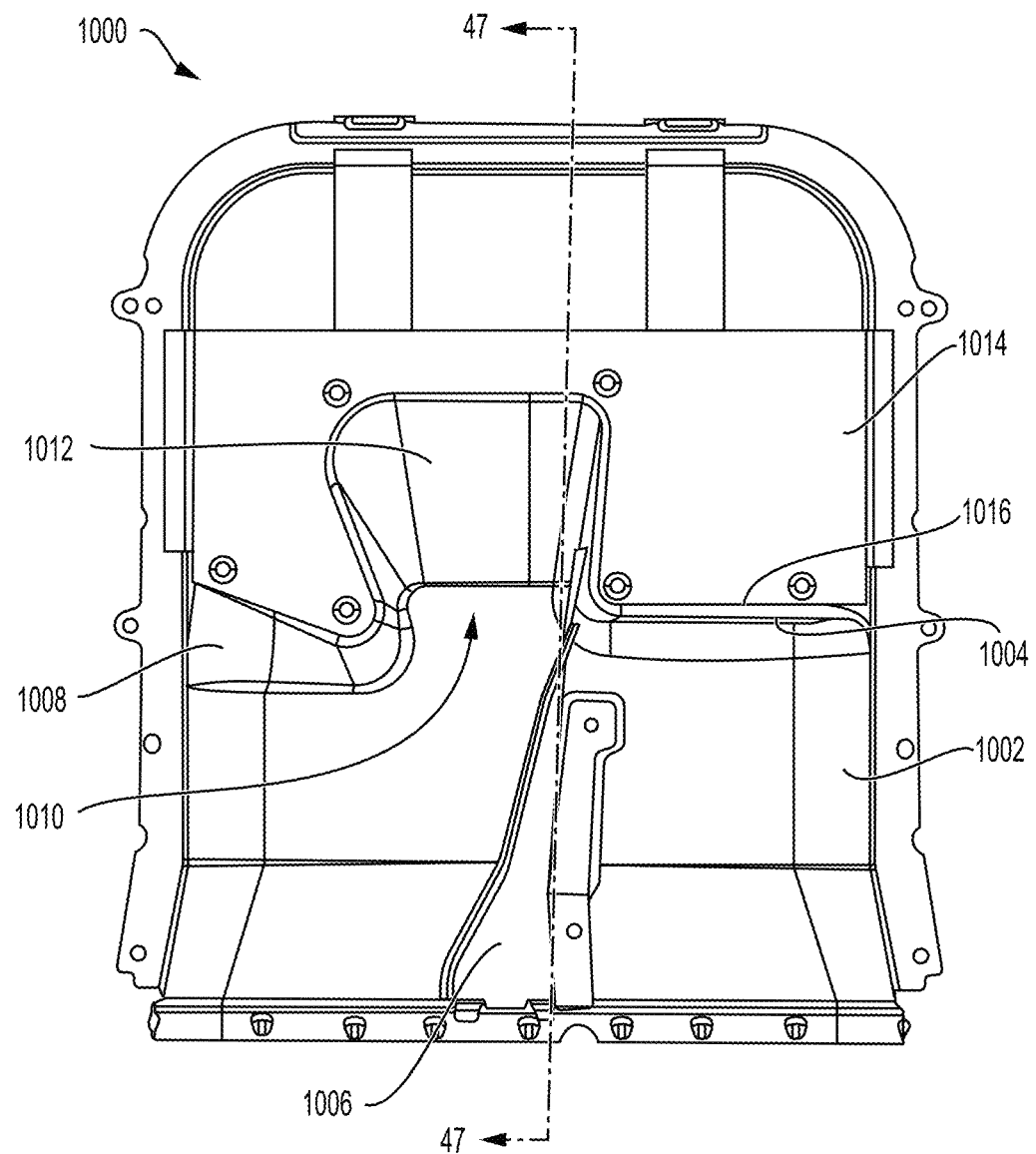
FIG. 46 is a bottom view of the cooking chamber top plate of FIG. 44.

Referring now to FIGS. 40-43, an embodiment of an upper shell 950 is depicted. The upper shell 950 is similar to the upper shell 900. As such, like components are not described in detail. The upper shell 950 includes a top surface 952, a baffle 954, and a vane 906. The baffle 904 is positioned across the width of the upper shell 950 at an angle, and aids in separating the air passing horizontally along the top surface 952 into two separate air flows. As shown in FIG. 43, airflow AF4 is separated into airflow AF5, which is directed downward by the baffle 954, and air flow AF6, which travels over the baffle 954. The baffle 954 is connected to the top surface 952 by extensions 962, which forms the gap 964 between the baffle 954 and the top surface 952 for airflow AF6 to pass through. The gap 964 is similar in dimensions to the gap 914. The extensions 962 can also aid in reducing the rotation flow of the airflow coming off the fan. The airflow AF5 is directed downward by contacting a curved section 958 of the baffle 954 prior to traveling along the entire length of the internal volumes 120, 125. By separating the airflows at different longitudinal lengths along the upper shell 950, an equal and/or even distribution of heated air can be applied to the cooking chamber. Additionally, in an embodiment, the baffle 954 can be arranged within a range of ¼ to ¾ along the total longitudinal length of the upper shell 950. Additionally, one side of the baffle 954 can be positioned on the upper shell 950 at approximately ¼ to ½ along the total longitudinal length of the upper shell 950, while the opposite end of the baffle 954 can be positioned on the upper shell 950 at approximately ½ to ⅞ along the total longitudinal length of the upper shell 950. This angled position of the baffle 954 allows for the baffle 954 to reduce the rotational flow of the air passing over and through the baffle due to the rotation of the fan producing the air flow.

Additionally, the upper shell 950 includes directional indents 960. The indents 960 are arranged on opposite sides of the upper shell 950, and can be arranged at different longitudinal lengths along the upper shell 950. The indents 960 are configured to direct a portion of the horizontal airflow AF6 downward into the cooking containers 110, 115.

Referring now to FIGS. 44-47, an embodiment of an upper shell 1000 is depicted. The upper shell 1000 is similar to the upper shell 900. As such, like components are not described in detail. The upper shell 1000 includes a top surface 1002, a baffle plate 1014, and a vane 1006. The top surface 1002 includes directional surfaces 1004, 1008, and 1012. The surfaces 1004, 1008, and 1012 can be arranged at different longitudinal lengths along the total length of the upper shell 1000. This is to aid is evenly distributing horizontal air moving along the top surface 1002. A gap 1010 is formed between the surfaces 1004 and 1008, and terminates at surface 1012. The gap 1010 allows horizontal air moving through the center of the volume to travel further longitudinally than air traveling along the sides, since the air traveling along the edges is deflected by surfaces 1004 and 1008. The air traveling through the gap 1010 is directed downward by the surface 1012.

The baffle plate 1014 is positioned substantially perpendicular across the width of the upper shell 1000 and aids in directing horizontal airflow downward into the internal volumes. The baffle plate 1014 is connected to the top surface 1002 through mechanical means (i.e., rivets) or an adhesive, but other like securement means should be considered within the scope of this disclosure. The baffle plate 1014 forms a lip 1016 that is positioned adjacent to the surfaces 1004, 1008, 1012. By being arranged at the edge of the surfaces, the lip 1016 aids in directing horizontal air downward. Alternatively, a lip (e.g., lip 1016) can be integrally formed with the upper shell 1000 at one or more of the directional surfaces 1004, 1008, and 1012. A lip can be formed to provide for a more abrupt and/or turbulent transition of horizontal airflow downward into the internal volume.

Figure 47:
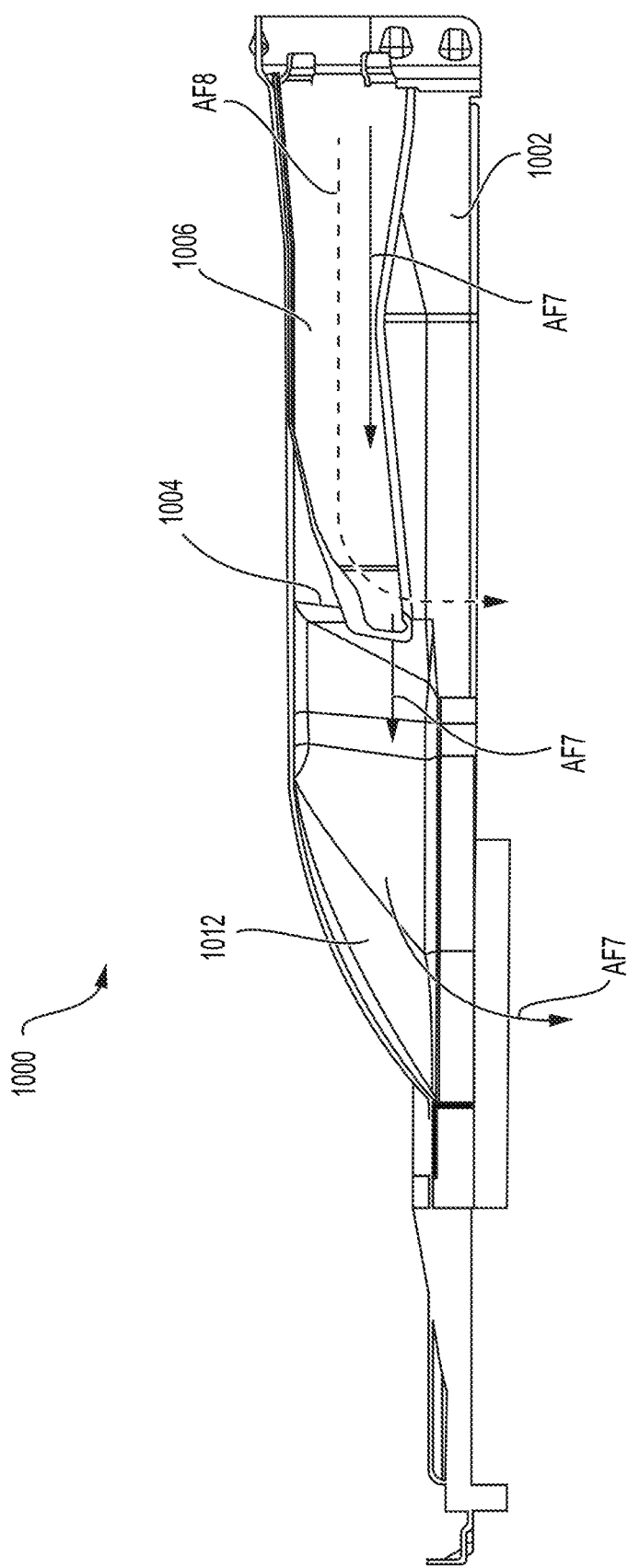
FIG. 47 is a cross-sectional view of the cooking chamber top plate of FIG. 44 taken along line 47-47 in FIG. 46.
Figure 48:
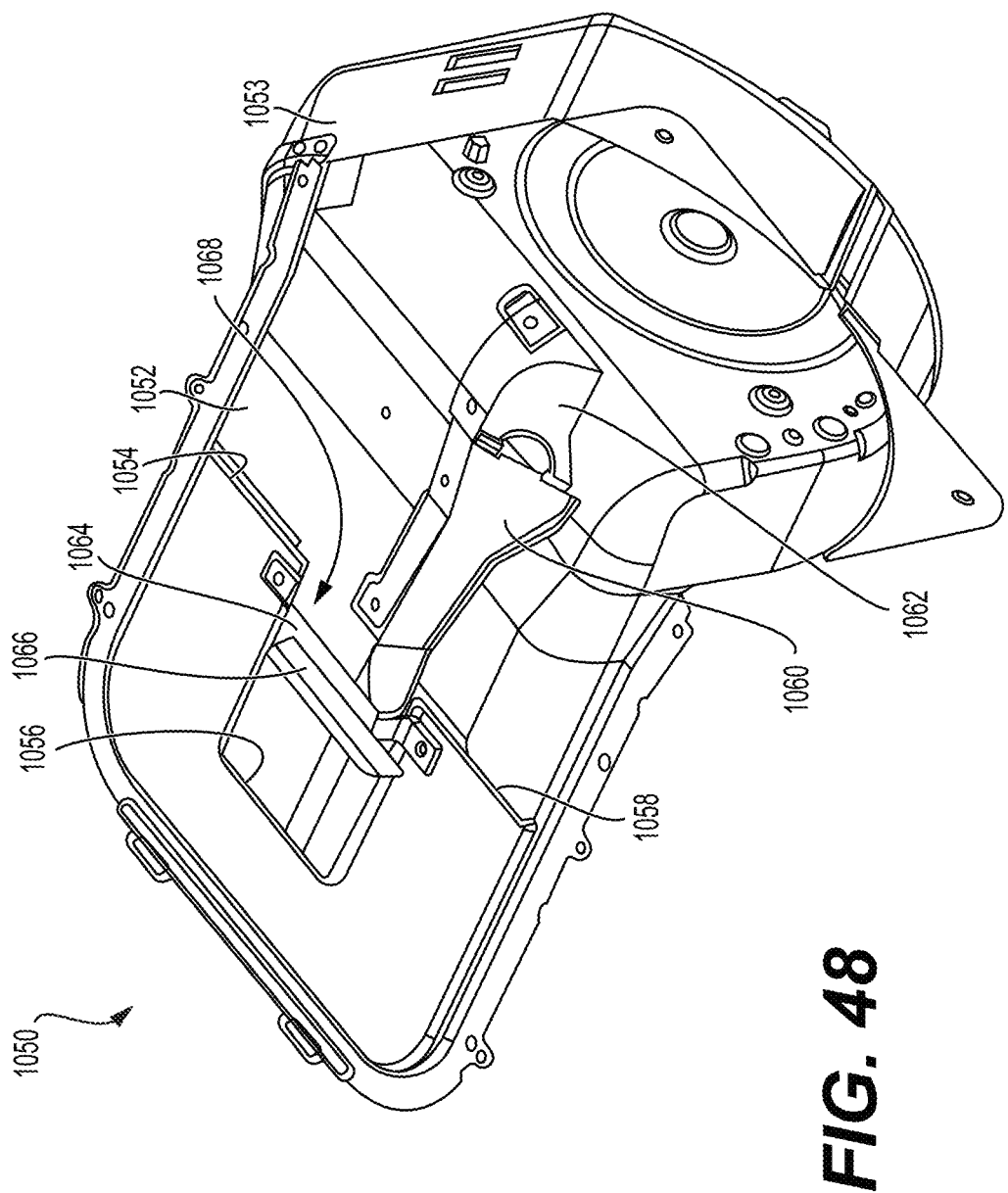
FIG. 48 is a front bottom perspective view of an embodiment of a cooking chamber top plate for use with the cooking system of FIG. 1.
Figure 49:
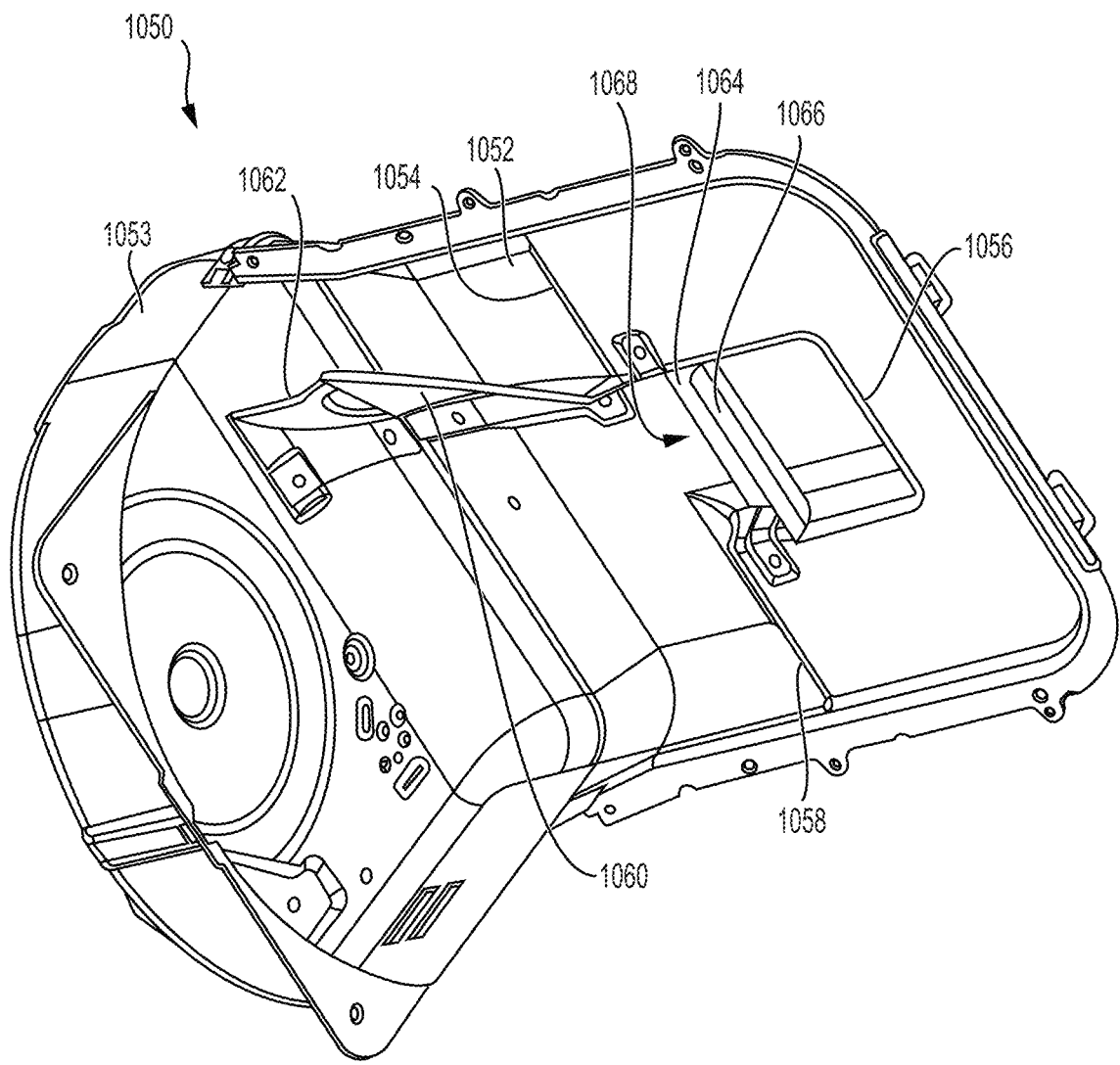
FIG. 49 is a front bottom perspective view of the cooking chamber top plate of FIG. 48.
Figure 50:
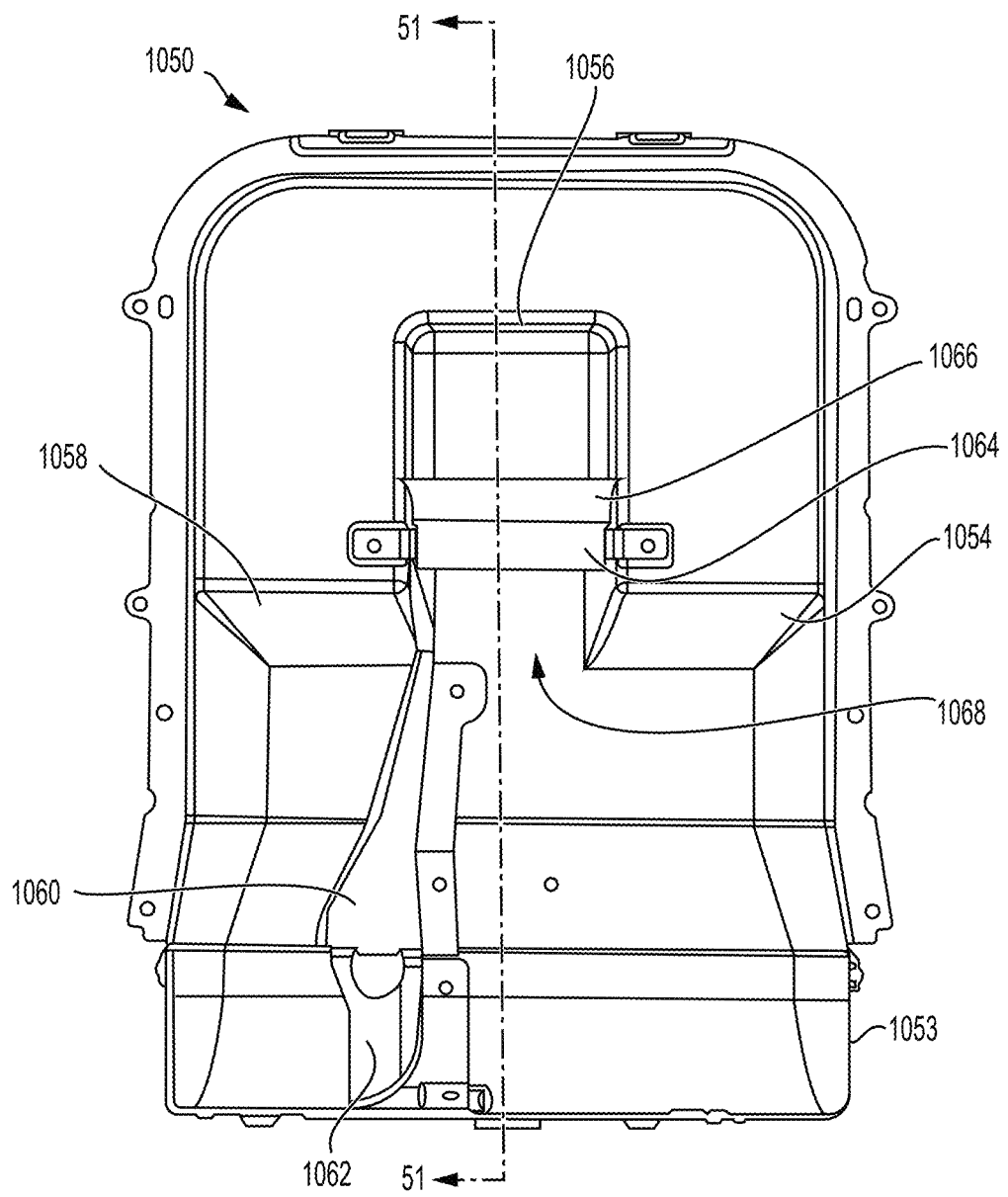
FIG. 50 is a bottom view of the cooking chamber top plate of FIG. 48.

In addition to the baffle plate 1014, the vane 1006 is positioned to aid in reducing the rotational flow of the airflow coming off the fan, and also to separate the airflows contacting the surfaces 1004, 1008, 1012. The air flow can be directed horizontally through the cooking volume using the vane 1006, which helps increase horizontal flow. The vane 1006 is secured to the top surface 1002, and can extend partially along the longitudinal length of the top surface 1002. In some embodiments, the vane 1006 can extend such that it contacts the baffle plate 1014, separating the airflow into two side by side airflows. As depicted in FIG. 47, the airflow AF7 travels along the vane 1006, through the gap 1010, and contacts the surface 1012 to be directed downward. The airflow AF8 travels on the opposite side of the vane 1006 compared to the airflow AF7, and contacts the surface 1004 to be directed downward. Since the vane 1006 extends to and through the gap 1010, the airflow AF8 is partially isolated from the airflow AF7, which directed a portion of the airflow downward via surface 1004 instead of passing through the gap 1010.

Referring now to FIGS. 48-51, an embodiment of an upper shell 1050 is depicted. The upper shell 1050 is similar to the upper shell 1000. As such, like components are not described in detail. The upper shell 1050 includes a top surface 1052, a baffle 1064, and vanes 1060, 1062. The top surface 1052 includes directional surfaces 1054, 1056, and 1058. The surfaces 1054, 1056, and 1058 can be arranged at different longitudinal lengths along the total length of the upper shell 1050. This is to aid is evenly distributing horizontal air moving along the top surface 1052. A gap 1068 is formed between the surfaces 1054 and 1058, and terminates at surface 1056. The gap 1068 allows horizontal air moving through the center of the volume to travel further longitudinally than air traveling along the sides, since the air traveling along the edges is deflected by surfaces 1054 and 1058. The air traveling through the gap 1068 is directed downward by the surface 1056.

The baffle 1064 is positioned substantially perpendicular across the width of the upper shell 1050 and aids in directing horizontal airflow downward into the internal volumes. The baffle 1064 is connected to the top surface 1052 through mechanical means (i.e., rivets) or an adhesive, but other like securement means should be considered within the scope of this disclosure. The baffle 1064 includes a curved section 1066.

Figure 51:
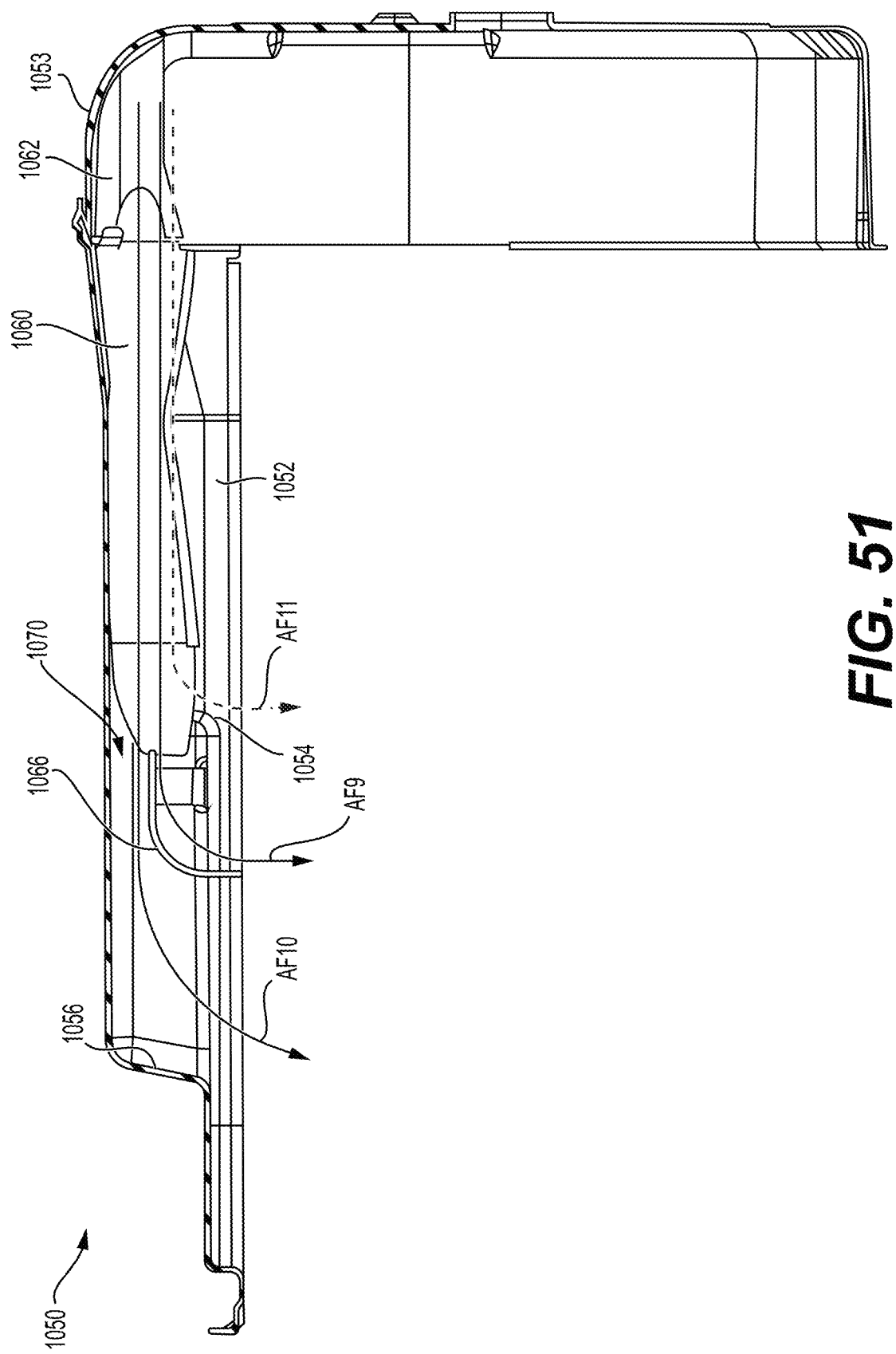
FIG. 51 is a cross-sectional view of the cooking chamber top plate of FIG. 48 taken along line 51-51 in FIG. 50.
Figure 52:
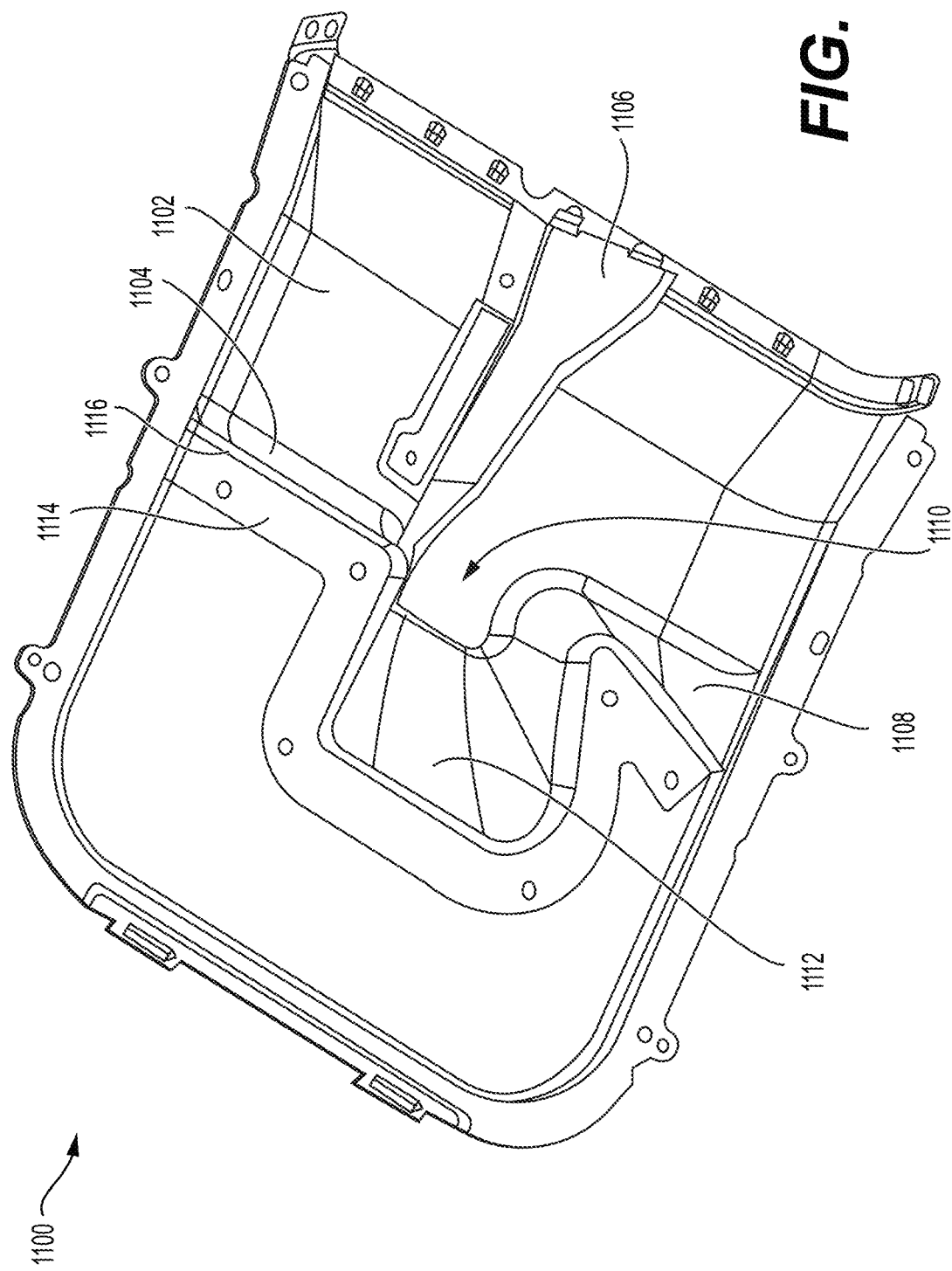
FIG. 52 is a front bottom perspective view of an embodiment of a cooking chamber top plate for use with the cooking system of FIG. 1.
Figure 53:
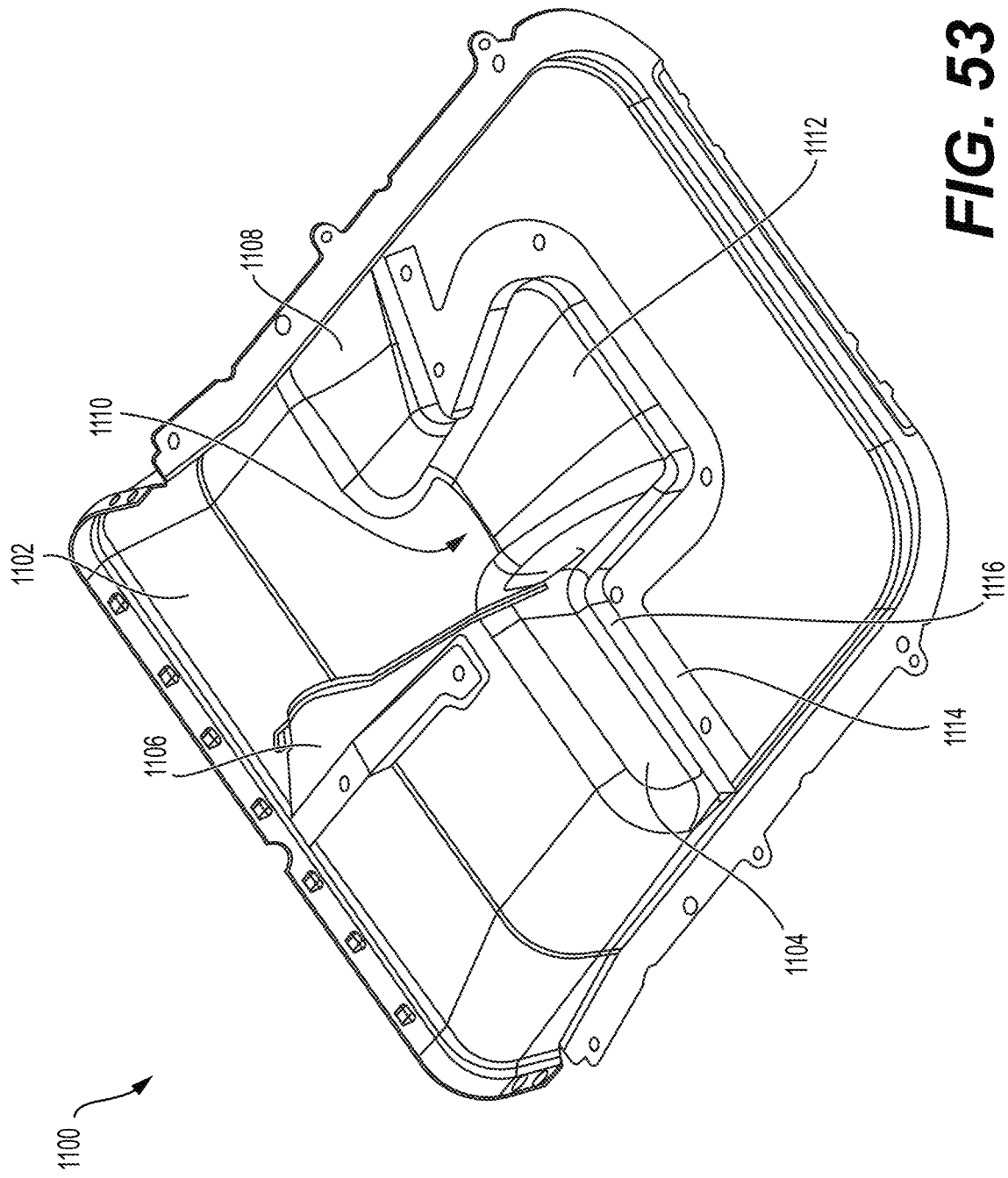
FIG. 53 is a rear bottom perspective view of the cooking chamber top plate of FIG. 52.

The baffle 1064 is positioned across the width of the gap 1068, and aids in separating the air passing horizontally along the top surface 1052 into two separate air flows. As shown in FIG. 51, airflow AF9 is directed downward by the curved section 1066, and air flow AF10 travels over the baffle 1054 and contacts the surface 1056 to be directed downward. The baffle 1054 is connected to the top surface 1052, which forms a gap 1070 between the baffle 1064 and the top surface 1052 for airflow AF10 to pass through. The gap 1070 is similar in dimensions to the gap 914. The airflow AF5 is directed downward by contacting a curved section 1066 of the baffle 1064 prior to traveling along the entire length of the internal volumes 120, 125. By separating the airflows at different longitudinal lengths along the upper shell 1050, an equal distribution of heated air can be applied to the cooking chamber.

In addition to the baffle 1064, the vanes 1060 and 1062 are positioned to aid in reducing the rotational flow of the airflow coming off the fan, and also to separate the airflows contacting the surfaces 1054 and 1056. The air flow can be directed horizontally through the cooking volume using vanes, which helps increase horizontal flow. The vane 1060 is secured to the top surface 1052, and can extend partially along the longitudinal length of the top surface 1052. In some embodiments, the vane 1060 can extend such that it contacts the baffle 1064, separating the airflow into two side by side airflows. Additionally, the vane 1062 is arranged in the rear housing 1053, which houses the fan and heating elements as described above. Since the vane 1062 extends between the rear housing 1053 and the vane 1060, the airflow coming off the fan is separated once it leaves the fan.

As depicted in FIG. 51, the airflow AF11 travels on the opposite side of the vanes 1060, 1062 compared to the airflows AF9, AF10, and contacts the surface 1054 to be directed downward. Since the vane 1060 extends to and through the gap 1068, the airflow AF11 is partially isolated from the airflows AF9, AF10, which directed a portion of the airflow downward via surface 1054 instead of passing through the gap 1068.

Figure 54:
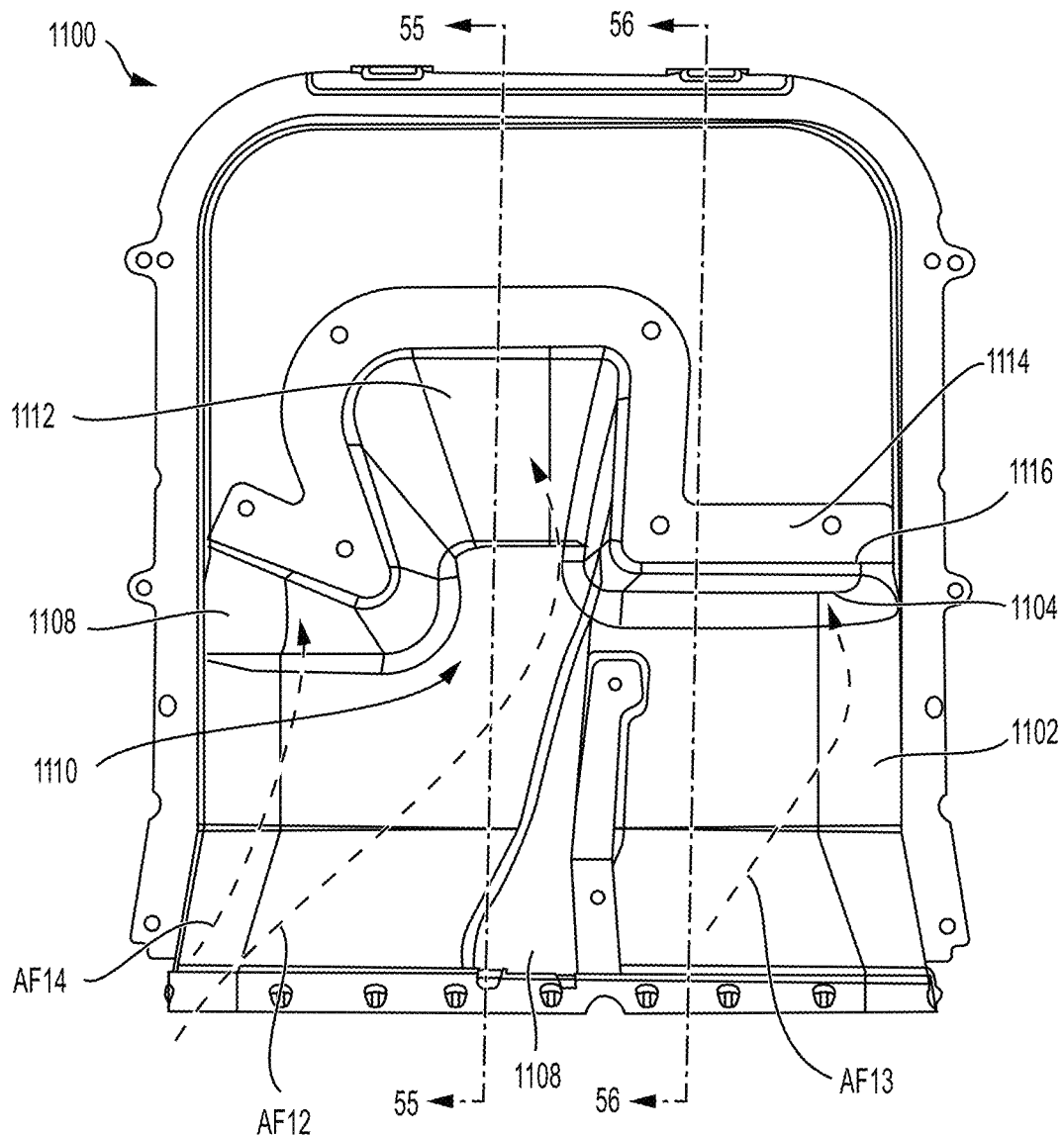
FIG. 54 is a bottom view of the cooking chamber top plate of FIG. 52.

Referring now to FIGS. 52-56, an embodiment of an upper shell 1100 is depicted. The upper shell 1100 is similar to the upper shell 1000. As such, like components are not described in detail. The upper shell 1100 includes a top surface 1102, a baffle plate 1114, and a vane 1106. The top surface 1102 includes directional surfaces 1104, 1108, and 1112. Directional surfaces can be integral with the upper shell, or be included in a baffle which is mounted to the upper shell. The surfaces 1104, 1108, and 1112 can be arranged at different longitudinal lengths along the total length of the upper shell 1100. Additionally, the directional surfaces 1104, 1108, and 1112 can have different deflection angles in order to direct air downward or maintain air speed along the upper shell. For example, the directional surface 1112 is at a lesser angle than the directional surface 1108 in order to ensure the airflow AF12 maintains sufficient air speed to reach substantially the total longitudinal length of the upper shell. As seen in FIG. 54, the surface 112 is a shallower angle than the surfaces 1104, 1108, which are closer to a perpendicular angle. This is to aid is evenly distributing horizontal air moving along the top surface 1102. A gap 1110 is formed between the surfaces 1104 and 1108, and terminates at surface 1112. The gap 1110 allows horizontal air moving through the center of the volume to travel further longitudinally than air traveling along the sides, since the air traveling along the edges is deflected by surfaces 1104 and 1108 downward into the internal volume. The air traveling through the gap 1110 is directed downward by the surface 1112 into the internal volume.

The baffle plate 1114 is positioned substantially perpendicular across the width of the upper shell 1100 and aids in directing horizontal airflow downward into the internal volumes. The baffle plate 1114 is connected to the top surface 1102 through mechanical means (i.e., rivets) or an adhesive, but other like securement means should be considered within the scope of this disclosure. The baffle plate 1114 forms a lip 1116 that is positioned adjacent to the surfaces 1104, 1108, 1112. By being arranged at the edge of the surfaces, the lip 1116 aids in directing horizontal air downward into the internal volume.

Figure 55:
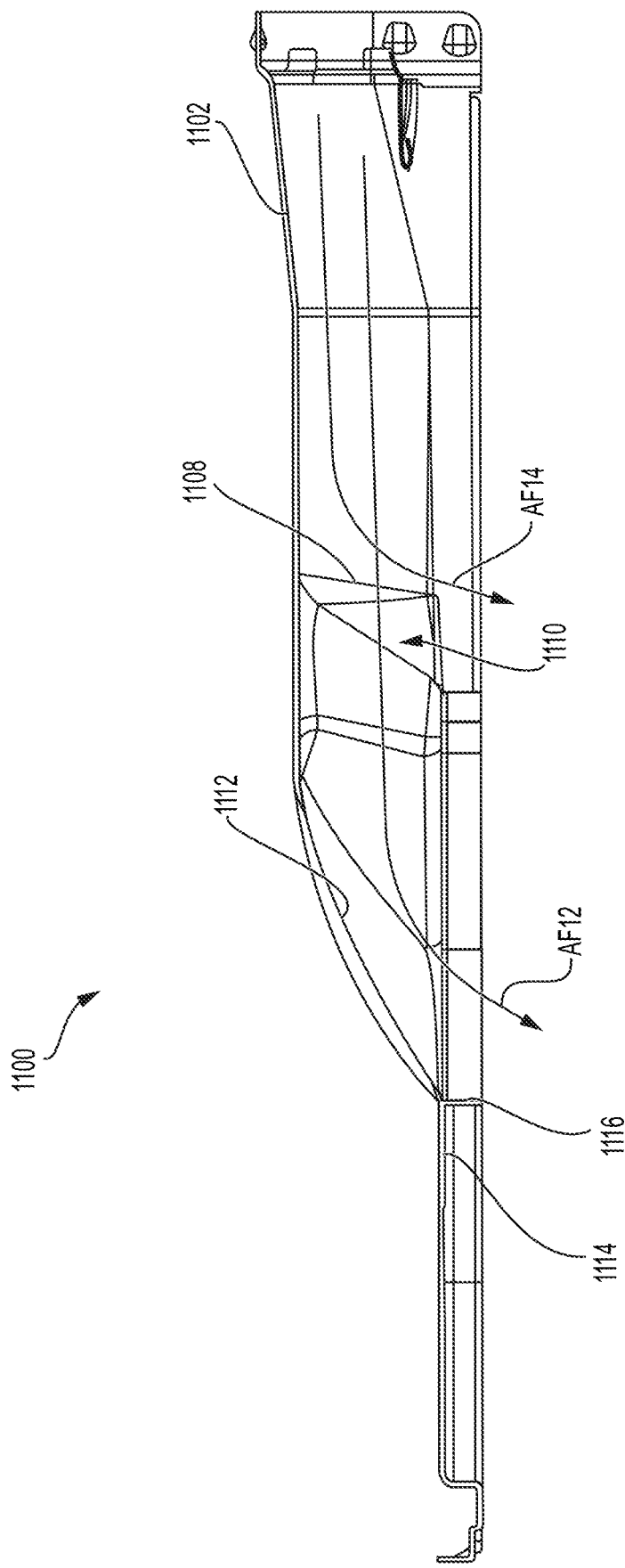
FIG. 55 is a cross-sectional view of the cooking chamber top plate of FIG. 52 taken along line 55-55 in FIG. 54.
Figure 56:
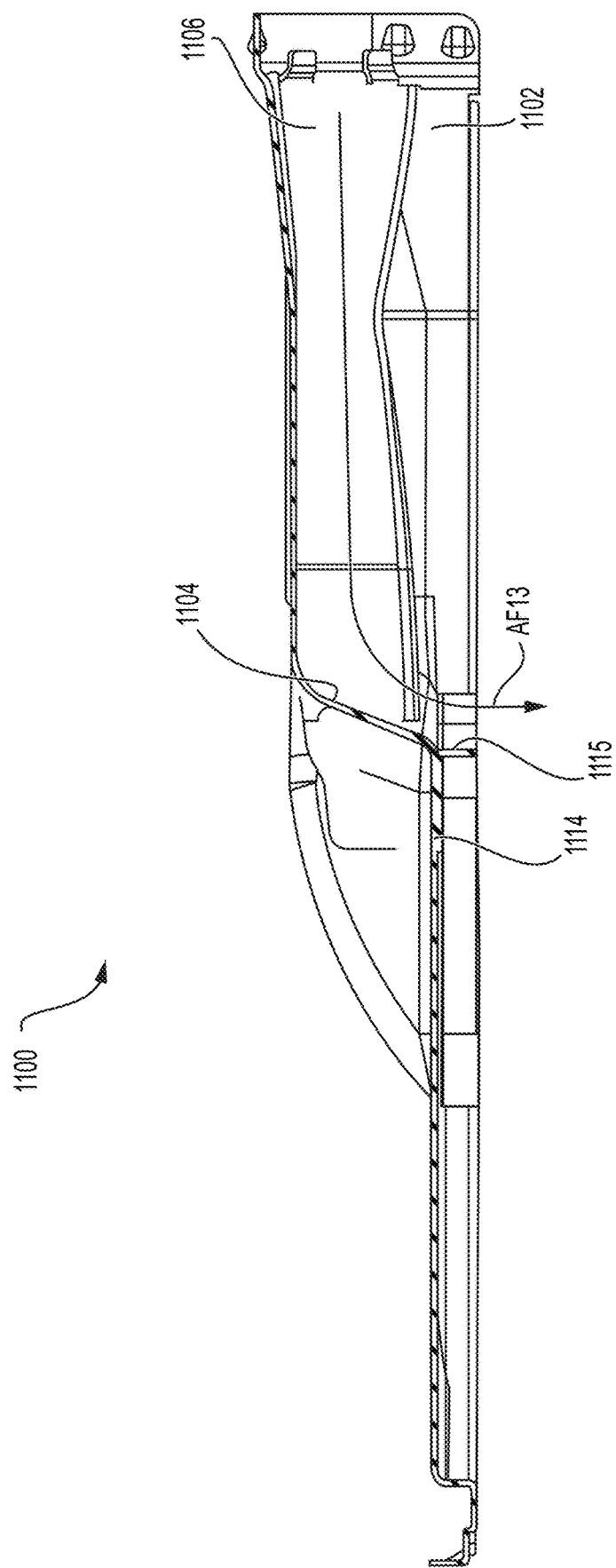
FIG. 56 is a cross-sectional view of the cooking chamber top plate of FIG. 52 taken along line 56-56 in FIG. 54.
Figure 57:
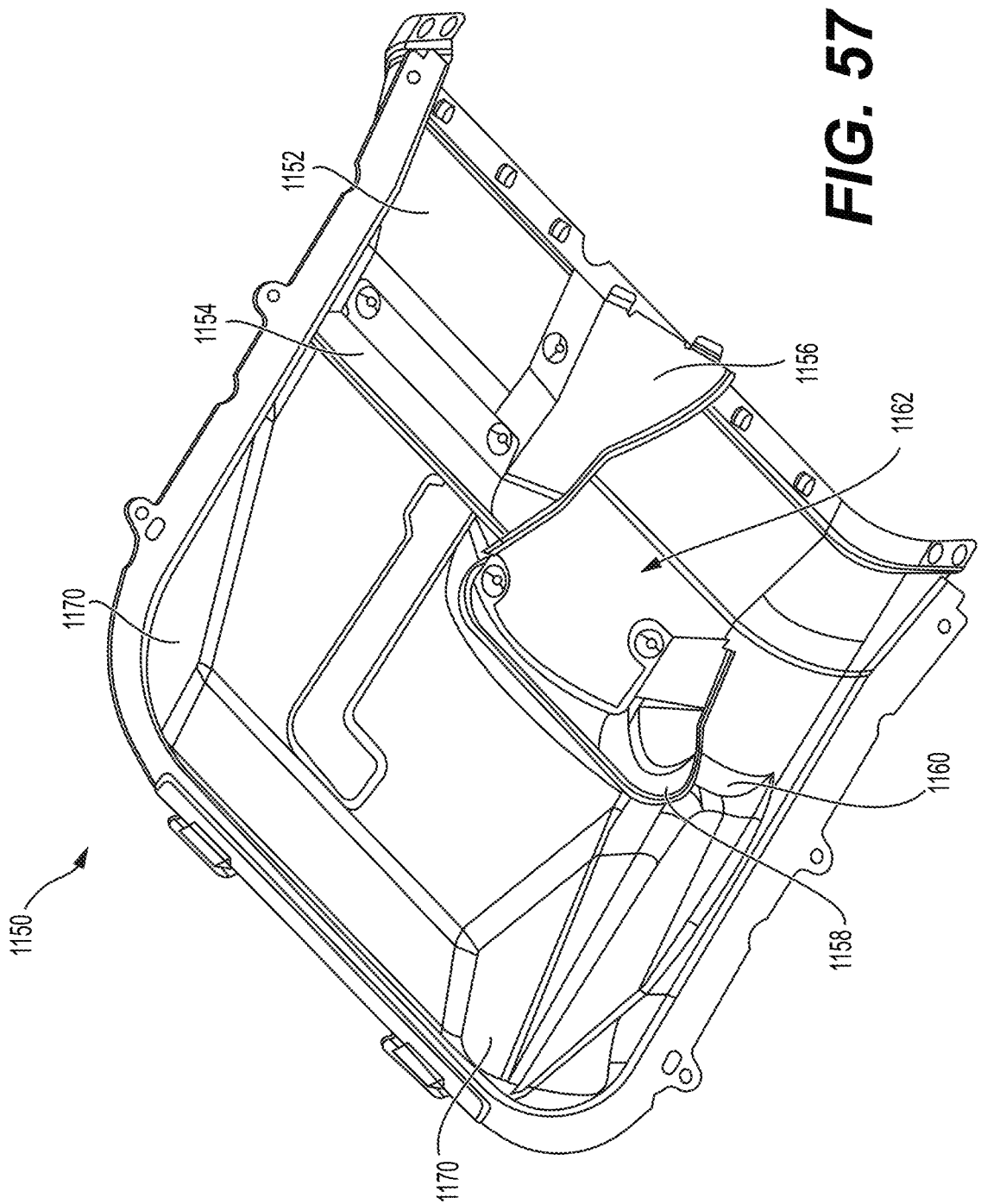
FIG. 57 is a front bottom perspective view of an embodiment of a cooking chamber top plate for use with the cooking system of FIG. 1.
Figure 58:
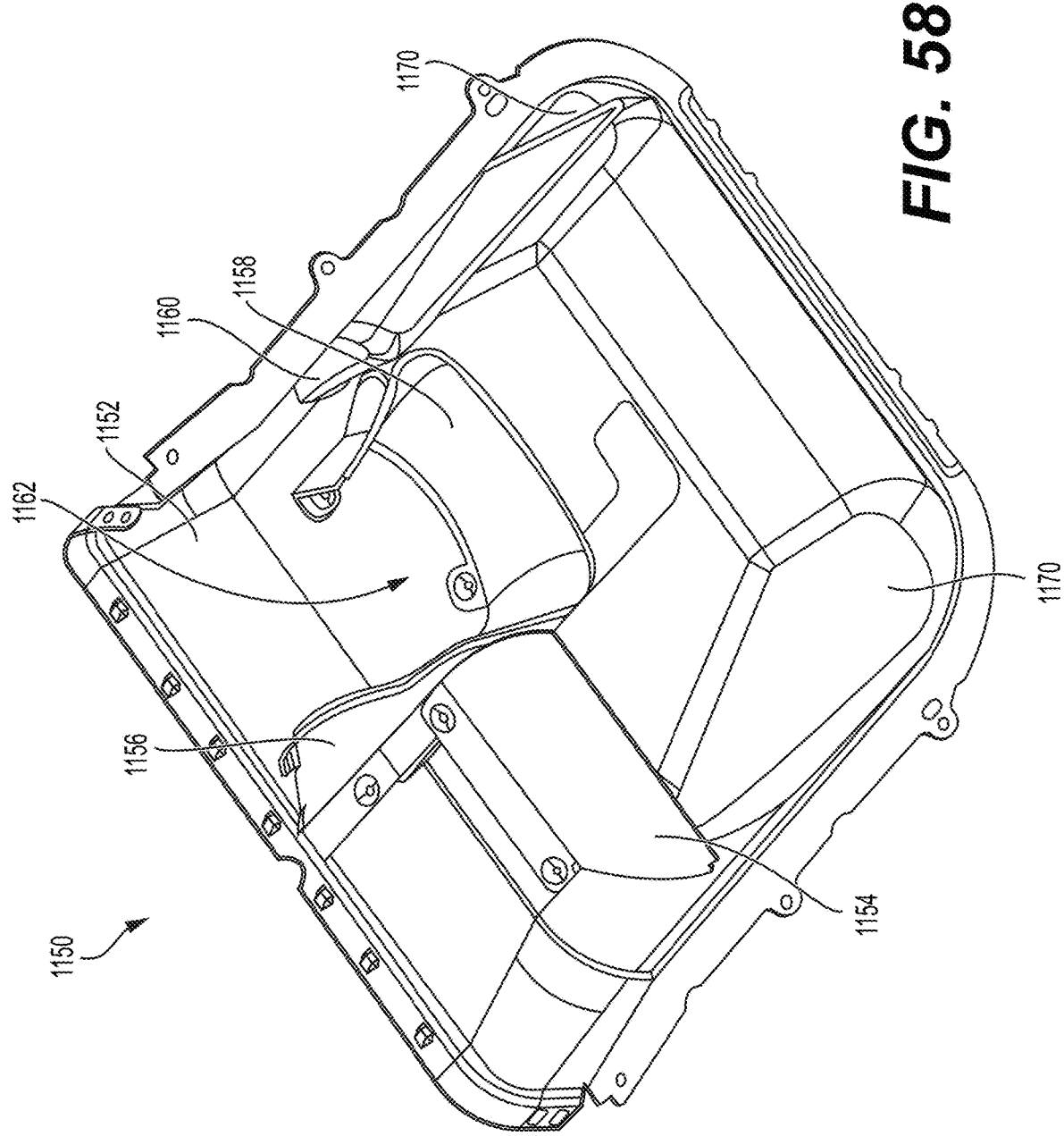
FIG. 58 is a rear bottom perspective view of the cooking chamber top plate of FIG. 57.

In addition to the baffle plate 1114, the vane 1106 is positioned to aid in reducing the rotational flow of the airflow coming off the fan, and also to separate the airflows contacting the surfaces 1104, 1108, 1112, allowing for different portions of the airflow to travel parallel to one another at least partially along the length of the upper shell 1100. The air flow can be directed horizontally through the cooking volume using the vane 1106, which helps increase horizontal flow. The vane 1106 is secured to the top surface 1102, and can extend partially along the longitudinal length of the top surface 1102. In some embodiments, the vane 1106 can extend such that it contacts the baffle plate 1114, separating the airflow into two side by side airflows. As depicted in FIGS. 54-56, the airflow AF12 travels along the vane 1106, through the gap 1110, and contacts the surface 1112 to be directed downward. Additionally, an airflow AF14 can contact the surface 1108 and be directed downward into the internal volume without passing through the gap 1110. The airflow AF13 travels on the opposite side of the vane 1106 compared to the airflow AF12, and contacts the surface 1104 to be directed downward. Since the vane 1106 extends to and through the gap 1110, the airflow AF12 is partially isolated from the airflow AF13, which directed a portion of the airflow downward via surface 1104 instead of passing through the gap 1110.

Referring now to FIGS. 57-61, an embodiment of an upper shell 1150 is depicted. The upper shell 1150 is similar to the upper shell 1000. As such, like components are not described in detail. The upper shell 1150 includes a top surface 1152, a first baffle 1154, a vane 1566, and a second baffle 1158. The top surface 1152 also includes directional surfaces 1170 positioned at the end of the upper shell 1150 to direct air downward that has traveled the length of the upper shell 1150. The first baffle 1154 is positioned on the upper shell 1150 and extends substantially parallel across the width of the upper shell 1150. The first baffle 1154 directs air coming off the fan downward into the internal volume. The first baffle 1154 extends to the guide vane 1156, which contacts the baffle 1154, creating a semi-isolated path for air to travel prior to contacting the first baffle 1154. Due to the location of the baffle 1154, there is less rotational energy in the air flow due to the proximity to the edge of the upper shell 1150, and the edge of the internal volume which the upper shell 1150 forms a portion of. As such, the air flow can be deflected and travel substantially horizontal along the length of the upper shell 1150. The first baffle 1154 can extend a length L1 within a range of 70 mm to 90 mm, and preferably between 78 mm to 82 mm in order to contact the guide vane 1156. In an embodiment, the length L1 can be between ¼ to ½ the total width of the upper shell. This distance can ensure that a correct portion of the airflow from the fan is divided and contacts the first baffle 1154 for equal air distribution within the internal volume.

The second baffle 1158 is arranged adjacent to the first baffle 1154. The first baffle 1154 and the second baffle 1158 can be positioned at different longitudinal lengths along the length of the upper shell 1150. The second baffle 1158 is connected to the guide vane 1156, and creates a semi-isolated channel from the channel formed by the first baffle 1154 and the guide vane 1156, with the guide vane 1156 separating the two air flows. This is to aid is evenly distributing horizontal air moving along the top surface 1152. The second baffle 1158 can extend a length L2 within a range of 50 mm to 70 mm, and preferably between 60 mm to 63 mm in order to contact the guide vane 1156. In an embodiment, the length L2 can be between ¼ to ½ the total width of the upper shell. This distance ensures that a correct portion of the airflow from the fan is divided and contacts the second baffle 1158 for equal air distribution within the internal volume.

A gap 1162 is formed by the second baffle 1158 to funnel air downward. The gap 1162 allows horizontal air moving through the center of the volume to travel further longitudinally than air traveling along the sides, since the air traveling along the edges is deflected by the first baffle 1154 and the deflection surface 1160. The deflection surface can extend across the width of the upper shell 1150 a length L3 within a range of 25 mm to 40 mm, and preferably between 30 mm to 35 mm in order to extend between the edge of the upper shell 1150 and the second baffle 1158. In an embodiment, the length L3 can be between 1/10 to 1/3 the total width of the upper shell. This distance ensures that a correct portion of the airflow from the fan is divided and contacts the deflection surface 1160 for equal air distribution within the internal volume.

The baffles 1154, 1158 are positioned substantially perpendicular across the width of the upper shell 115 and aid in directing horizontal airflow downward into the internal volumes. The baffles 1154, 1158 are connected to the top surface 1152 through mechanical means (i.e., rivets) or an adhesive, but other like securement means should be considered within the scope of this disclosure.

Figure 59:
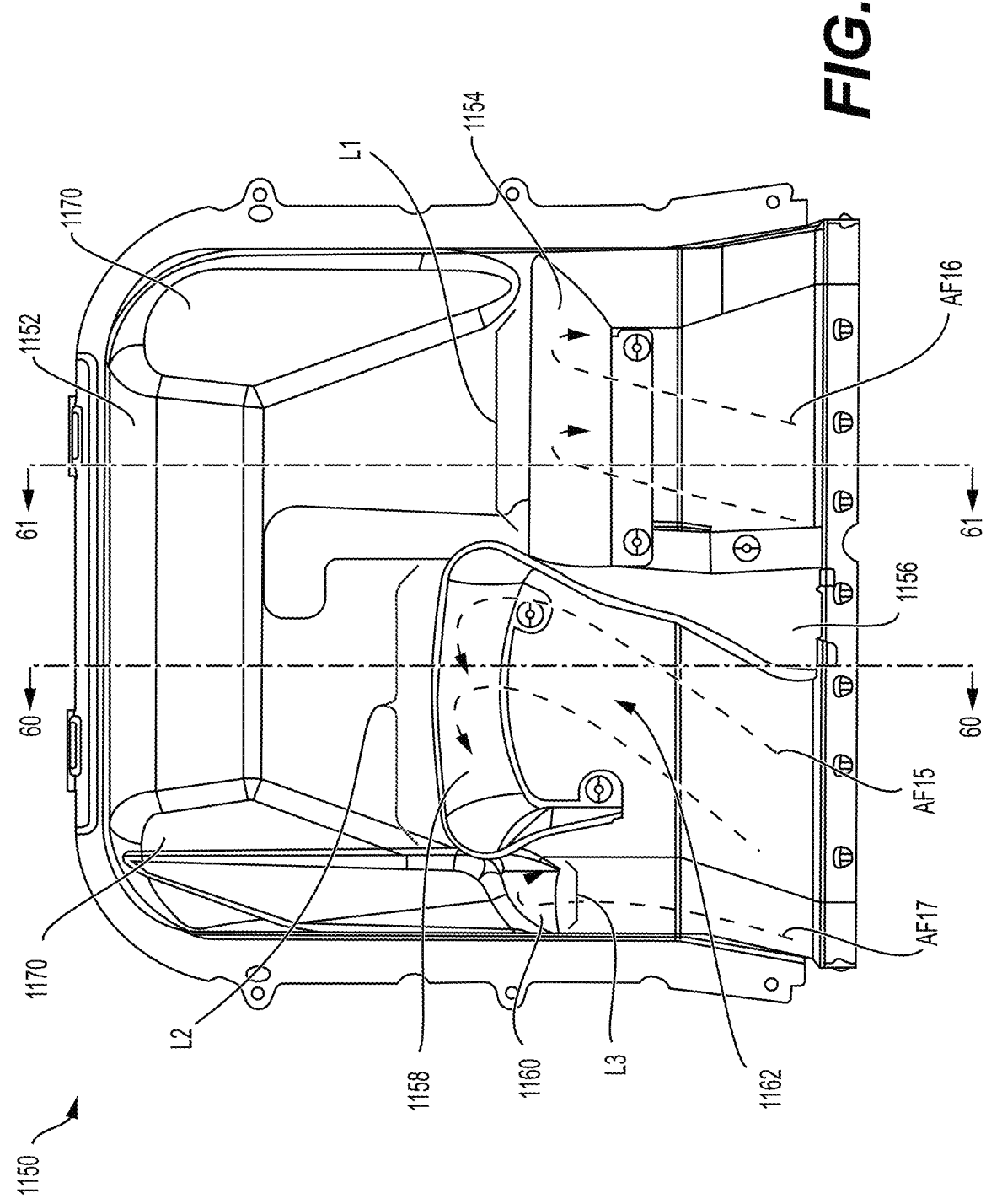
FIG. 59 is a bottom view of the cooking chamber top plate of FIG. 57.
Figure 60:
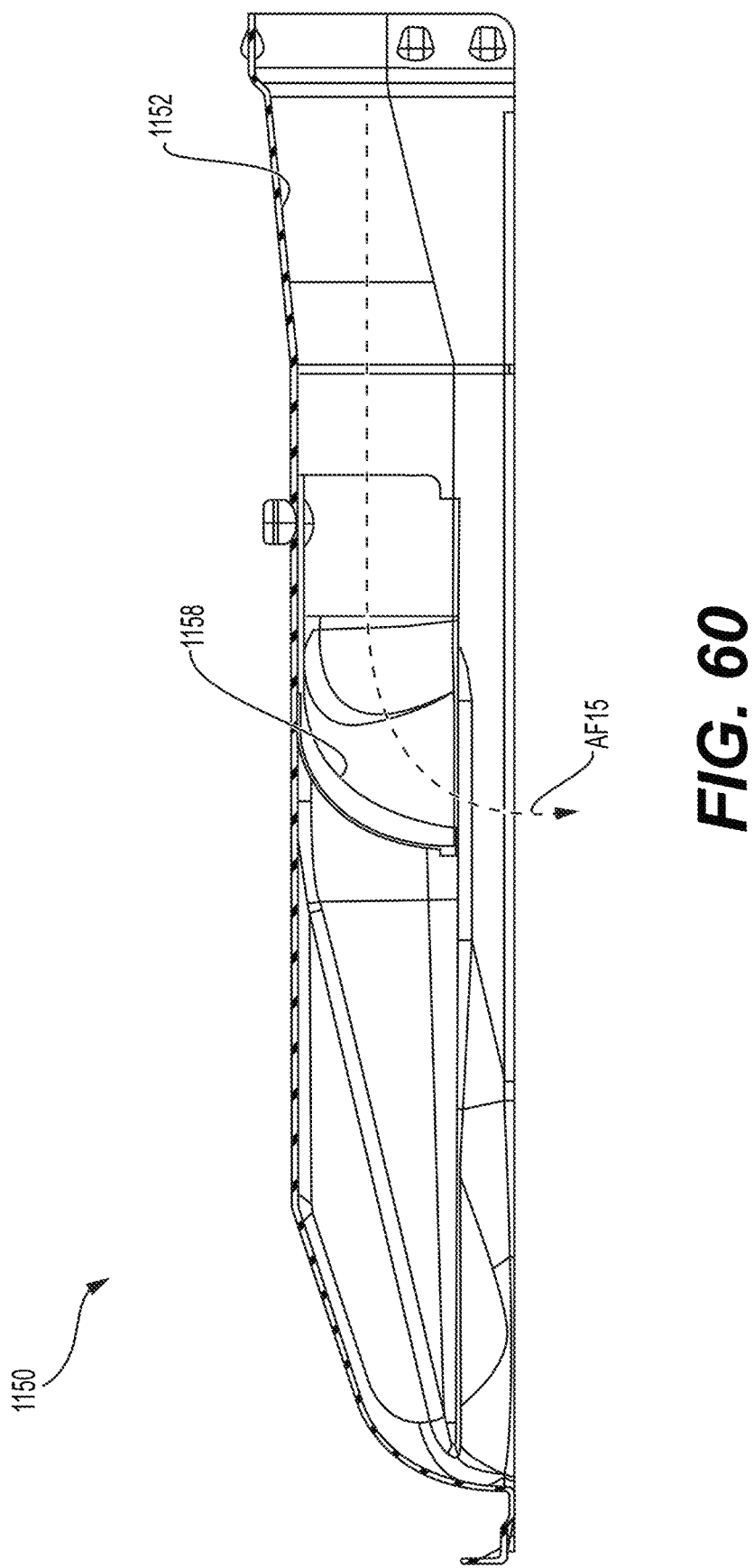
FIG. 60 is a cross-sectional view of the cooking chamber top plate of FIG. 57 taken along line 60-60 in FIG. 59.
Figure 61:
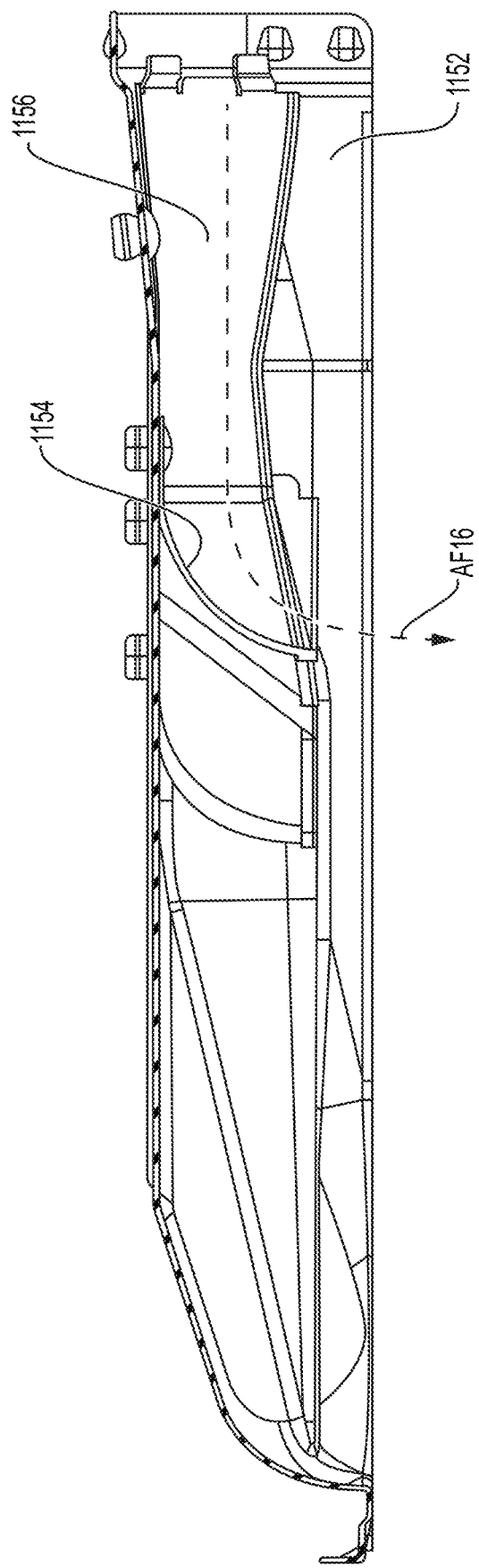
FIG. 61 is a cross-sectional view of the cooking chamber top plate of FIG. 57 taken along line 61-61 in FIG. 59.

In addition to the baffles 1154, 1158, the vane 1156 is positioned to aid in reducing the rotational flow of the airflow coming off the fan, and also to separate the airflow into different portions. The air flow can be directed horizontally through the cooking volume using the vane 1156, which helps increase horizontal flow. The vane 1156 is secured to the top surface 1152, and can extend partially along the longitudinal length of the top surface 1152. In some embodiments, the vane 1156 can extend such that it contacts the baffles 1154 and 1158, separating the airflow into two side by side parallel airflows. As depicted in FIGS. 59-61, the airflow AF15 travels along the vane 1156, through the gap 1162, and contacts the baffle 1158 to be directed downward into the internal volume. Additionally, an airflow AF17 can contact the surface 1160 and be directed downward into the internal volume without passing through the gap 1162. The airflow AF16 travels on the opposite side of the vane 1156 compared to the airflow AF15, and contacts the baffle 1154 to be directed downward. Since the vane 1156 extends to the baffles 1154, 1158, the airflow AF16 is partially isolated from the airflow AF15 and AF17.

Figure 62:
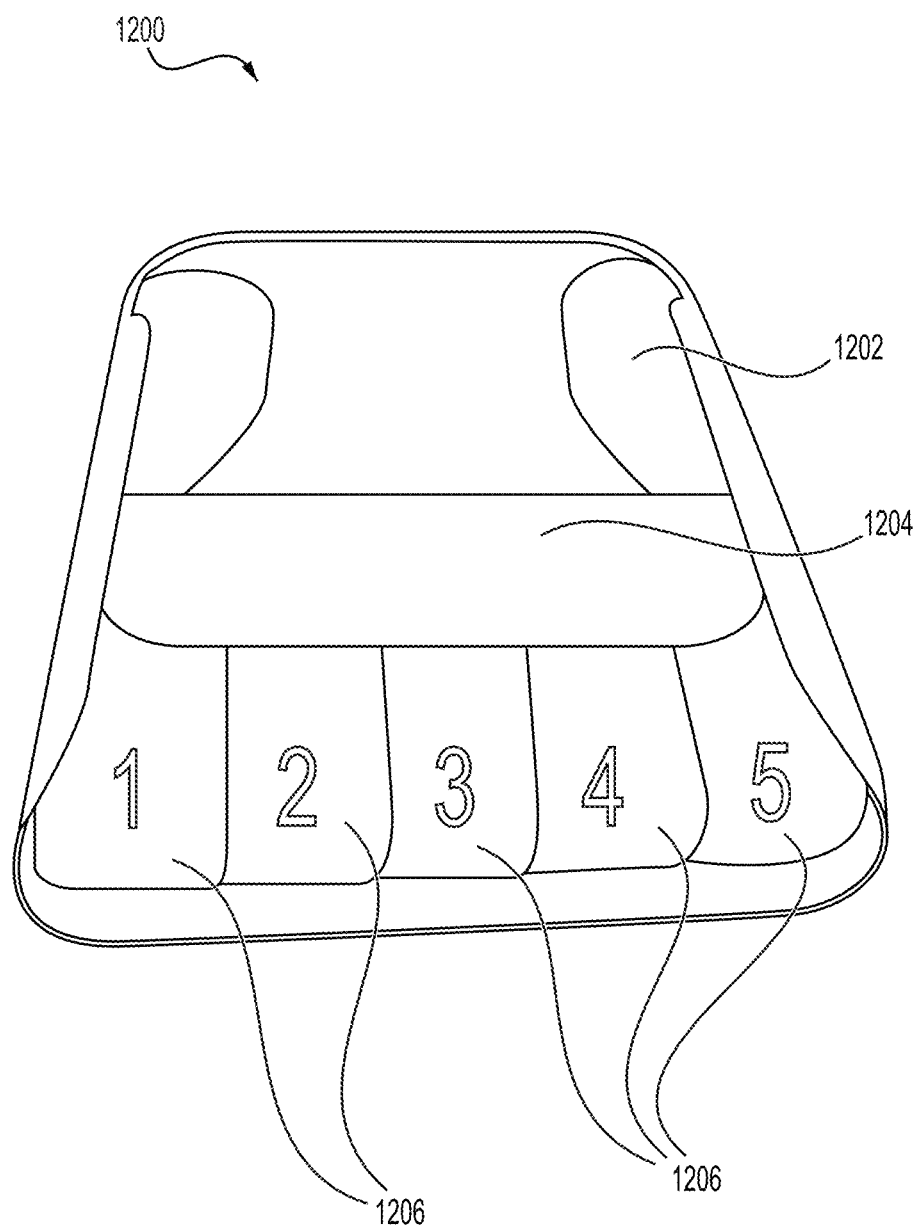
FIG. 62 is a rear bottom perspective view of an embodiment of a cooking chamber top plate for use with the cooking system of FIG. 1.

Referring now to FIG. 62, an embodiment of an upper shell 1200 is depicted. The upper shell 1200 is similar to the upper shell 900. As such, like components are not described in detail. The upper shell 1200 includes a top surface 1202, a baffle 1204, and vanes 1206. The baffle 1204 is positioned on the upper shell 1200 and extends substantially parallel across the width of the upper shell 1200. The vanes 1206 are positioned upstream of the baffle 1204, and are positioned substantially parallel to one another. This creates channels therebetween the vanes 1206, which can aid in reducing rotation flow of air coming off the fan as it travels down the longitudinal length of the upper shell 1200.

Figure 63:
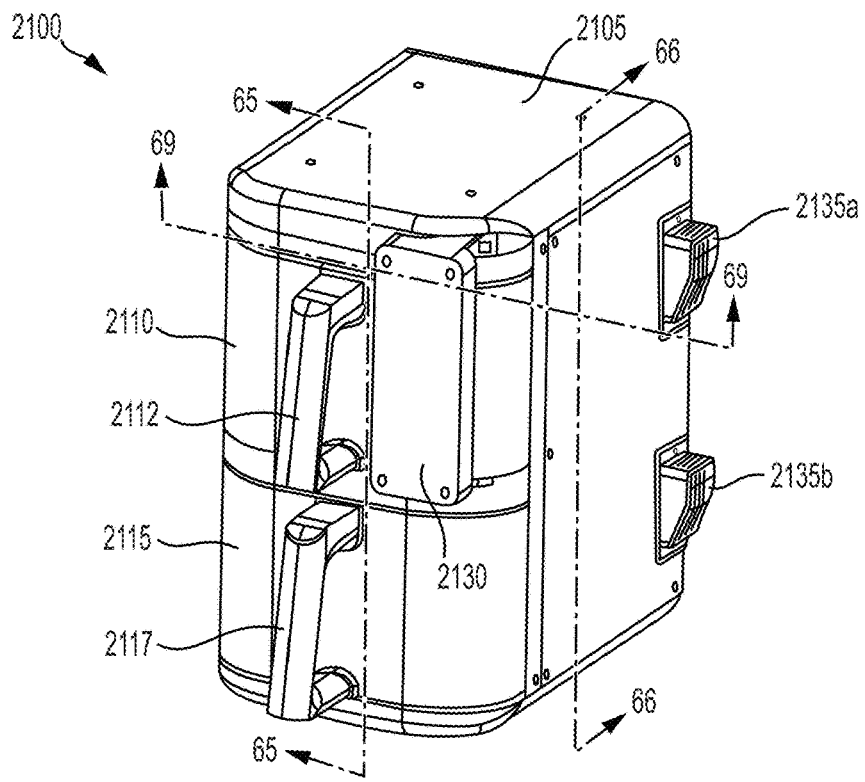
FIG. 63 is a front perspective view of an embodiment of a cooking system according to the subject matter described herein.
Figure 64:
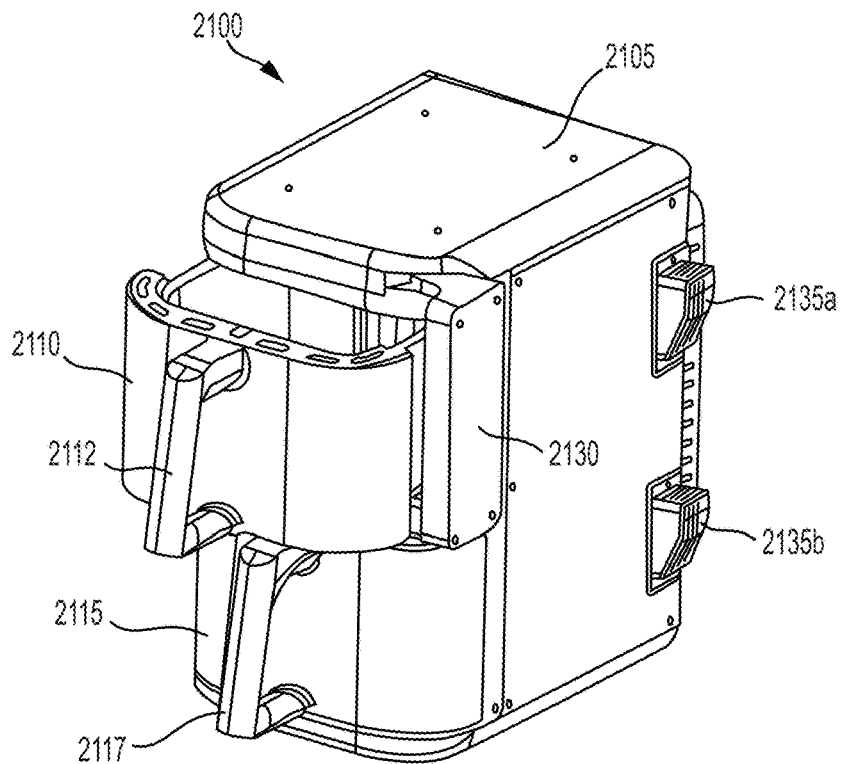
FIG. 64 is a front perspective view of the cooking system of FIG. 63.

FIGS. 63-64 are perspective views of an embodiment of a cooking system 2100 according to the subject matter described herein. In some embodiments, the cooking system 2100 can include a housing 2105, and first and second cooking containers 2110, 2115 that can be removably positioned within vertically aligned first and second internal volumes 2120, 2125, along first and second insertion axes X1, X2 respectively, in reference to FIG. 65, as discussed in greater detail below. The first and second cooking containers 2110, 2115 can include first and second cooking volumes (e.g., first and second cooking volumes 2111, 2116 of FIG. 65) and first and second handles 2112, 2117 located on a front face of the first and second cooking containers 2110, 2115, respectively. In some embodiments, the first and second cooking containers 2110, 2115 can be identical. In this case, the first and second cooking containers 2110, 2115 can be interchangeably positioned within either the first or the second internal volumes 2120, 2125. In some embodiments, the cooking system 2100 can further include a user interface 2130 that is rotatably coupled to the housing 2105 as discussed in greater detail below. The cooking system 2100 can also include first and second moisture vents 2135a, 2135b configured to vent moisture from the first and second internal volumes 2120, 2125, respectively, during a cooking operation.

Figure 65:
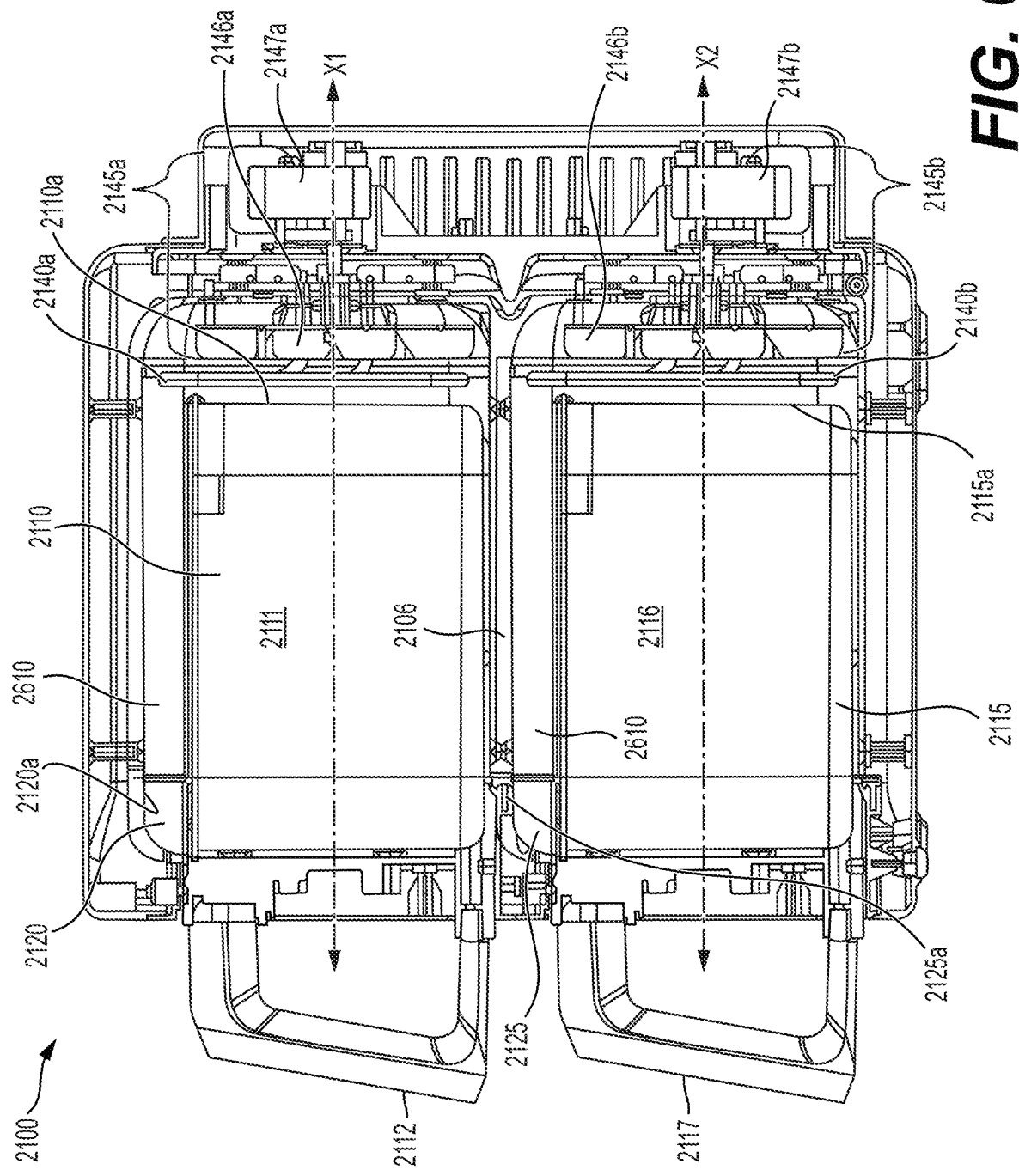
FIG. 65 is a cross-sectional view of the cooking system of FIG. 63 taken along line 65-65 in FIG. 63.

FIG. 65 is a cross-sectional view of the cooking system 2100 of FIG. 63 with the first and second cooking containers 2110, 2115 positioned within the vertically aligned first and second internal volumes 2120, 2125, respectively. As illustrated in FIG. 65, the second internal volumes 2120, 2125 are fluidly separate from one another by a separator 2106 of the housing 2105.

Figure 66:
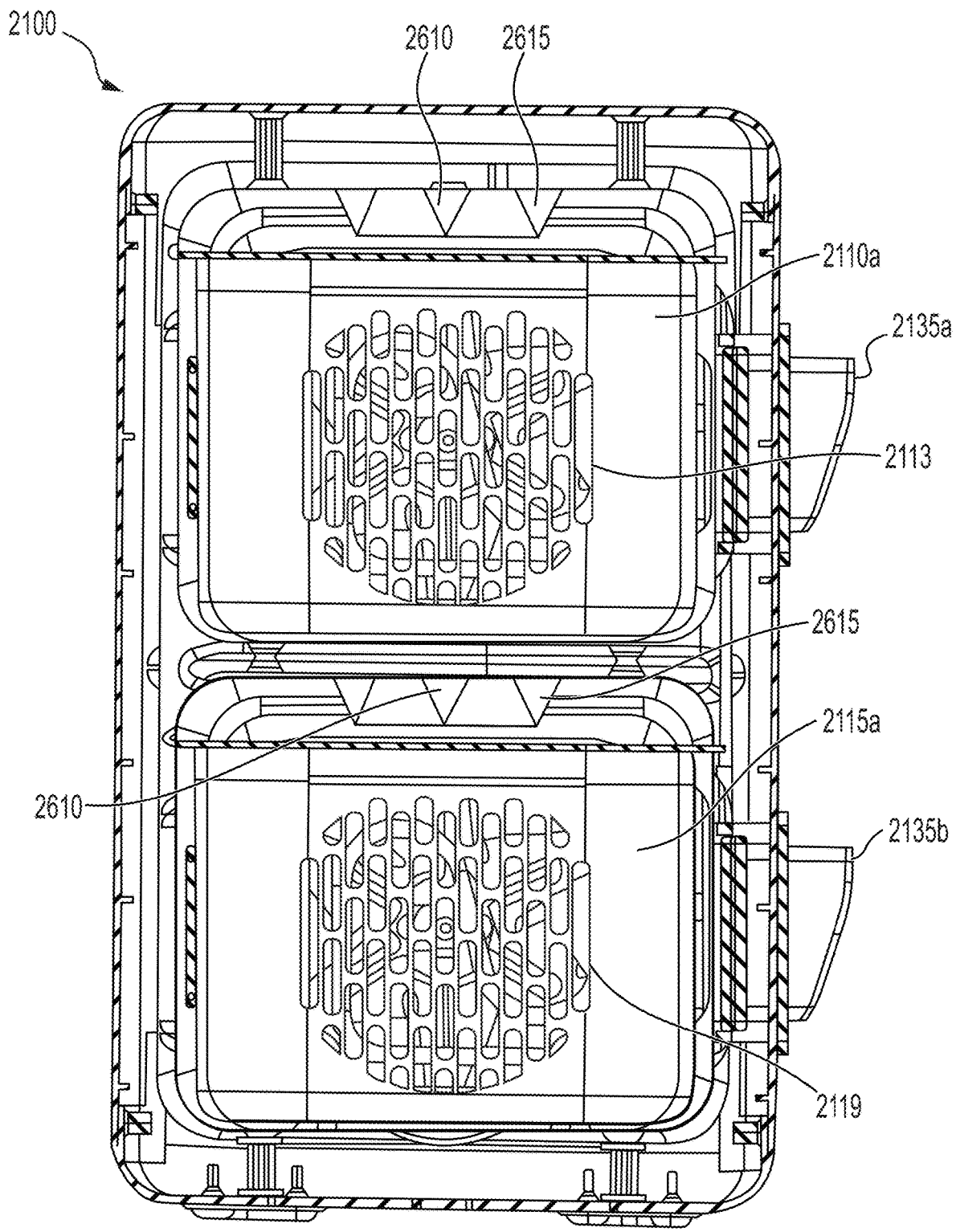
FIG. 66 is a cross-sectional view of the cooking system of FIG. 63 taken along line 66-66 in FIG. 63.
Figure 67:
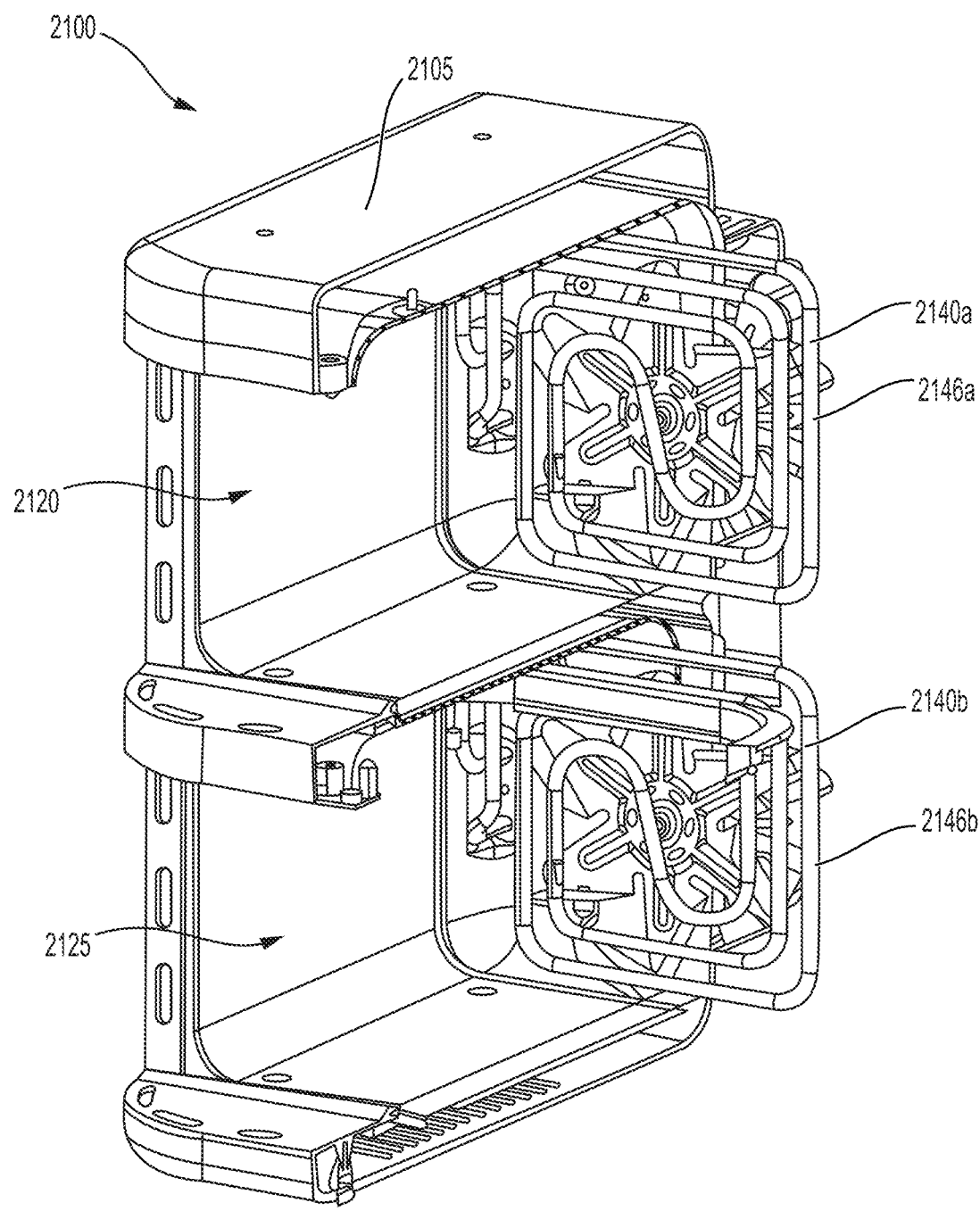
FIG. 67 is a partial perspective cross-sectional view of the cooking system of FIG. 63 with cooking containers removed.

As further illustrated in FIGS. 66-67, the cooking system 2100 can include first and second heating elements 2140a, 2140b configured to impart heat to the first and second internal volumes 2120, 2125, respectively during one or more modes of operation of the cooking system 2100. As shown in FIG. 65, the first and second heating elements 2140a, 2140b are positioned within the housing 2105 at a rear of the first and second internal volumes 2120, 2125, respectively. The first and second heating elements 2140a, 2140b can be configured to heat one or more food items located within the cooking volumes of the first and second cooking containers 2110, 2115 via conduction, convection, radiation, and induction. In the illustrated embodiment, the first and second heating elements 2140a, 2140b are convective heating elements, and the cooking system 2100 additionally includes first and second air movement devices 2145a, 2145b, including fans 2146a, 2146b, operable to circulate air through the first and second internal volumes 2120, 2125, respectively. In some embodiments, the fans 2146a, 2146b can be powered by motors 2147a, 2147b, that can be stacked vertically and located at a back of the housing 2105. The first fan 2146a, first heater 2140a, and first container 2110 can be horizontally aligned along the first insertion axis X1. Similarly, second fan 2146b, second heater 2140b, and second container 2115 can be horizontally aligned along the second insertion axis X2. In some embodiments, one or more vents 2107 can be provided at the rear of the housing 2105 for exhausting hot air generated by operation of the motors 2147a, 2147b to the exterior of the cooking system 2100. In some embodiments, fans 2146a, 2146b can be variable speed fans operable at a plurality of rotational speeds. In some embodiments, the operational speed of the first and second air movement devices can vary based on the cooking mode selected. For example, the speed of the first and second air movement devices during operation in a first cooking mode may be different than the speed of the first and second air movement devices during operation in a second cooking mode. The operational speed of the first and second air movement devices may be controlled by interacting with the user interface 2130 of FIG. 63, as discussed in greater detail below.

Figure 68:
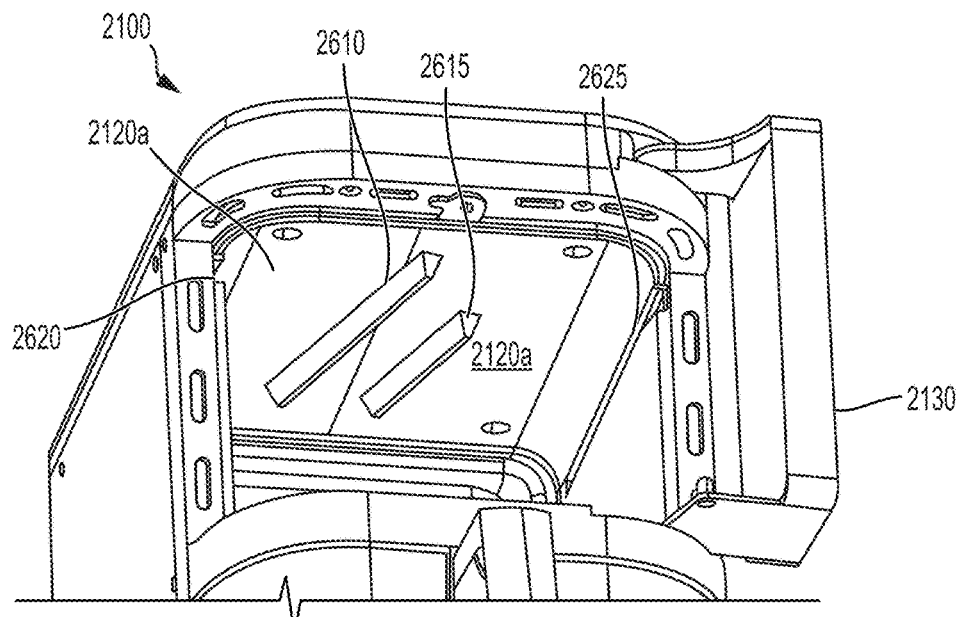
FIG. 68 is a perspective view of an internal volume of the cooking system of FIG. 63 with a cooking container removed.

FIG. 68 is a perspective view of a top surface 2120a of the first internal volume 2120 of cooking system 2100 (or cooking system 2500, as discussed in greater detail below). In some embodiments, a top surface of the second internal volume 2125 of cooking system 2100 can be the same as the top surface 2120a, accordingly, like components will not be described. As shown in FIG. 68, the top surface 2120a can include one or more guide vanes (e.g., first and second guide vanes 2610, 2615) extending along the top surface 2120a from a rear section of the internal volume 2120 to a front section of the internal volume 2120. In some embodiments the first and second guide vanes 2610, 2615 can be parallel to one another. As mentioned above, in reference to embodiments 2200, 2300, and 2400, some of the airflow from the fan 2146a can be configured to pass vertically over the rear wall 2230, 2330, 2430 into the cooking volume 2235, 2335, 2435 through the top opening 2207, 2307, 2407. However, due to the central axis of the fan (insertion axis X1) being perpendicular to the rear wall 2230, 2330, 2430, the airflow from the fan 2146a that passes vertically over the rear wall 2230, 2330, 2430 can naturally flow diagonally across the top surface 2120a, and adversely provide more airflow to one side of the cooking volume than the other. Accordingly, guide vanes 2610, 2615 can be provided to redirect the airflow from the fan 2146a that passes vertically over the rear wall 2110a, 2230, 2330, 2430 to evenly disperse the airflow across the top openings 2110b, 2207, 2307, 2407, as discussed in greater detail below. In some embodiments, the first and second guide vanes 2610, 2615 can be triangular in cross-section, as illustrated in FIG. 66. In other embodiments, the one or more guide vanes can be fin-shaped and protrude orthogonally (or at some other angle) downward from the top surface 2120a. In some embodiments, the one or more guide vanes 2610, 2615 can be formed integrally with the top surface 2120a. In other embodiments the one or more guide vanes 2610, 2615 can be formed separately and attached can be permanently, or removably coupled to the top surface 2120a (e.g., via a welded or a bolted connection, respectively). Additionally, in some embodiments (e.g., embodiments wherein basket 2306 or 2406 is being used), the internal volume 2120 can include rails 2620, 2625 configured to receive a rim (e.g., rim 2308, 2408 of the basket 2306, 2406) as a cooking container (e.g., cooking container 2110) is inserted into the internal volume 2120.

Figure 69:
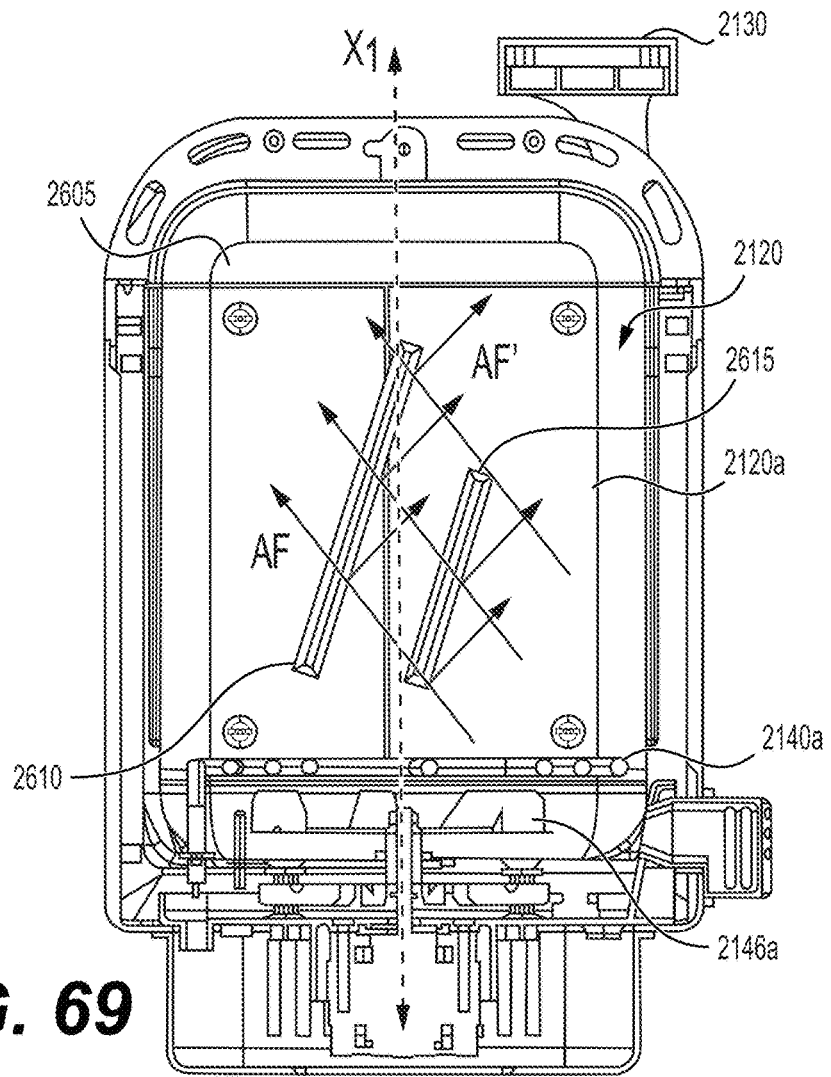
FIG. 69 is a cross-sectional view of the cooking system of FIG. 63 taken along line 69-69 in FIG. 1.
Figure 70:
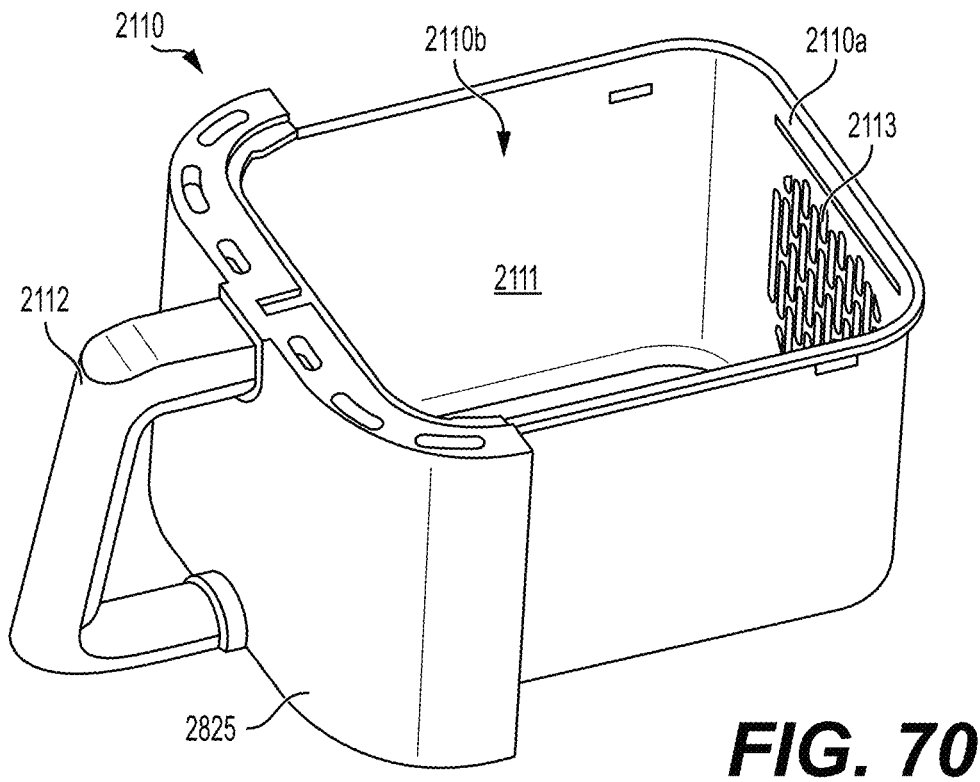
FIG. 70 is a front top perspective view of a cooking container of the cooking system of FIG. 63.
Figure 71:
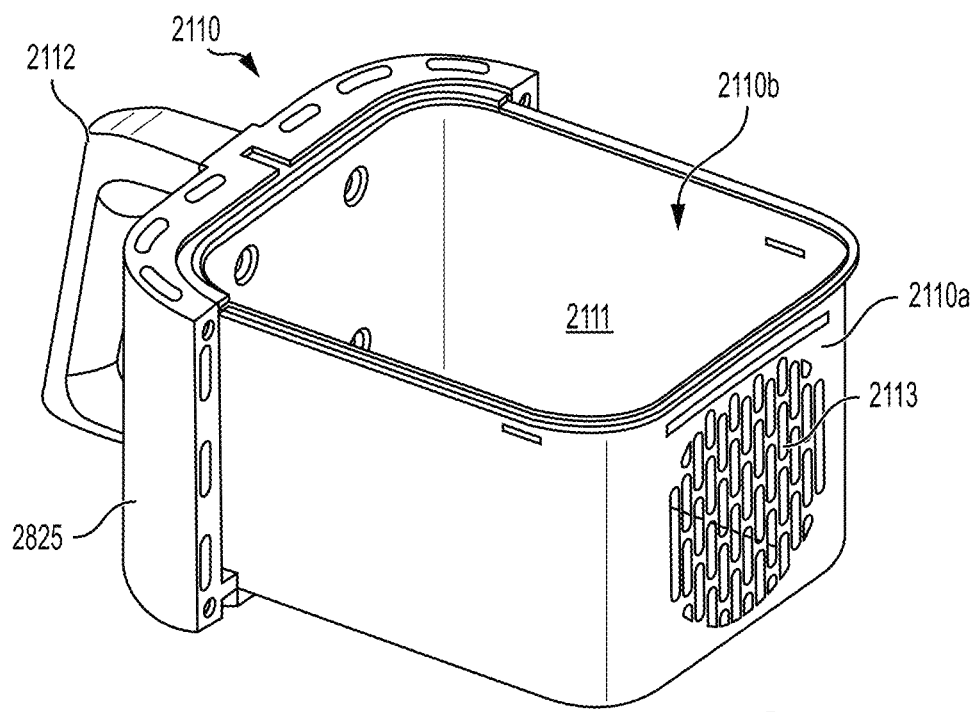
FIG. 71 is a rear top perspective view of the cooking container of FIG. 70.
Figure 72:
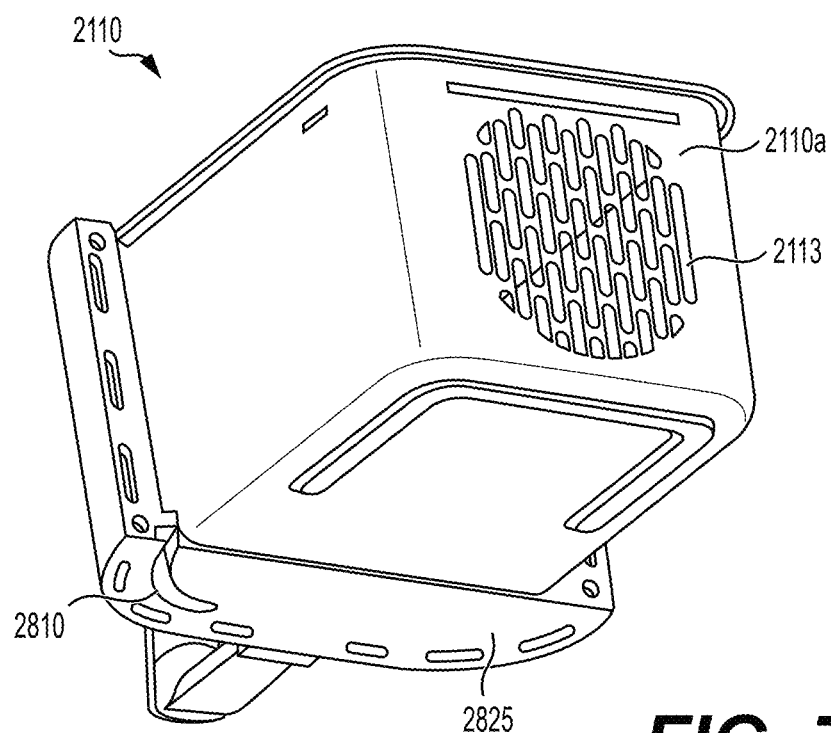
FIG. 72 is a rear bottom perspective view of the cooking container of FIG. 70.
Figure 73:
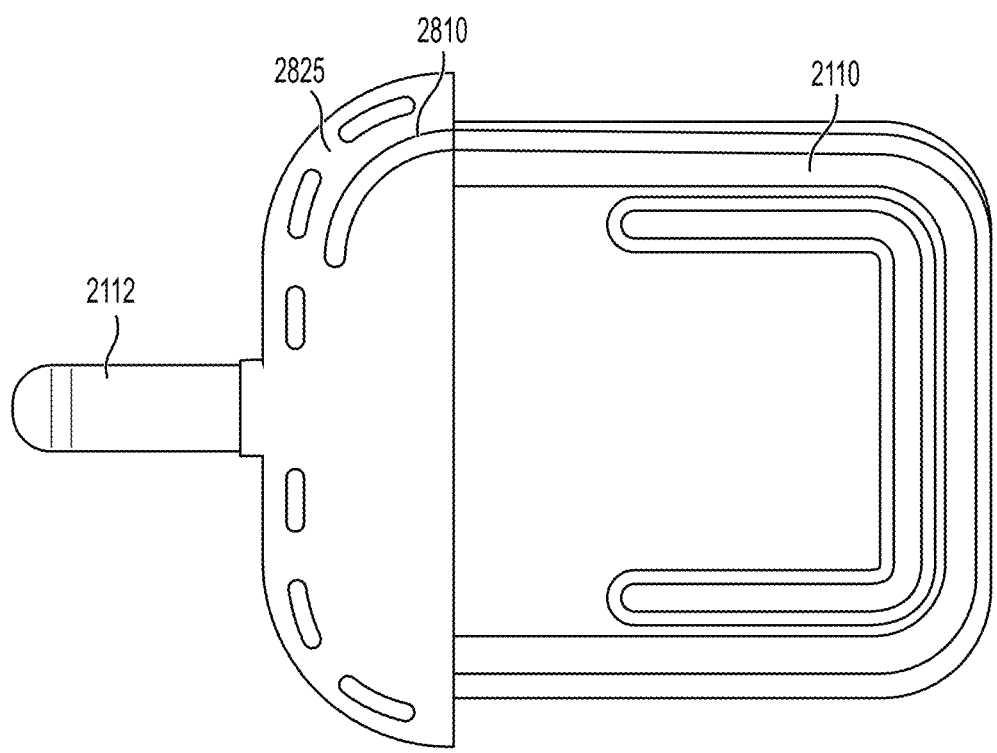
FIG. 73 is a bottom view of the cooking container of FIG. 70.

FIG. 69 is a bottom view of the top surface 2120a of FIG. 68. As illustrated in FIG. 69, the first and second guide vanes 2610, 2615 can be positioned to extend at an acute angle relative to the insertion axis X1. However, in some embodiments, the first and second guide vanes 2610, 2615 can be positioned to extend parallel to the insertion axis X1. Additionally, as illustrated in FIG. 69, the first guide vane 2610 can have a first length, and the second guide vane 2615 can have a second length. In some embodiments, the first length can be greater than the second length.

As described above, during a cooking operation, some of the airflow from the fan 2146a can be configured to pass through the first heating element 2140a, through the plurality of through-bores (e.g., through-bores 2240, 2245, 2250, and 2255 of embodiment 2200) into the cooking volume 2235, and pass horizontally over a food load positioned within the cooking volume 2235. Additionally, some of the airflow from the fan 2146a can be configured to pass vertically over the rear wall 2230, and diagonally across the top surface 2120a. For example, in some embodiments, the fan 2146a can be configured to rotate counter clockwise, causing airflow AF to pass diagonally across the top surface 2120a as shown. In this example, some of the airflow AF can come into contact with the one or more guide vanes 2610, 2615 and be redirected, as indicated, for example, by redirected airflow AF".

FIGS. 70-73 illustrate the cooking container 2110. As stated above, the cooking container 2110 is positioned within the internal volume 2120. The cooking container 2110 includes a rear wall 2110a having through-bores 2113 arranged therein in order to allow air to pass back to the heater and air movement device. Additionally, the cooking container 2110 also includes an open top 2110b, which allows air from the guide vanes to enter the cooking container and pass over a food load therein. Similarly, the cooking container 2115 includes a rear wall 2115a having through-bores 2119.

Figure 74:
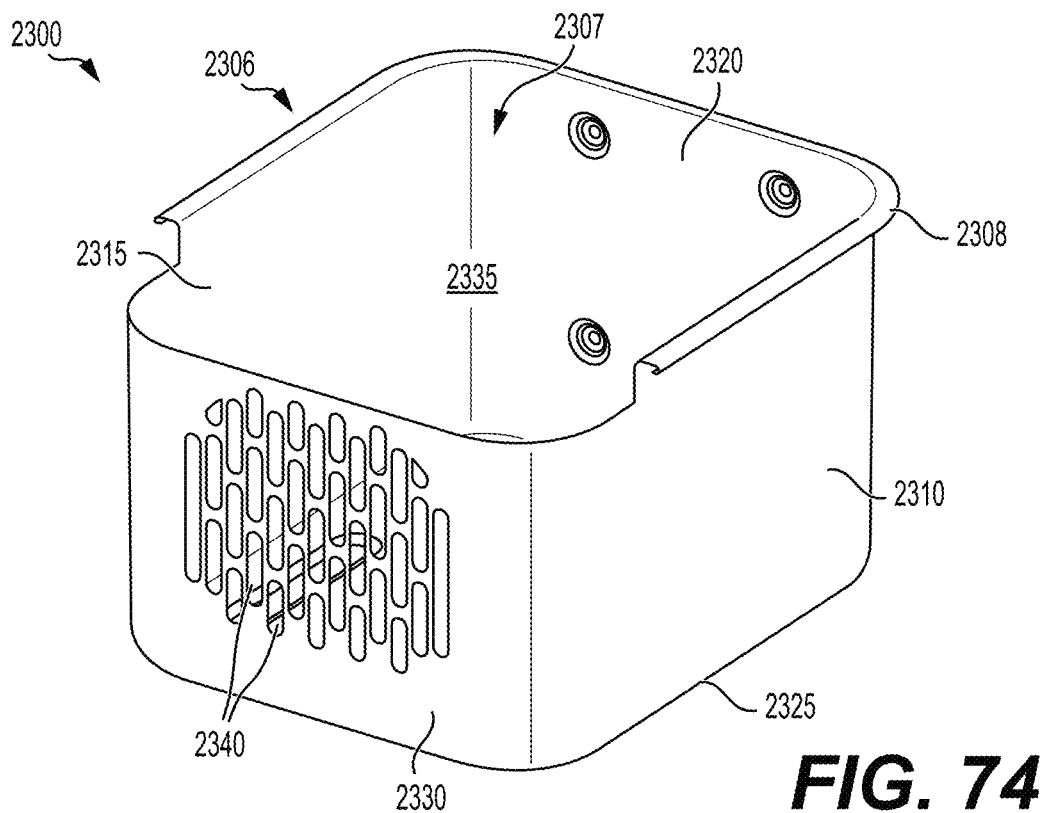
FIG. 74 is a perspective view of one embodiment of a cooking container.

FIG. 74 is a rear perspective view of another embodiment 2300 of a basket 2306 that can be used in place of the basket 2110, as discussed in greater detail below. Similarly to the basket 2110, basket 2306 can include a top opening 2307, sidewalls 2310, 2315, front wall 2320, base 2325, and rear wall 2330, all of which together define a cooking volume 2335 therein. In some embodiments, the basket 2306 can also include a rim 2308 spanning a top edge of the sidewalls 2310, 2315, and front wall 2320 and configured to be received by rails within the first or second internal volumes 2110, 2116 (in reference to FIG. 65), as discussed in greater detail below. In some embodiments, the rim 2308 can protrude outward from the cooking volume, and when engaged with the rails of the first or second internal volumes, can prevent airflow from passing over top of the sidewalls 2310, 2315 and into the cooking volume 2335 from outside of the basket 2306. The basket 2306 can also include a plurality of through-bores 2340 within the rear wall 2330 of the cooking container 2305. In some embodiments, the plurality of through-bores 2340 can be positioned in uniformly around a center of the rear wall 2330. During a cooking operation using the cooking container 2305, with basket 2306, rather than basket 2110, some of the airflow from a fan (e.g., fan 2146a) can be configured to pass through a heating element (e.g., heating element 2140a), through the plurality of through-bores 2340 into the cooking volume 2335, and pass horizontally over a food load positioned within the cooking volume 2335. In some embodiments, the plurality of through-bores 2340 can be stadium shaped, as illustrated, however, in other embodiments, the plurality of through-bores 2340 can be circular, rectangular, or any other viable shape. Additionally, some of the airflow from the fan 2146a can be configured to pass vertically over the rear wall 2330 into the cooking volume 2335 through the top opening 2307, as described in greater detail below.

Figure 75:
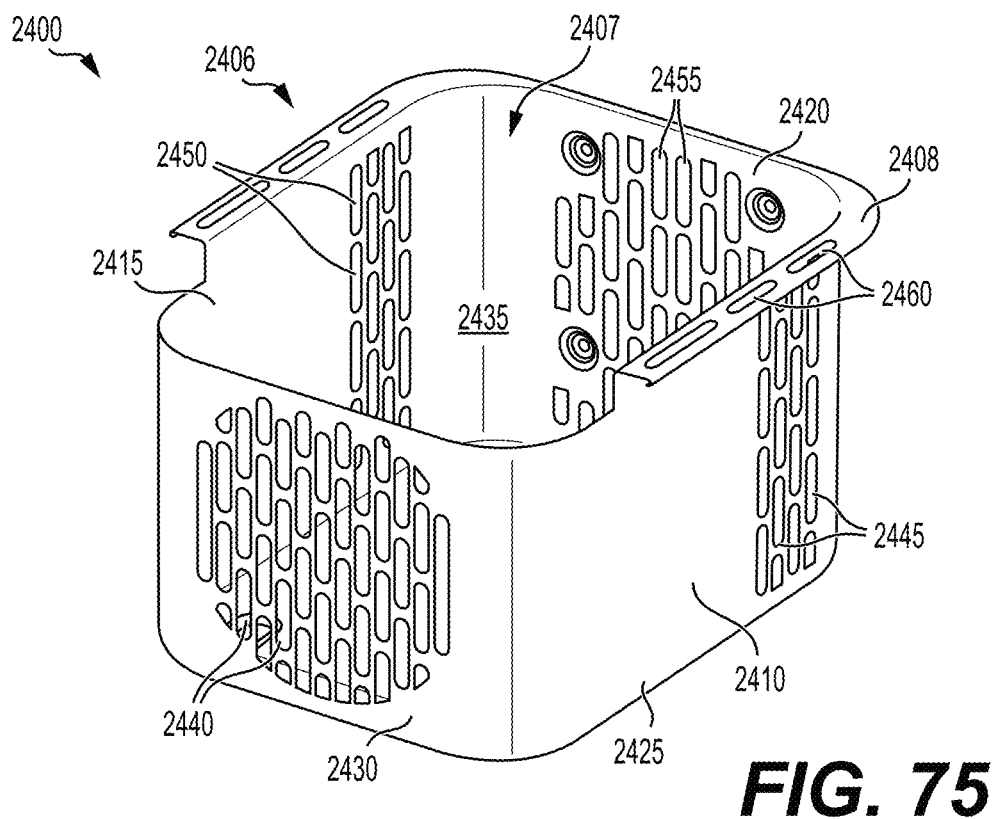
FIG. 75 is a perspective view of one embodiment of a cooking container.
Figure 76:
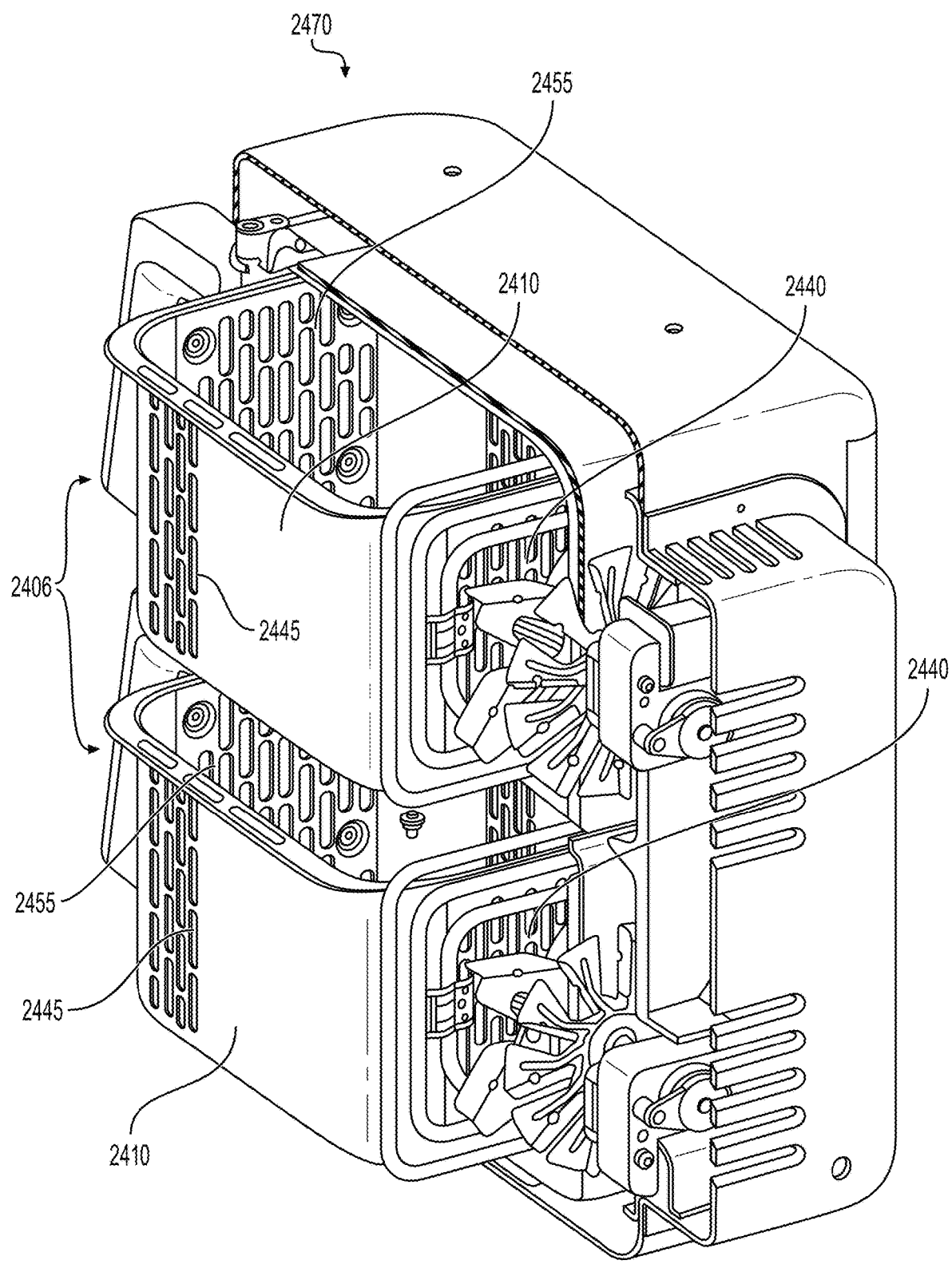
FIG. 76 is a partial cross-sectional view of a cooking system with the cooking containers of FIG. 75 inserted therein.

FIG. 75 is a rear perspective view of another embodiment 2400 of a basket 2406 that can be used in place of the basket 2110 with a cooking system 2470. FIG. 76 illustrates a partial cross-sectional, rear perspective view of the cooking system 2470, showing two baskets 2406 disposed within the cooking system 2470. Similarly to the basket 2110, basket 2406 can include a top opening 2407, sidewalls 2410, 2415, front wall 2420, base 2425, and rear wall 2430, all of which together define a cooking volume 2435 therein. The basket 2406 can also include a first plurality of through-bores 2440 within the rear wall 2430 of the basket 2406. In some embodiments, the plurality of through-bores 2440 can be positioned uniformly around a center of the rear wall 2430. The basket 2406 can also include a second plurality of through-bores 2445 and a third plurality of through-bores 2450 within the sidewalls 2410, 2415, respectively. In some embodiments, the second plurality of through-bores 2445 and the third plurality of through-bores 2450 can be positioned adjacent to the front wall 2420 and can be configured to span a height of the sidewalls 2410, 2415. The basket 2406 can also include a fourth plurality of through-bores 2455 positioned uniformly around a center of the front wall 2420. In some embodiments, the basket 2406 can also include a rim 2408 spanning a top edge of the sidewalls 2410, 2415, and front wall 2420 and configured to be received by rails within the first or second internal volumes 2120, 2125 (in reference to FIG. 65), as discussed in greater detail below. In some embodiments, the rim 2408 can protrude outward from the cooking volume 2435, and can include a fifth plurality of through-bores 2460. When the rim 2408 is engaged with the rails of the first or second internal volumes, the fifth plurality of through-bores 2460 can allow airflow to pass over top of the sidewalls 2410, 2415 and into the cooking volume 2435 from outside of the basket 2406.

In some embodiments, the first, second, third, fourth, and fifth plurality of through-bores can be stadium shaped, as illustrated. However, in other embodiments, the first, second, third and fourth plurality of through-bores can be circular, rectangular, or any other viable shape. A cooking operation using the cooking container 2305, with basket 2406, rather than basket 2110, can function similarly to the cooking operation using basket 2110, as described above.

Figure 77:
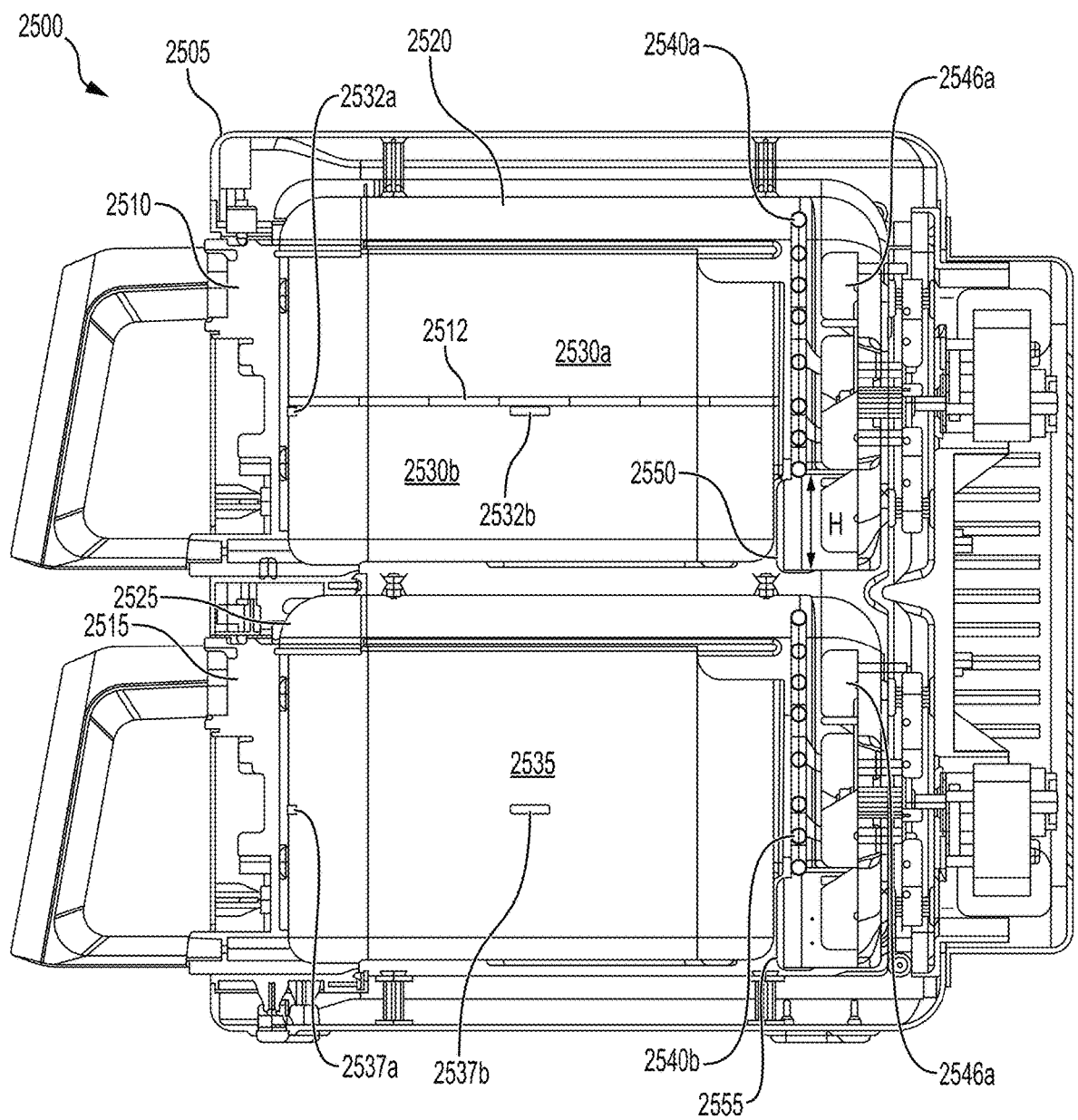
FIG. 77 is a cross-sectional view of one embodiment of a cooking system.

FIG. 77 is a cross-sectional view of another cooking system 2500. The cooking system 2500 can be similar to the cooking system 2100, accordingly, like components will not be described. In some embodiments, the cooking system 2500 can include a housing 2505, and first and second cooking containers 2510, 2515 that can be removably positioned within vertically aligned first and second internal volumes 2520, 2525. In some embodiments, the cooking system 2500 can further include one or more dividing racks 2512, which can be removably placed within a first and second cooking containers 2510, 2515 to divide respective cooking volumes 2530, 2535 thereof into two or more layered cooking volumes (e.g., 2530a, 2530b). In some embodiments, the one or more dividing racks 2512 can generally resemble a perforated plate that is configured to rest on protrusions formed within the interior of the cooking volumes 2530, 2535 (e.g., protrusions 2532a, 2532b, 2537a, 2537b, respectively). In other embodiments, the one or more dividing racks can generally resemble a wire-frame structure. In some embodiments, first and second heating elements 2540a, 2540b can be configured to span from a top surface of the first and second internal volumes 2520, 2525 down to a predetermined height H above a bottom surface of the first and second internal volumes 2520, 2525, respectively. Additionally, in some embodiments, the first and second internal volumes 2520, 2525 can include first and second barriers 2550, 2555 configured extend from the bottom surface the predetermined height H to prevent airflow from fans 2546a, 2546b from passing along a lower portion of the first and second cooking containers 2510, 2515.

Figure 78:
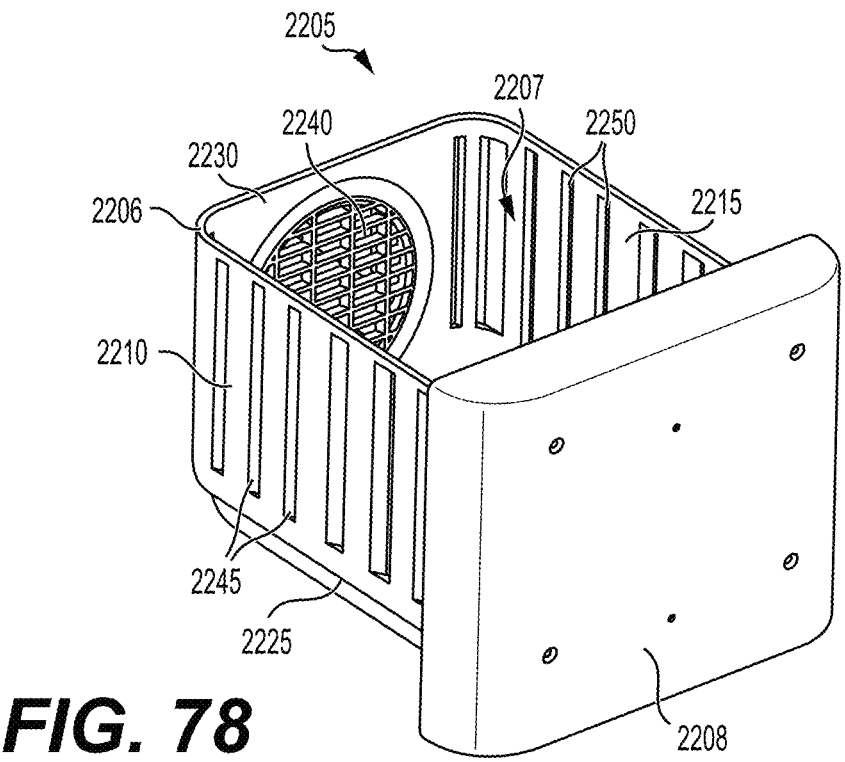
FIG. 78 is a front top perspective view of one embodiment of a cooking container.
Figure 79:
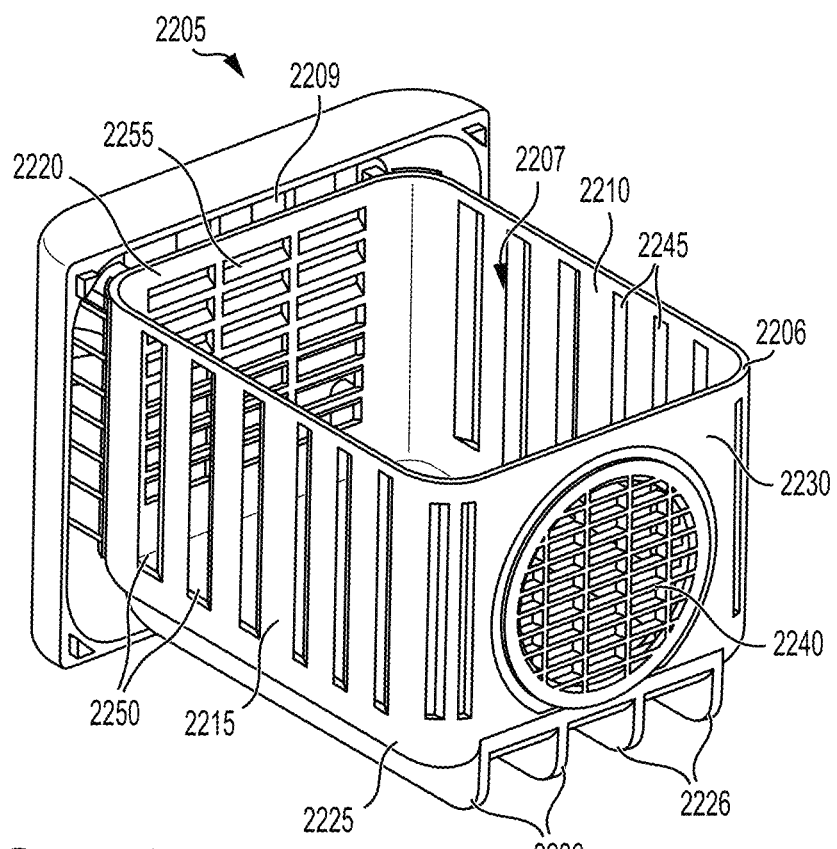
FIG. 79 is a rear top perspective view of the cooking container of FIG. 78.
Figure 80:
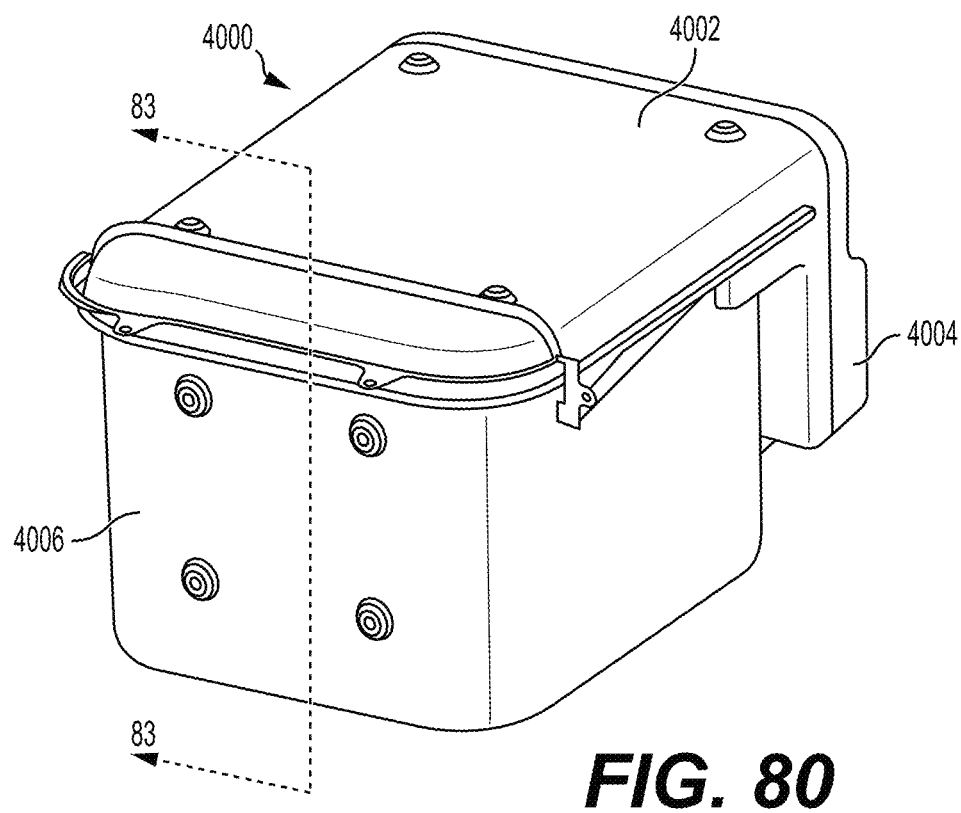
FIG. 80 is a front top perspective view of one embodiment of a cooking system.
Figure 81:
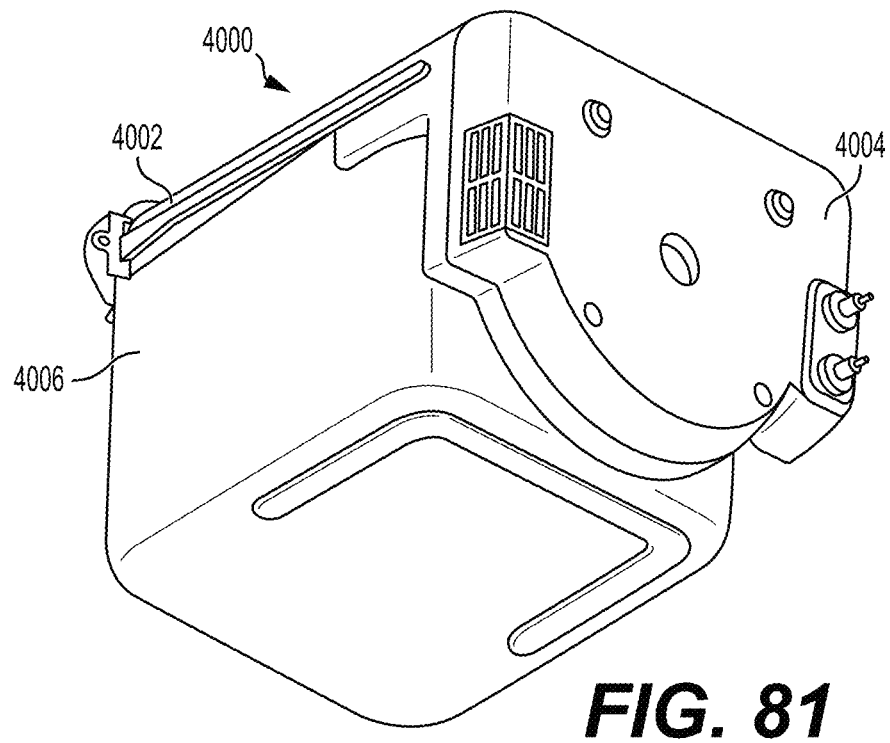
FIG. 81 is a rear bottom perspective view of the cooking system of FIG. 80.
Figure 82:
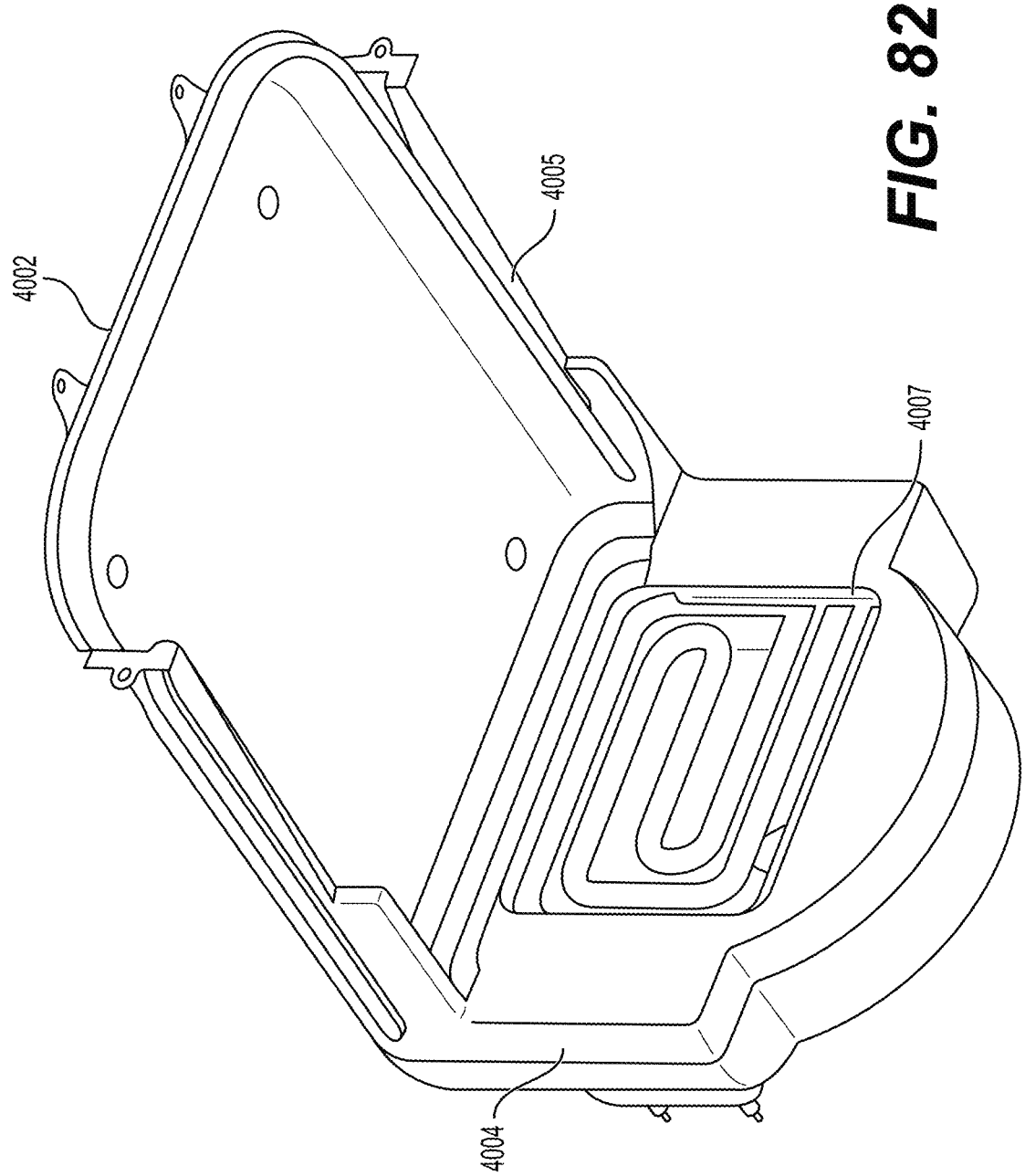
FIG. 82 is a front bottom perspective view of the cooking system of FIG. 80 with a cooking container removed.
Figure 83:
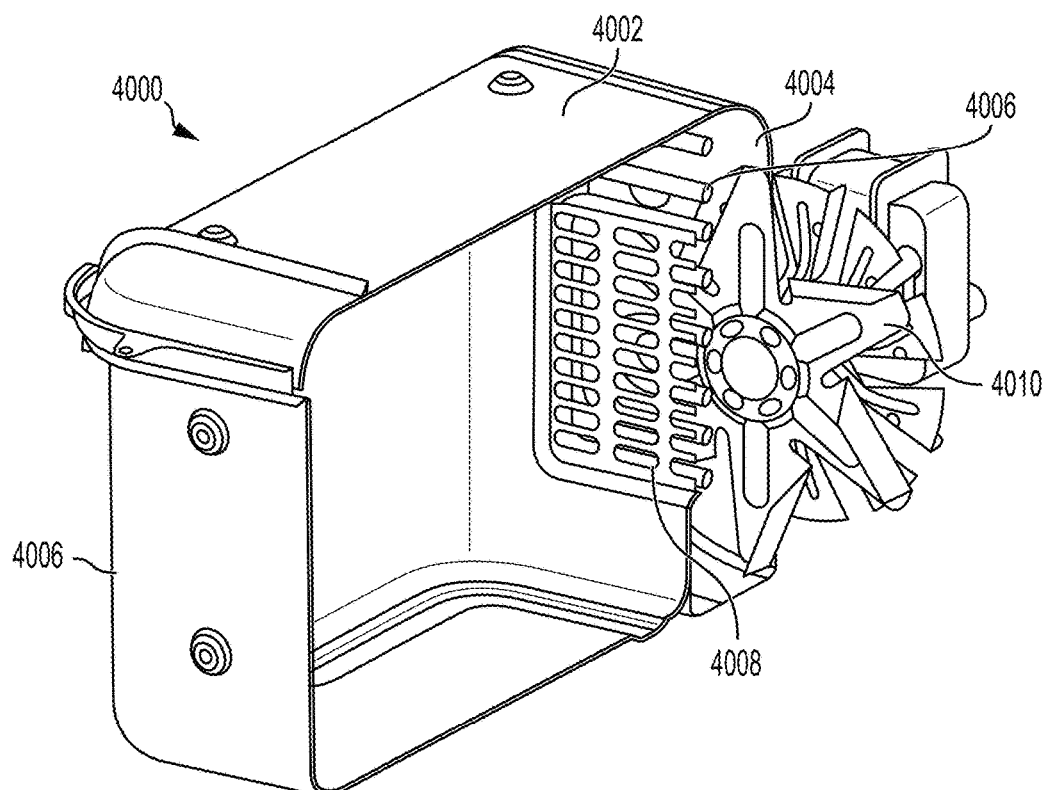
FIG. 83 is a cross-sectional perspective view of the cooking system of FIG. 80 taken along line 83-83 in FIG. 80.
Figure 84:
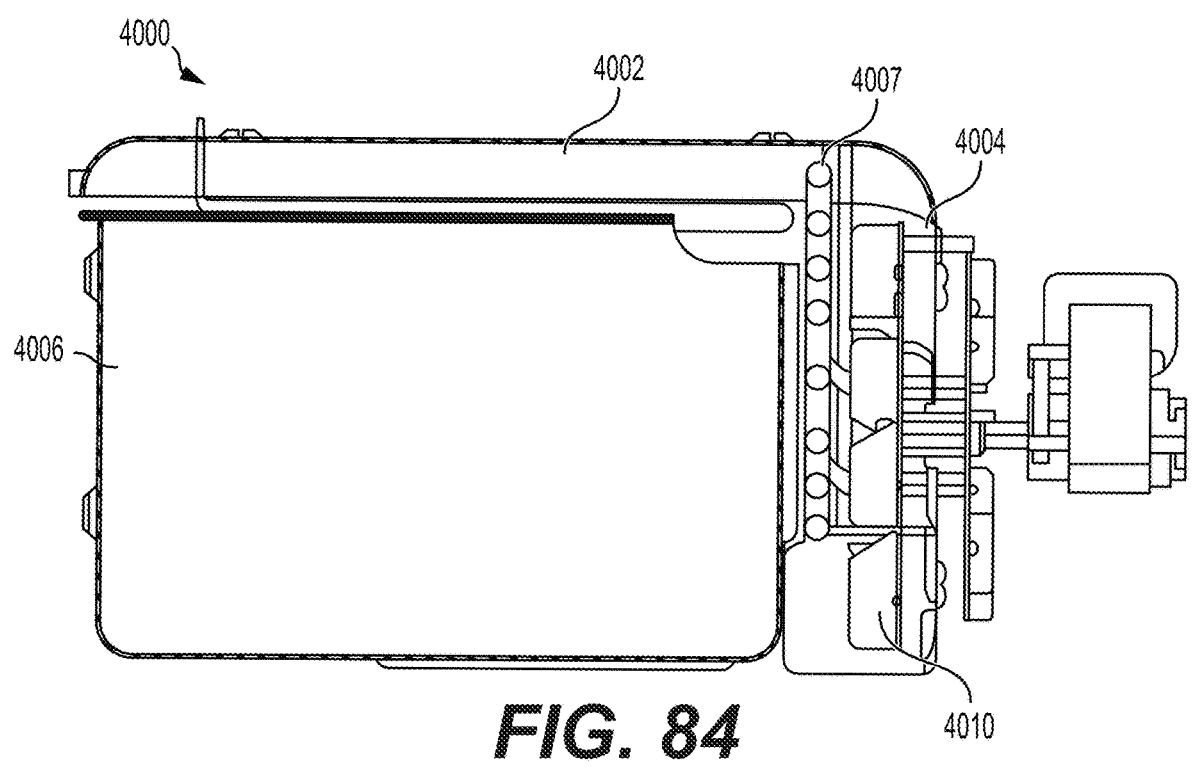
FIG. 84 is a cross-sectional view of the cooking system of FIG. 19 taken along line 83-83 in FIG. 80.
Figure 85:
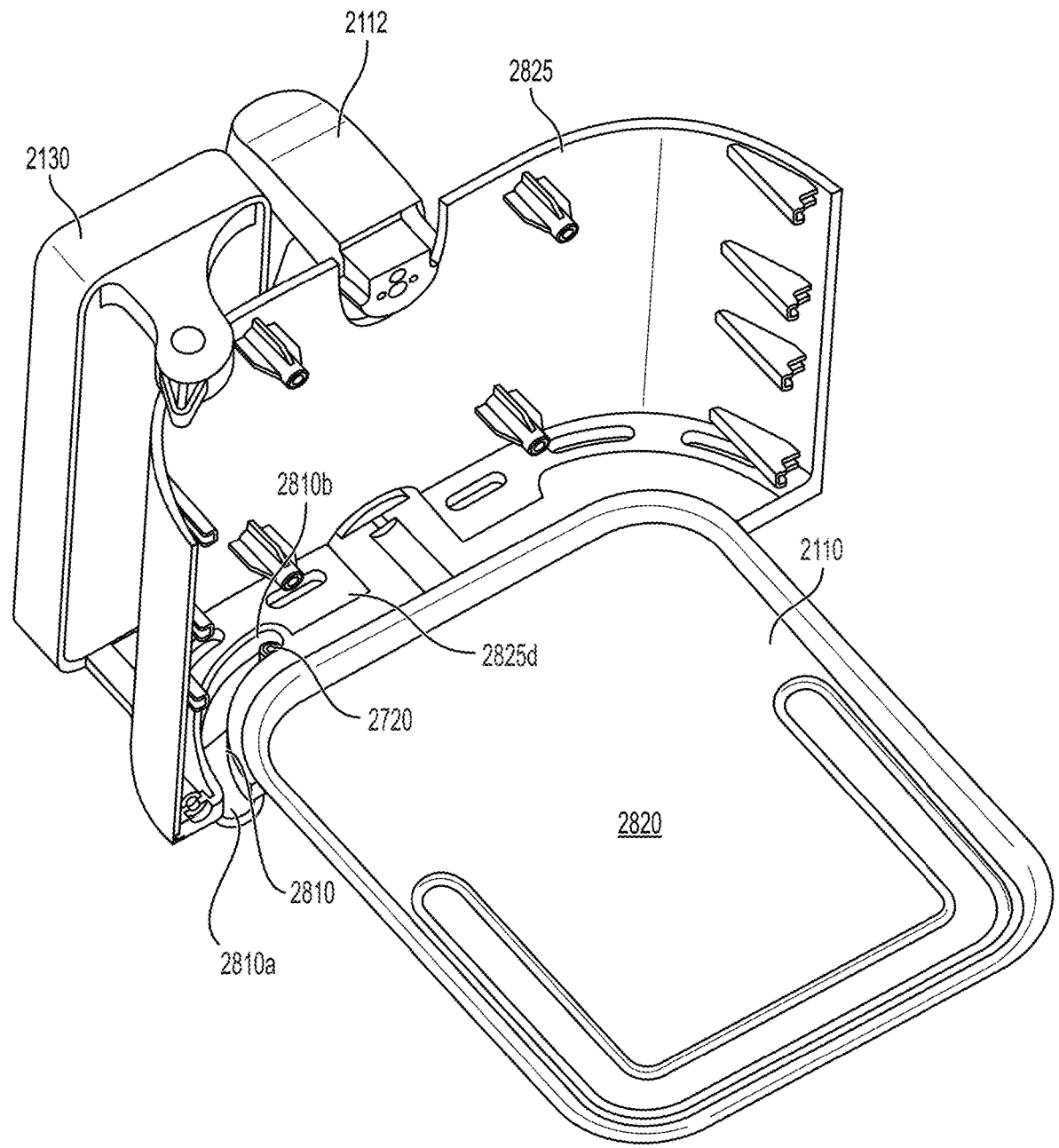
FIG. 85 is a perspective view of a portion of the cooking system of FIG. 63 with a user interface in a first positon.
Figure 86:
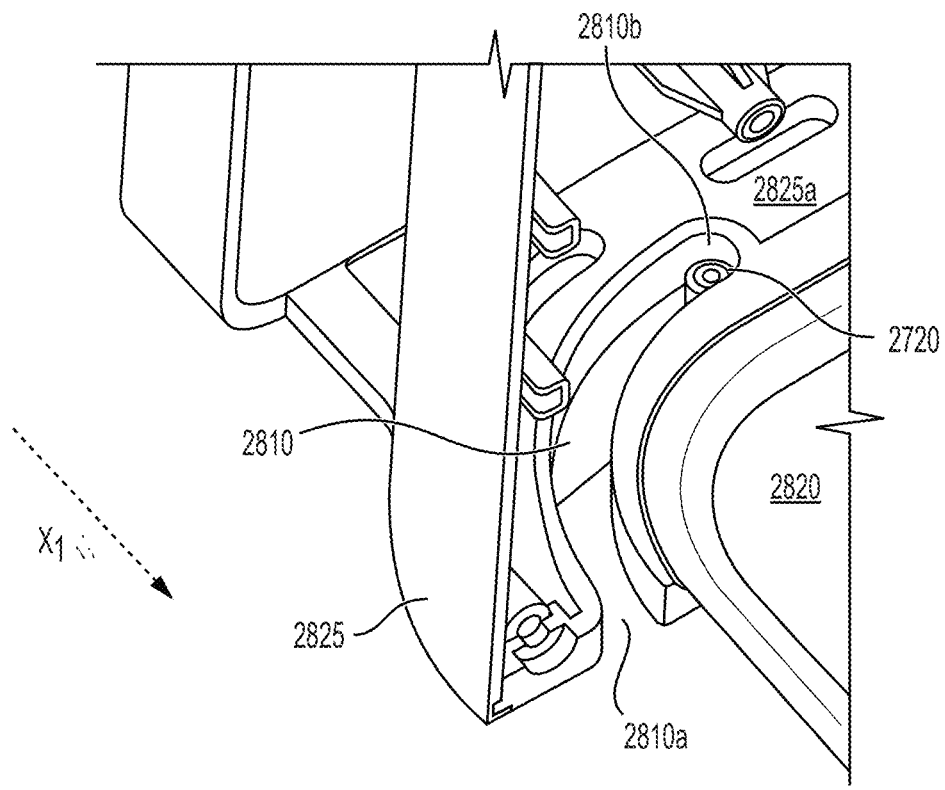
FIG. 86 is a detailed perspective view of the portion of the cooking system of FIG. 85.
Figure 87:
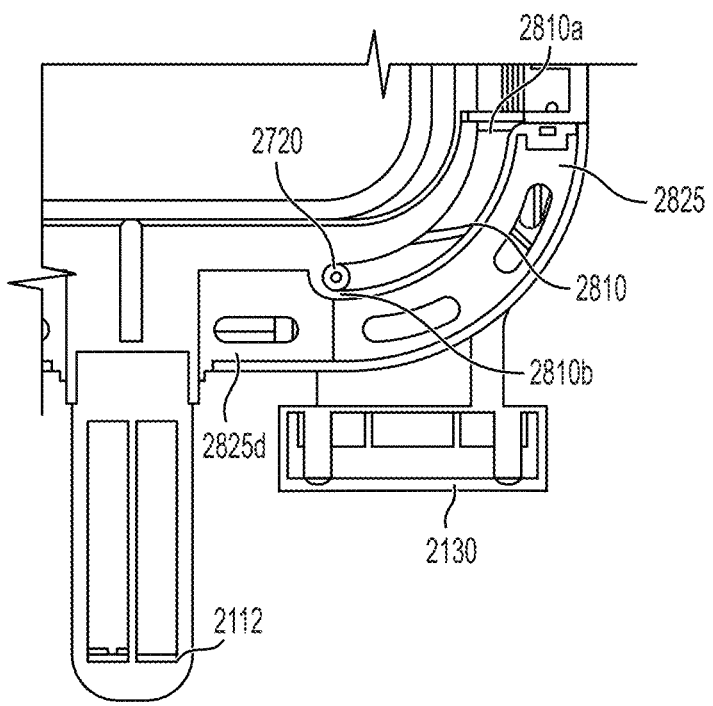
FIG. 87 is a top cross-sectional view of the portion of the cooking system of FIG. 85.
Figure 88:
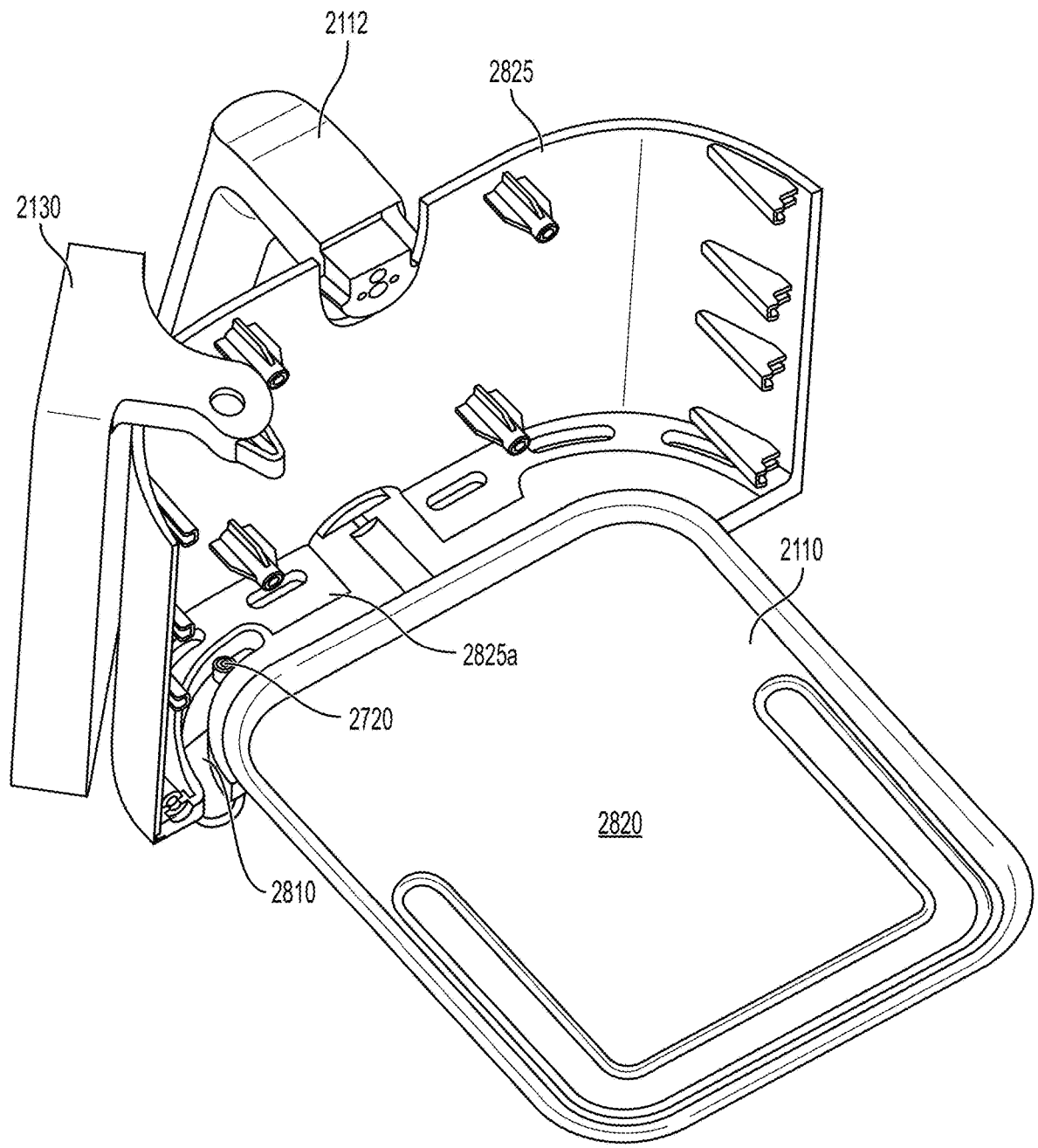
FIG. 88 is a perspective view of the portion of the cooking system of FIG. 85 with the user interface in an intermediate positon.
Figure 89:
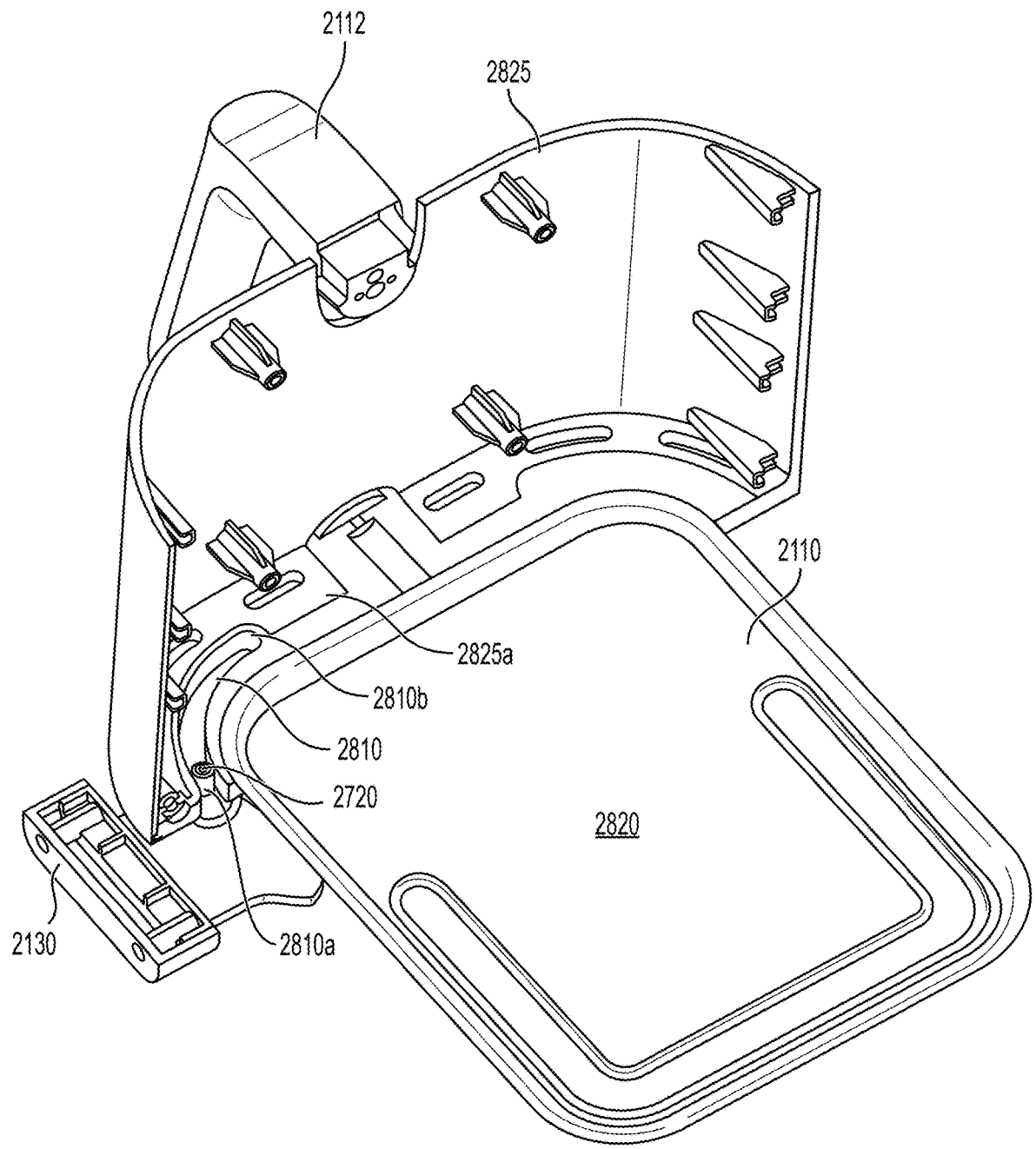
FIG. 89 is a perspective view of the portion of the cooking system of FIG. 85 with the user interface in a second positon.
Figure 90:
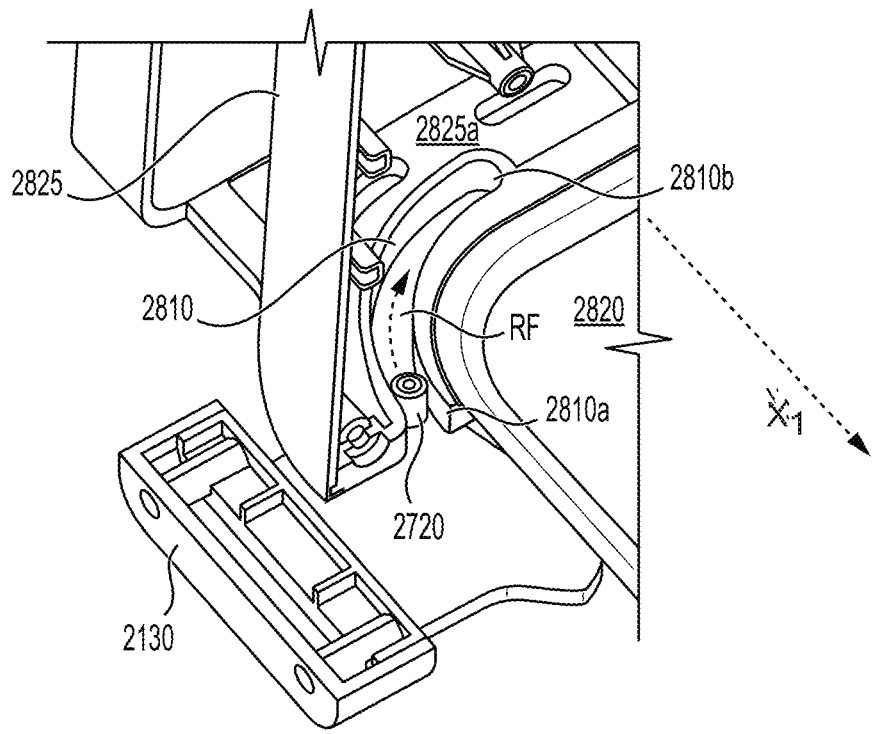
FIG. 90 is a detailed perspective view of the portion of the cooking system of FIG. 89.
Figure 91:
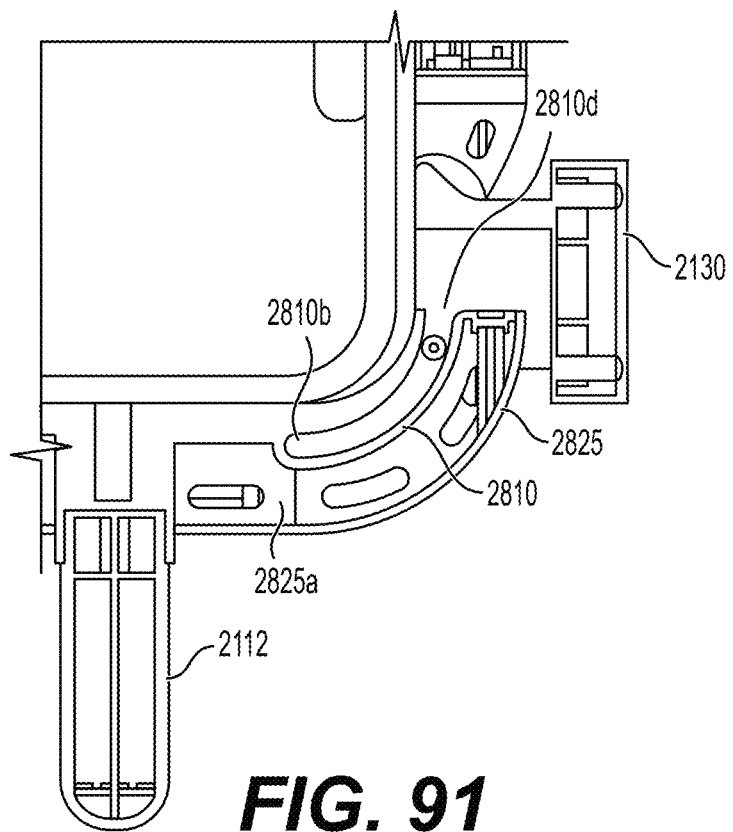
FIG. 91 is a top cross-sectional view of the portion of the cooking system of FIG. 89.
Figure 92:
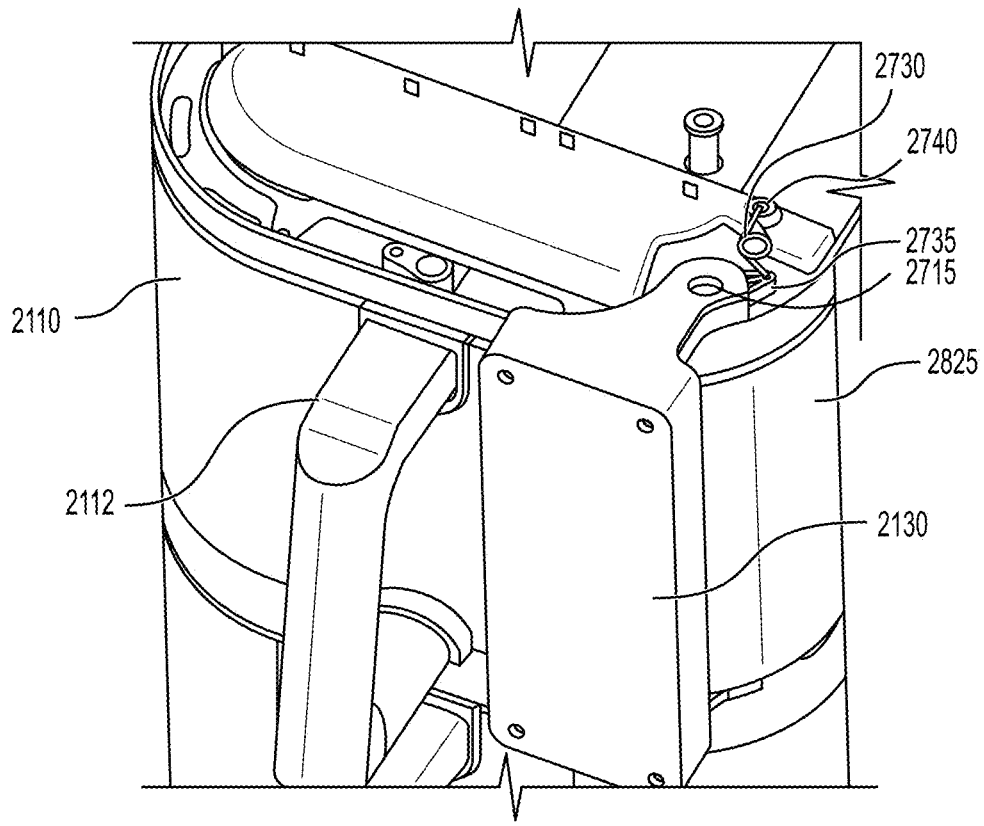
FIG. 92 is a perspective view of the cooking system of FIG. 63 with the user interface in a second position.

FIGS. 78-79 are front and rear perspective view, respectively, of an embodiment 2200 of a cooking container 2205 designed to be removably positioned within an internal volume of a cooking system (e.g., cooking system 2100). As illustrated in FIGS. 78-79, the cooking container 2205 can include a basket 2206 including a top opening 2207, sidewalls 2210, 2215, front wall 2220, base 2225, and rear wall 2230, all of which together define a cooking volume therein. The cooking container 2205 can also include an external panel 2208 coupled to the front wall 2220 of the basket 2110. In some embodiments, a channel 2209 can be defined in a space between the external panel 2208 and the front wall 2220 of the basket 2206. In some embodiments, the basket 2206 can further include a plurality of ribs 2226 extending downward from the base 2225 of the basket 2206. The basket 2206 can also include a first plurality of through-bores 2240 within the rear wall 2230 of the basket 2206. In some embodiments, the plurality of through-bores 2240 can be positioned uniformly around a center of the rear wall 2230. The basket 2206 can also include a second plurality of through-bores 2245 and a third plurality of through-bores 2250 within the sidewalls 2210, 2215, respectively. In some embodiments, the second plurality of through-bores 2245 and the third plurality of through-bores 2250 can be positioned along a length of the sidewalls 2210, 2215, respectively and can be configure to span a height of the sidewalls 2210, 2215. The basket 2206 can also include a fourth plurality of through-bores 2255 within the front wall 2220.

In some embodiments, the fourth plurality of through-bores 2255 can be positioned along a length of the front wall 2220 and can be configure to span a height of the front wall 2220. An example of the airflow through the sidewalls 2210, 2215, front wall 2220, and rear wall 2230 of the basket 2206 during a cooking operation is provided below with reference made to FIGS. 63-70.

During a cooking operation, the cooking container 2205 can be positioned within the first internal volume 2120 of the cooking system 2100 with the rear wall 2230 positioned adjacent the first heating element 2140a. Some of the airflow from the fan 2146a can be configured to pass through the first heating element 2140a, through the plurality of through-bores 2240 into the cooking volume 2235, and pass horizontally over a food load positioned within the cooking volume 2235. Additionally, some of the airflow from the fan 2146a can be configured to pass through the first heating element 2140a, along the sidewalls 2210, 2215, through the second and third plurality of through-bores 2245, 2250 and into the cooking volume 2235. Furthermore, some of the airflow from the fan 2146a can be configured to pass through the first heating element 140a, underneath the container 2205 along the ribs 2226, into the channel 2208 between the external panel 2208 and the front wall 2220, through the fourth plurality of through-bores 2255, and into the cooking volume 2235. In some embodiments, the first, second, third and fourth plurality of through-bores can be rectangular shaped, as illustrated. However, in other embodiments, the first, second, third and fourth plurality of through-bores can be circular, or any other viable shape. Additionally, some of the airflow from the fan 2146a can be configured to pass vertically over the rear wall 2230 into the cooking volume 2235 through the top opening 2207, as described in greater detail below.

FIGS. 80-84 illustrate another embodiment of a cooking system 4000. The cooking system 4000 is similar to the cooking system 2100, and therefore, like components will not be discussed in detail. The cooking system 4000 includes a shroud 4002 arranged over a cooking container 4006. The shroud 4002 includes a rear portion 4004 that can include a heater 4007 and an air movement device 4010. When inserted into an internal volume where the shroud 4002 is positioned, the shroud 4002 seals the cooking container 4006 along the edge 4005. Additionally, the cooking container 4004 includes through-bores 4008 arranged in a rear wall, similar to the cooking container 2112. With the cooking container 4006 sealed along the edge 4005, all of the air being pushed by the air movement device 4010 is forced into the cooking container 4006, and returns to the heater 4007 and air movement device 4010 through the through-bores 4008.

Figure 93:
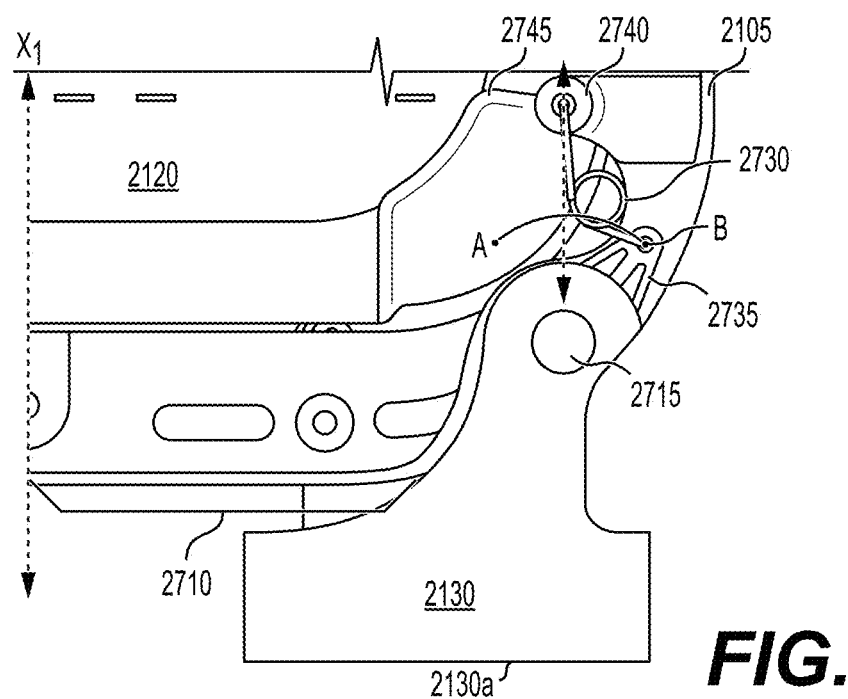
FIG. 93 is a top view of the cooking system of FIG. 92.
Figure 94:
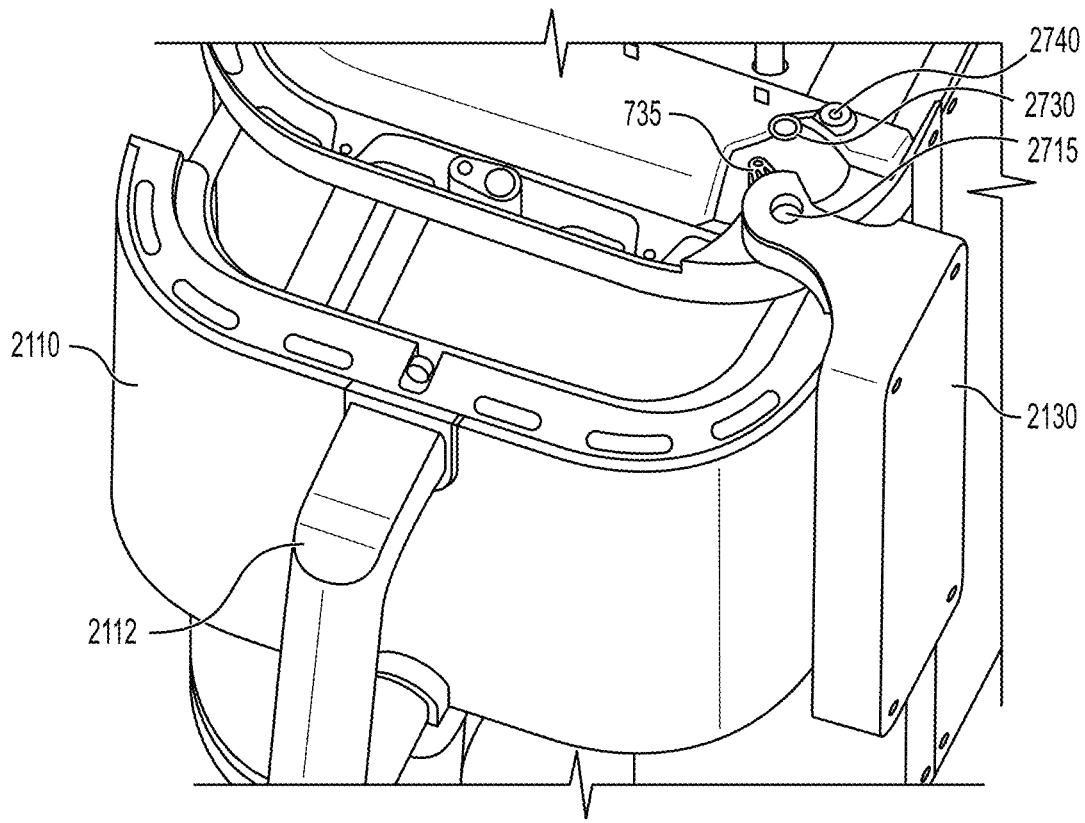
FIG. 94 is a perspective view of the cooking system of FIG. 63 with the user interface in a first position.
Figure 95:
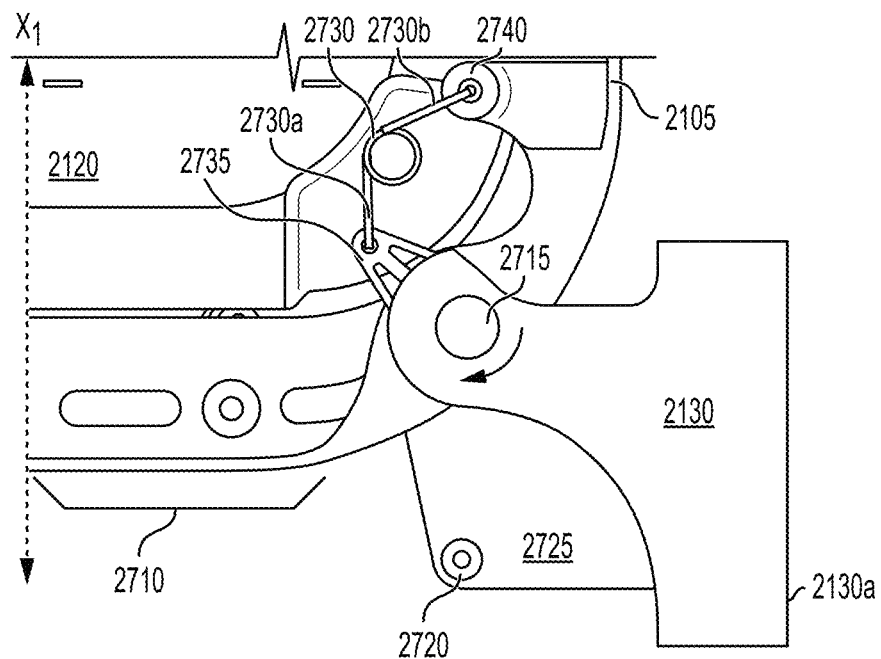
FIG. 95 is a top view of the cooking system of FIG. 94.

FIGS. 85-95 illustrate the cooking system 2100 showing the user interface (UI) 2130 in a second position and a first position, respectively. In some embodiments, the UI 2130 can be rotatably coupled to the housing 2105 adjacent to an opening 2710 into the first and internal volume 2120 by a hinge 2715. Additionally, in some embodiments, the UI 2130 can include a pin 2720 extending upward from a base plate 2725 of the UI 2130 and configured to be removably received by a guide channel of a cooking container, as discussed in greater detail below. In some embodiments, the UI 2130 can also include a spring member 2730 configured to bias the UI 2130 to at least one of second position or the first position. The spring member 2730 can be coupled to a first connector 2735 of the UI 2130 at a first end 2730a, and can be coupled to a second connector 2740 of the housing 2105 at a second end 2730b. In the second position, shown in FIGS. 94-95, the first connector 2735 can be in a second position A, and a front face 2130a of the UI 2130 can be parallel with the insertion axis X1. As the UI 2130 is rotated about the hinge 2715 from the second position to the first position, as discussed in greater detail below, the first and second ends 2730a, 2730b of the spring member 2730 can be configured to pinch toward one another as the first connector 2735 moves from the second position A to a first position B, as shown in FIG. 93. In the first position, the front face 2130a of the UI 2130 can be parallel with the opening 2710. In some embodiments, the spring member 2730 can have a virtual biasing axis 2745 which defines whether the UI 2130 will be biased into the second position or the first position. For example, if the first connector 2735 is on the left of the virtual biasing axis 2745, the UI 2130 will be biased to the second position. However, as soon as the first connector 2735 crosses over from the left side of the virtual biasing axis 2745 to the right side, the UI 2130 will be biased to the first position.

FIGS. 86-92 are partial perspective views of the cooking system 2100 showing an interaction between the pin 2720 and a guide channel 2810 of the cooking container 2820. In some embodiments, the cooking container 2820 can be similar to cooking container 2205, accordingly, like components will not be described. The guide channel 2810 can be extruded out of a bottom surface 2825a of an external panel 2825 of the cooking container 2820. In some embodiments, the guide channel 810 can be curved from a first end 810a to a second end 2810b. An example of an insertion operation whereby the UI 2130 is rotated from the second position to the first position as the cooking container 2205 is inserted into the cooking system 2100 is provided below with references made to any cooking systems disclosed herein. In some embodiments, the cooking container 2205 can be initially inserted into the opening 2710 of the internal volume 2120 along the insertion axis X1. As the cooking container 2205 is inserted into the opening 2710, the guide channel 2810 can be configured to receive the pin 2720 at a first end 2810a thereof while the UI 2130 is in the second position adjacent to the opening 2710. As the cooking container 2205 is inserted into the internal volume 2120 along the insertion axis X1, a rotational force RF can be exerted on the pin 2720 by the guide channel 2810, causing the pin 2720 to translate along the guide channel 2810 from the first end 2810a to the second end 2810b. As the pin 2720 translates along the guide channel 2810 from the first end 2810a to the second end 2810b, the UI 2130 can be configured to rotate from the second position to the first position.

In some embodiments, the UI 2130 can further include a switch (not show) that turns off/on power to the UI 2130 as the UI 2130 indexes from the second position to the first position, respectively.

Certain exemplary implementations have been described to provide an overall understanding of the principles of the structure, function, manufacture, and use of the systems, devices, and methods disclosed herein. One or more examples of these implementations have been illustrated in the accompanying drawings. Those skilled in the art will understand that the systems, devices, and methods specifically described herein and illustrated in the accompanying drawings are non-limiting exemplary implementations and that the scope of the present invention is defined solely by the claims. The features illustrated or described in connection with one exemplary implementation may be combined with the features of other implementations. Such modifications and variations are intended to be included within the scope of the present invention. Further, in the present disclosure, like-named components of the implementations generally have similar features, and thus within a particular implementation each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described implementations. Accordingly, the present application is not to be limited by what has been particularly shown and described, except as indicated by the appended claims. All publications and references cited herein are expressly incorporated by reference in their entirety.

What is claimed is:

1. A cooking system, comprising:
a housing including an internal volume, the internal volume including an upper surface having a length and a width;
a baffle extending at least partially across the width of the upper surface and extending directly downward from the upper surface, the baffle being configured to separate an air flow traveling along the upper surface into a first air flow and a second air flow;
a cooking container removably positioned within the internal volume along an insertion axis the cooking container having a cooking volume therein;
an air movement device positioned within the internal volume, and configured to generate the air flow; and
a heating element positioned within the internal volume.

2. The cooking system of claim 1, wherein a guide vane is positioned within the internal volume, the guide vane extending at least partially along the insertion axis from a rear section of the internal volume to a front section of the internal volume.

3. The cooking system of claim 2, wherein the guide vane is positioned on the upper surface of the internal volume.

4. The cooking system of claim 3, wherein the guide vane extends into the baffle, and wherein the first air flow and the second air flow are positioned side-by-side along the length of the upper surface.

5. The cooking system of claim 1, wherein a portion of the baffle is offset from the upper surface, creating a gap between the portion of the baffle and upper surface.

6. The cooking system of claim 5, wherein the first air flow travels through the gap and over the portion of the baffle.

7. The cooking system of claim 5, wherein the second air flow is directed downward by the baffle.

8. The cooking system of claim 1, wherein the baffle is positioned at an angle across the width of the upper surface.

9. The cooking system of claim 1, wherein the upper surface comprises at least two deflection surfaces arranged at different positions along the length of the upper surface.

10. The cooking system of claim 9, wherein the deflection surfaces direct at least one air flow vertically downward.

11. The cooking system of claim 10, wherein an edge of the baffle aligns with at least one deflection surface of the upper surface.

12. The cooking system of claim 1, wherein the air flow passes horizontally over a food load positioned within the cooking volume.

13. The cooking system of claim 1, wherein the first air flow and the second air flow are directed downward at different positions along the length of the upper surface.

14. A cooking system, comprising:
a housing including an internal volume therein;
an upper shell forming a top surface of the internal volume, the upper shell having a length and a width;
an air movement device positioned within the internal volume, the air movement device being configured to generate an air flow through the internal volume and along the length of the upper shell;
a first baffle extending at least partially across the width of the upper shell and extending vertically and directly downward from the upper shell, the first baffle being configured to direct a first portion of the air flow to a first area within the internal volume; and
a second baffle extending at least partially across the width of the upper shell and extending vertically downward from the upper shell, the second baffle being configured to direct a second portion of the air flow to a second area within the internal volume.

15. The cooking system of claim 14, wherein the first portion of the air flow is parallel to the second portion of the air flow along at least a portion of the length of the upper shell.

16. The cooking system of claim 14, wherein the first portion of the air flow is separated from the second portion of the air flow by a guide vane positioned on the upper shell.

17. The cooking system of claim 14, wherein the first baffle directs the air vertically downward from the upper shell into the internal volume.

18. The cooking system of claim 14, wherein the second baffle directs the air vertically downward from the upper shell into the internal volume.

19. The cooking system of claim 14, wherein the first baffle is positioned at a first longitudinal position along the length of the upper shell, and the second baffle is positioned at a second longitudinal position along the length of the upper shell, wherein the first longitudinal position is different than the second longitudinal position.

20. The cooking system of claim 14, wherein a deflection surface is positioned at least partially across the width of the upper shell, and wherein the second baffle is positioned between the first baffle and the deflection surface along the width of the upper shell.

* * * * *